(12) United States Patent
Lawson et al.

(10) Patent No.: US 9,950,580 B2
(45) Date of Patent: Apr. 24, 2018

(54) BEAD SEATER APPARATUS AND METHOD FOR USING THE SAME

(71) Applicant: Android Industries LLC, Auburn Hills, MI (US)

(72) Inventors: Lawrence J. Lawson, Troy, MI (US); Barry Allan Clark, Ortonville, MI (US); David Henry Larson, Swartz Creek, MI (US)

(73) Assignee: Android Industries LLC, Auburn Hills, MI (US)

( * ) Notice: Subject to any disclaimer, the term of this patent is extended or adjusted under 35 U.S.C. 154(b) by 674 days.

(21) Appl. No.: 13/754,610

(22) Filed: Jan. 30, 2013

(65) Prior Publication Data

US 2013/0192769 A1 Aug. 1, 2013

Related U.S. Application Data

(60) Provisional application No. 61/592,728, filed on Jan. 31, 2012.

(51) Int. Cl.
*B60C 25/12* (2006.01)
*B60C 25/04* (2006.01)
*B60C 25/02* (2006.01)

(52) U.S. Cl.
CPC .............. *B60C 25/12* (2013.01); *B60C 25/04* (2013.01); *B60C 25/025* (2013.01)

(58) Field of Classification Search
CPC ..... B60C 25/02; B60C 25/025; B60C 25/132; B60C 25/04; B60C 25/12
USPC ................ 157/5, 1.17, 1.2, 1.22, 1.26, 1.28
See application file for complete search history.

(56) References Cited

U.S. PATENT DOCUMENTS

| | | | | |
|---|---|---|---|---|
| 2,762,424 A * | 9/1956 | Zito | | 157/1.28 |
| 4,886,101 A * | 12/1989 | Kinnick et al. | | 157/1.22 |
| 5,226,465 A * | 7/1993 | Schon et al. | | 157/1.28 |
| 6,176,288 B1 * | 1/2001 | Kane et al. | | 157/1 |
| 6,324,753 B1 * | 12/2001 | Naruse | | B60B 29/00 |
| | | | | 157/16 |
| 6,557,610 B2 * | 5/2003 | Koerner et al. | | 157/1 |
| 6,619,362 B2 * | 9/2003 | Corghi | | 157/1.24 |
| 7,188,656 B2 * | 3/2007 | Gonzaga | | 157/1.17 |
| 7,798,196 B2 * | 9/2010 | Gonzaga et al. | | 157/1.22 |
| 8,250,915 B1 * | 8/2012 | Voeller et al. | | 73/460 |
| 8,322,007 B2 * | 12/2012 | Gonzaga et al. | | 29/257 |
| 8,365,794 B2 * | 2/2013 | Lawson | | B25J 15/10 |
| | | | | 157/1.1 |
| 8,613,303 B1 * | 12/2013 | Hanneken et al. | | 157/1.17 |
| 8,770,254 B1 * | 7/2014 | Hanneken et al. | | 157/1.17 |
| 8,783,326 B1 * | 7/2014 | Vaninger et al. | | 157/1.24 |
| 8,915,285 B2 * | 12/2014 | Lawson et al. | | 157/1.28 |
| 2003/0221791 A1 * | 12/2003 | Gonzaga | | 157/1.28 |

(Continued)

OTHER PUBLICATIONS

Canadian Office Action dated Apr. 19, 2016 for Application No. 2862937.

(Continued)

*Primary Examiner* — Monica Carter
*Assistant Examiner* — Danny Hong
(74) *Attorney, Agent, or Firm* — Honigman Miller Schwartz and Cohn LLP

(57) ABSTRACT

An apparatus for seating a bead of the a adjacent a bead seat of a wheel is disclosed. The apparatus is disposable adjacent one or more of a tread surface and an outer sidewall surface of the tire.

13 Claims, 44 Drawing Sheets

(56) References Cited

U.S. PATENT DOCUMENTS

2007/0079941 A1 4/2007 Lawson et al.
2014/0305598 A1* 10/2014 Reece et al. ................ 157/1.17

OTHER PUBLICATIONS

Mexican Office Action dated Oct. 28, 2016 for Application No. MX/a/2014/009198.
Supplemental European Search Report of Application No. EP 13 74 3306, dated Mar. 17, 2015.

* cited by examiner

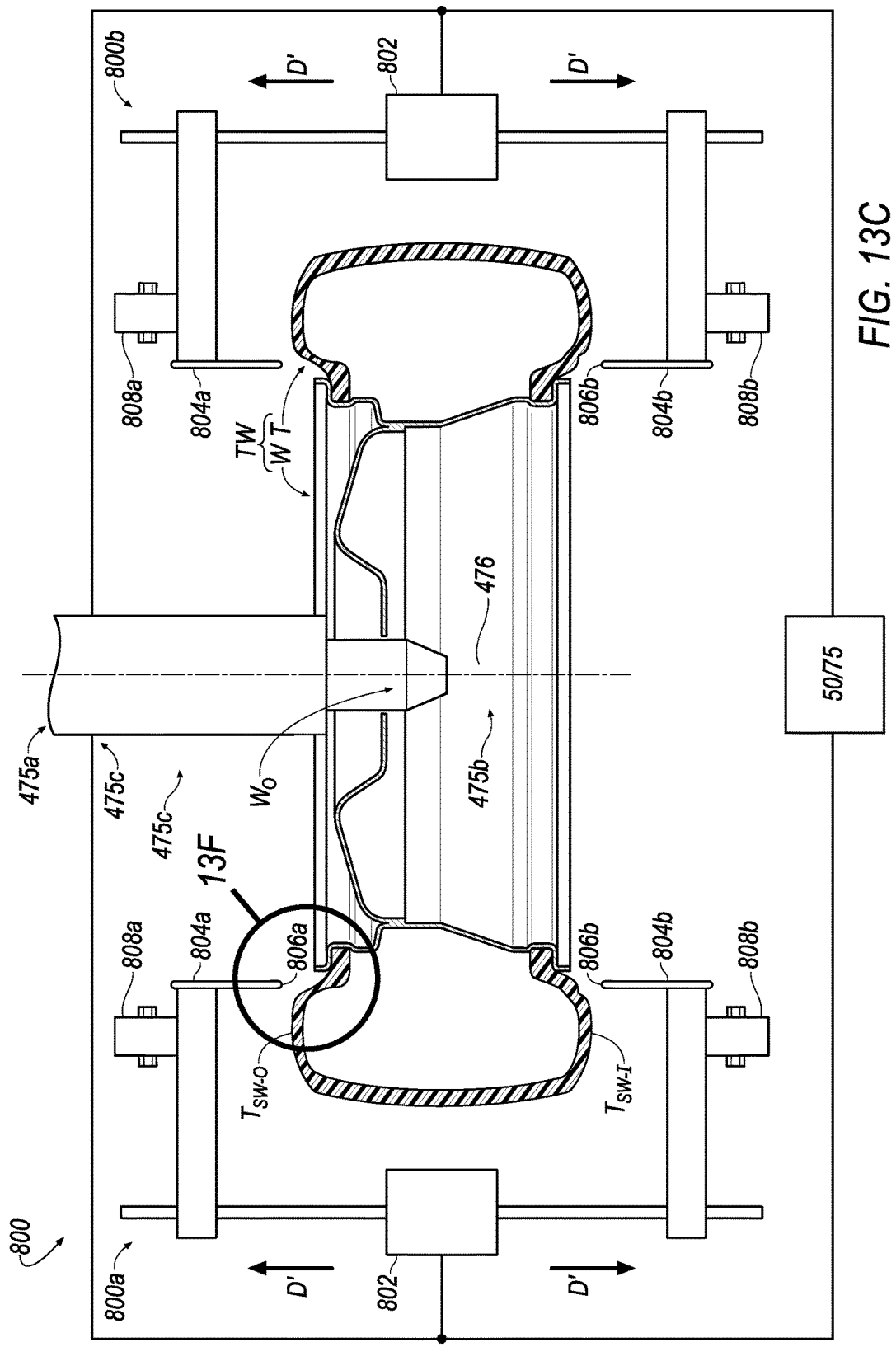

BEAD SEATER APPARATUS AND METHOD FOR USING THE SAME

CROSS-REFERENCE TO RELATED APPLICATION

This U.S. Patent Application claims priority to U.S. Provisional Application 61/592,728 filed on Jan. 31, 2012, the disclosure of which is considered part of the disclosure of this application and is hereby incorporated by reference in its entirety.

FIELD

This disclosure relates to a bead seater apparatus and a method for using the same.

BACKGROUND

It is known in the art that a tire-wheel assembly is processed in several steps. Usually, conventional methodologies that conduct such steps require a significant capital investment and human oversight. The present disclosure provides several exemplary implementations that overcome drawbacks associated with the prior art by setting forth several devices that may be utilized for processing a tire-wheel assembly.

BRIEF DESCRIPTION OF THE DRAWINGS

The present disclosure will now be described, by way of example, with reference to the accompanying drawings, in which:

FIGS. 13A-13C are side views of an exemplary bead seater assembly.

DETAILED DESCRIPTION

The Figures illustrate exemplary bead seater apparatus and a method for using the same. Based on the foregoing, it is to be generally understood that the nomenclature used herein is simply for convenience and the terms used to describe the implementations should be given the broadest meaning by one of ordinary skill in the art.

Figure 1A:
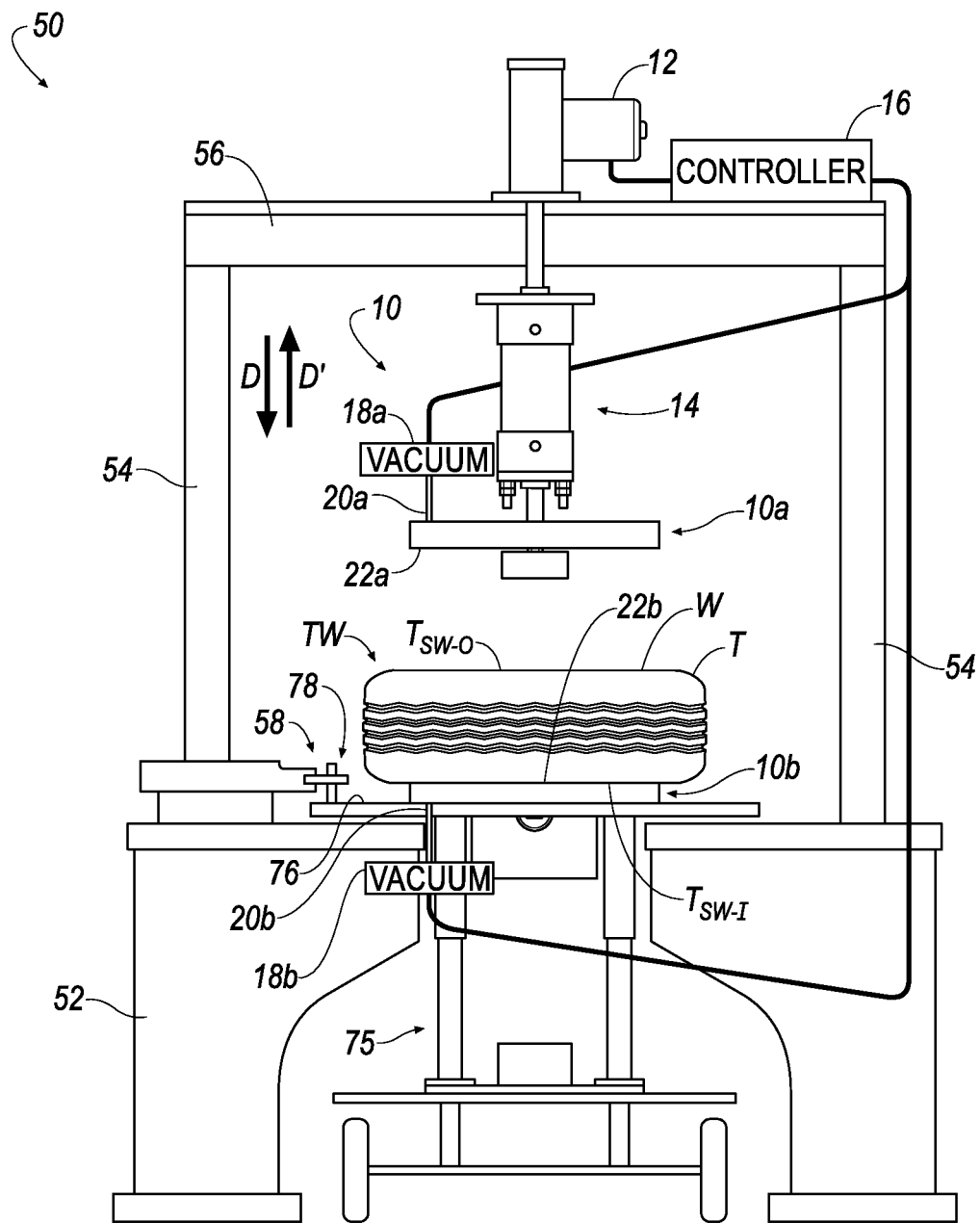
FIG. 1A is a front view of an exemplary tire/wheel assembly positioned on an assembly line cart that is located about a tire/wheel bead entrapment remover.
Figure 1B:
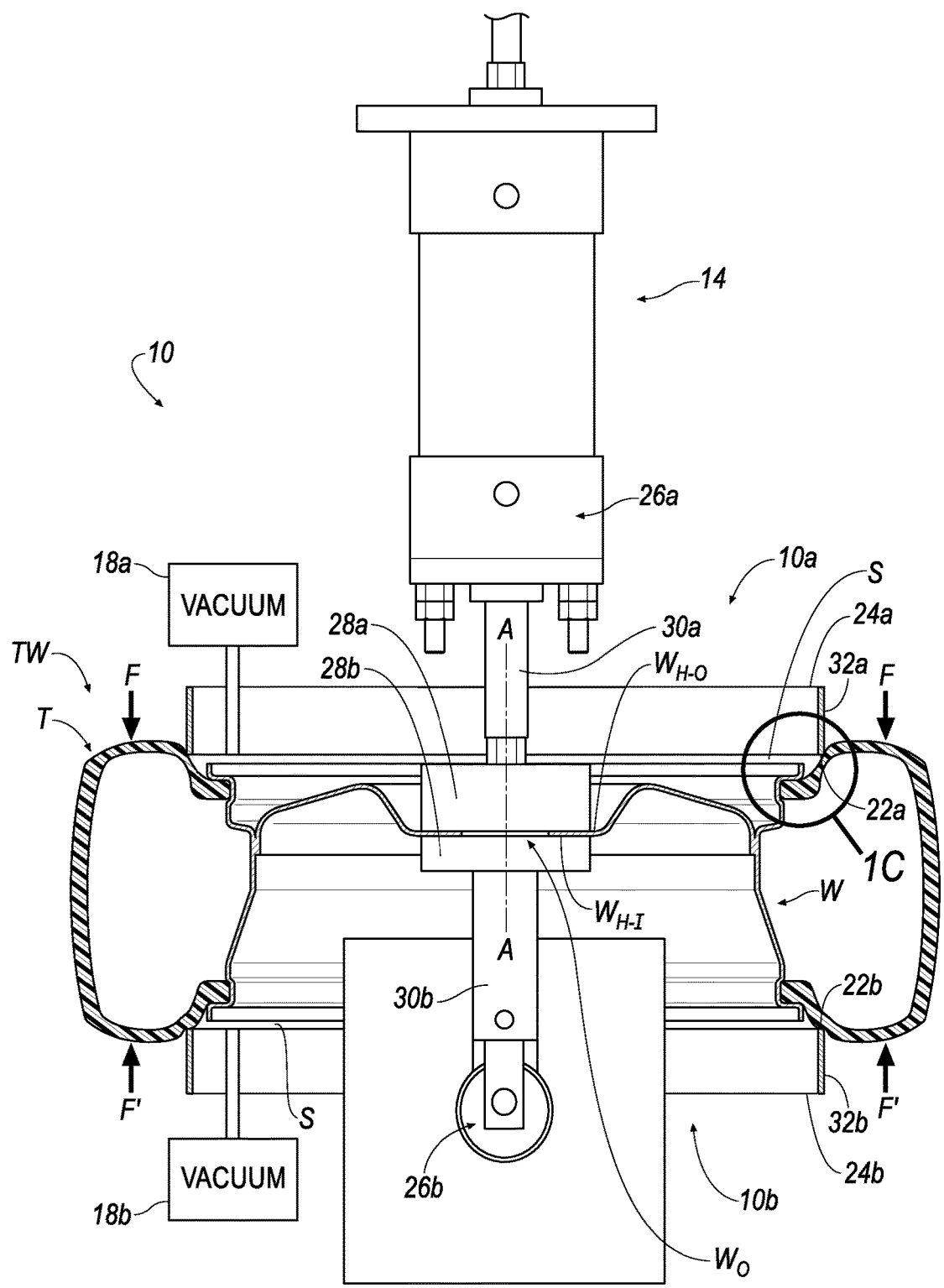
FIG. 1B is a partial cross-section view of the tire/wheel assembly and tire/wheel bead entrapment remover of FIG. 1A.
Figure 1C:
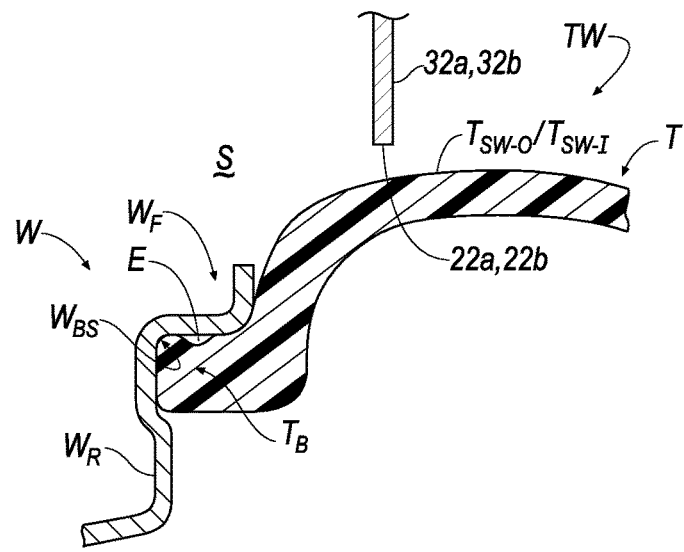
FIG. 1C is an enlarged view of the tire/wheel assembly according to line 1C of FIG. 1B.
Figure 1D:
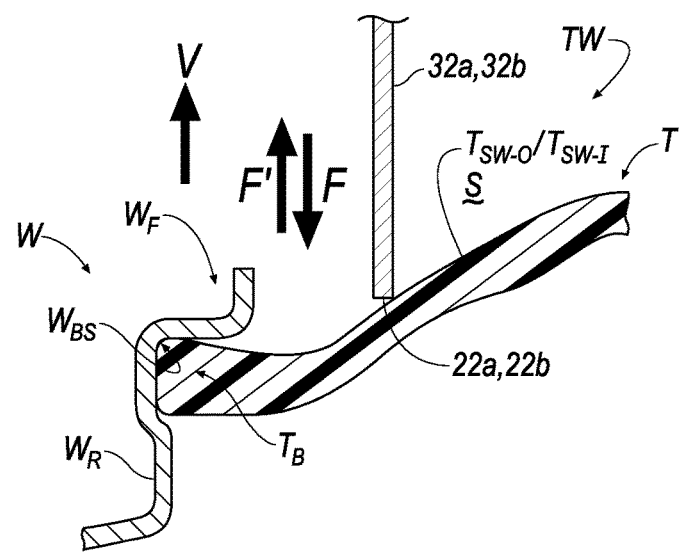
FIG. 1D is another enlarged view of the tire/wheel assembly according to FIG. 1C.
Figure 1E:
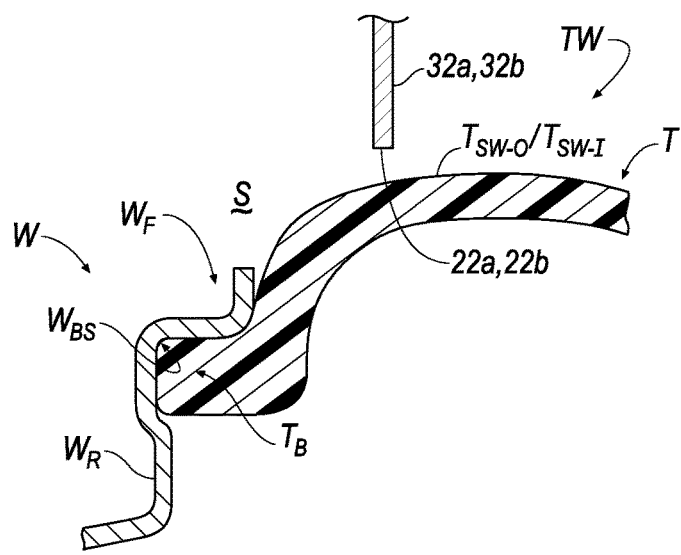
FIG. 1E is another enlarged view of the tire/wheel assembly according to FIG. 1D.
Figure 2A:
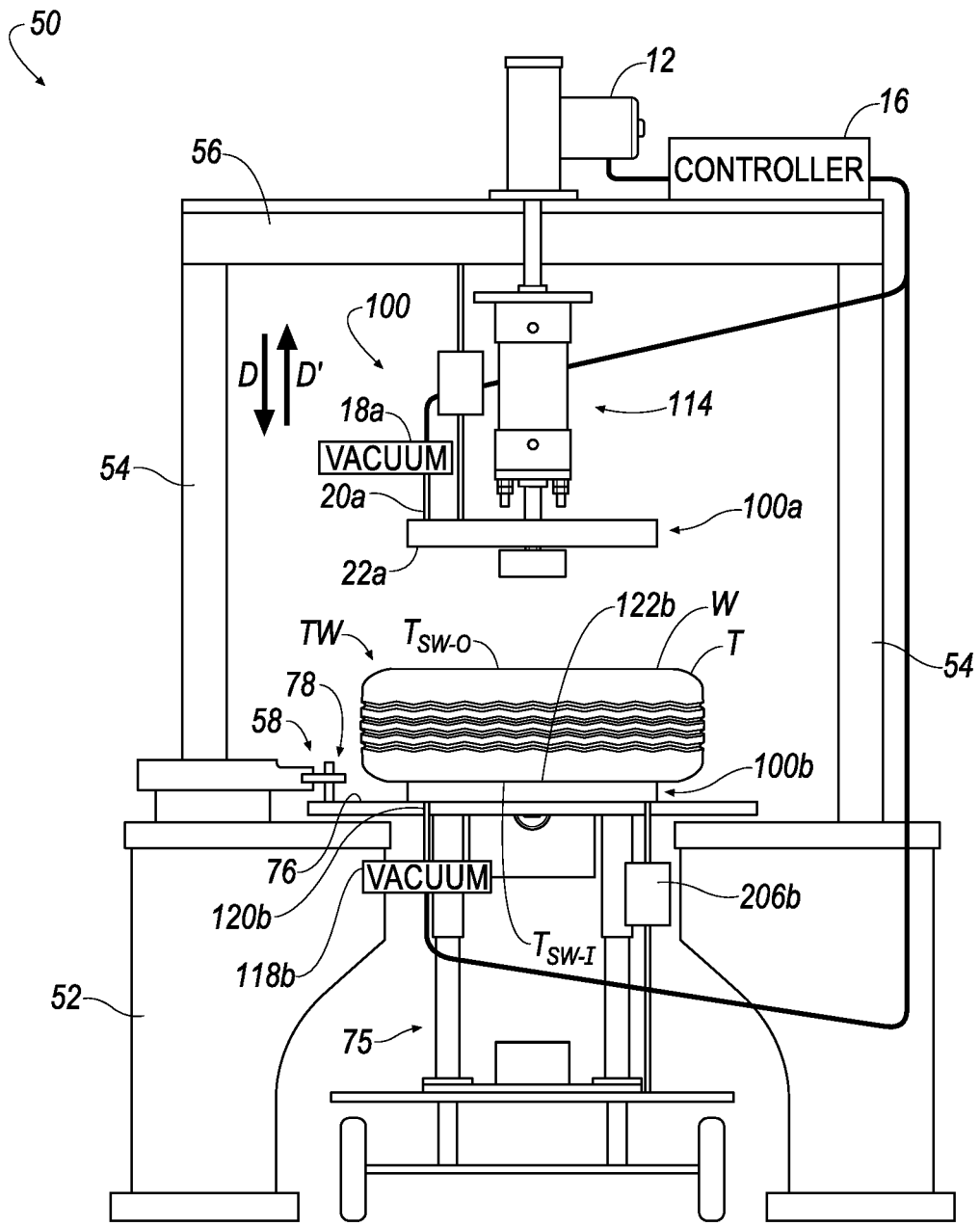
FIG. 2A is a front view of an exemplary tire/wheel assembly positioned on an assembly line cart that is located about a tire/wheel bead entrapment remover.
Figure 2B:
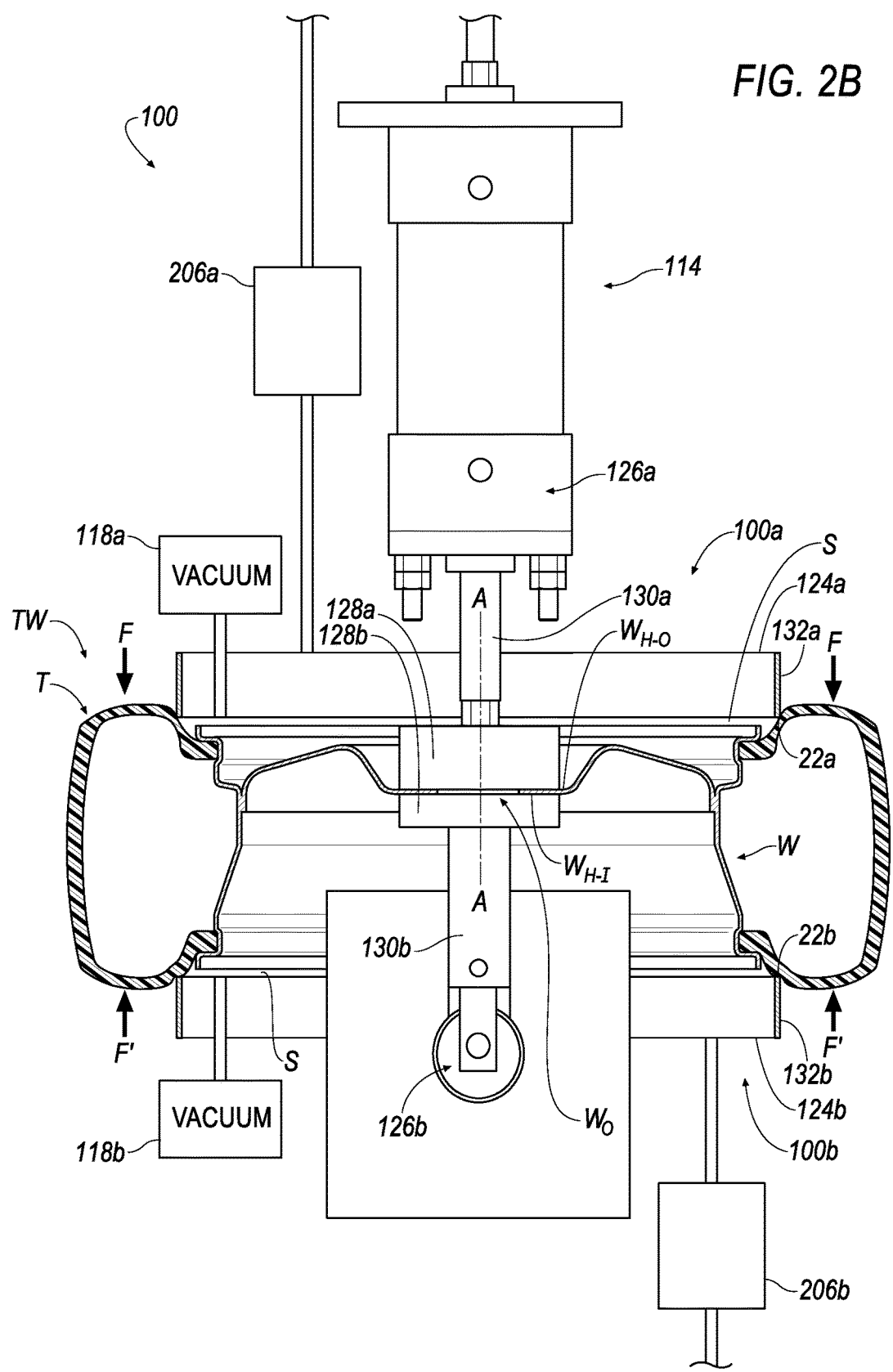
FIG. 2B is a partial cross-section view of the tire/wheel assembly and the tire/wheel bead entrapment remover of FIG. 2A.

A tire-wheel assembly is shown generally at TW and a tire-wheel assembly processing device is shown generally at 10 in FIGS. 1A, 1B and 100 in FIGS. 2A, 2B according to an embodiment. Referring to FIG. 1C, one or more entrapments, E, such as, for example, air bubble(s), lubricant, or the like, may reside between an outboard/inboard outer sidewall surface, $T_{SW-O}/T_{SW-I}$, of a tire, T, and a bead seat, $W_{BS}$, of a wheel, W, that receives a bead, $T_B$, of the tire, T; the bead seat, $W_{BS}$, may be formed by one or more of a flange portion, $W_F$, and a rim portion, $W_R$, of the wheel, W, and includes a valley, channel or cusp-shaped geometry. Accordingly, as will be described in the following disclosure, the tire-wheel assembly processing device 10, 100 may function as an "entrapment removers" for removing (as seen in, e.g., FIGS. 1C-1E) the entrapment, E, from the tire-wheel assembly, TW. In an embodiment, the entrapment remover 10, 100 may be alternatively referred to as a "bead seater" or a "bead seating device."

Referring to FIG. 1A, the entrapment remover 10 may include an upper portion 10a and a lower portion 10b. The upper portion 10a of the entrapment remover 10 may be supported by a station 50. The lower portion 10b of the entrapment remover 10 may be connected to an upper surface 76 of a wheeled cart 75.

The station 50 may include a base portion 52, a plurality of vertical support arms 54 extending from the base portion 52 and a horizontal support portion 56 supported by the plurality of vertical support arms 54. A flange 78 may extend from the wheeled cart 75; the flange 78 may interface with a locking and retaining device 58 that extends from the base portion 52 for selectively locking and selectively retaining the wheeled cart 75 to the base portion 52.

The entrapment remover 10 includes a motor 12. The motor 12 may be connected to a plunger portion 14 of the upper portion 10a of the entrapment remover 10 for driving downwardly, D, or upwardly, D', vertical movement of the plunger portion 14. The entrapment remover 10 also includes a controller 16, a first vacuum device 18a connected to the upper portion 10a of the entrapment remover 10 by a first hose 20a and a second vacuum device 18b connected to the lower portion 10b of the entrapment remover 10 by a second hose 20b.

The controller 16 may include hardware (e.g., memory, a processor and the like) and software that operably-communicates with one or more components of the entrapment remover 10. For example, the controller 16 may communicate with the motor 12 for causing the downward/upward movement, D/D', of the plunger portion 14. Movement of the plunger portion 14 according to the downwardly direction, D, results in the upper portion 10a of the entrapment remover 10 being adjusted from a disengaged orientation (as seen in, e.g., FIG. 1A) to an engaged orientation (as seen in, e.g., FIG. 1B) such that an upper circumferential perimeter 22a of the upper portion 10a of the entrapment remover 10 comes into contact with and engages the outboard outer sidewall surface, $T_{SW-O}$, of the tire, T. The controller 16 may also communicate with one or more of the first and second vacuum devices 18a, 18b for de/activating one or more of the first and second vacuum devices 18a, 18b.

The lower portion 10b of the entrapment remover 10 includes a lower circumferential perimeter 22b. The lower circumferential perimeter 22b is disposed adjacent and supports the inboard outer sidewall surface, $T_{SW-I}$, of the tire, T.

Referring to FIG. 1B, the upper portion 10a of the entrapment remover 10 circumferentially and sealingly-engages the outboard outer sidewall surface, $T_{SW-O}$, of the tire, T, proximate the (first) bead seat, $W_{BS}$, of the wheel, W. As also seen in FIG. 1B, the lower portion 10b of the entrapment remover 10 circumferentially and sealingly-engages the inboard outer sidewall surface, $T_{SW-I}$, of the tire, T, proximate the (second) bead seat, $W_{BS}$, of the wheel, W.

Upon actuation of one or more of the first vacuum device 18a and the second vacuum device 18b, one or more of the upper portion 10a and the lower portion 10b of the entrapment remover 10 removes any entrapments, E, such as, for example, microscopic air bubbles (as seen in, e.g., FIG. 1C) that may be circumferentially entrapped between the outboard/inboard outer sidewall surface, $T_{SW-O}/T_{SW-I}$, of the tire, T, and the (outboard/inboard) bead seat, $W_{BS}$, of the wheel, W, that receives the bead, $T_B$, of the tire, T.

Each of the upper portion 10a and the lower portion 10b of the entrapment remover 10 may further include a platen 24a, 24b, an oscillating motor 26a, 26b and a hub engagement mechanism 28a, 28b. The oscillating motors 26a, 26b may be any type of motor, such as, for example, an electric motor, a hydraulic motor, a pneumatic motor, or the like that is designed to oscillate a working output shaft, press, clamp, or the like, which is shown generally at 30a, 30b of each of the upper portion 10a and the lower portion 10b of the entrapment remover 10. As illustrated, the working output shafts 30a, 30b are adapted to engage the hub mechanism 28a, 28b, which are effective, respectively, for providing forces according to the direction of arrows, F, F' from the working output shaft 30a, 30b to an outboard hub portion, $W_{H-O}$, and an inboard hub portion, $W_{H-I}$, respectively, of the wheel, W. If desired, the hub engagement mechanisms 28a, 28b and/or the shafts 30a, 30b may be joined together, through an opening, $W_O$, of the wheel, W, and one of the motors 26a, 26b.

Outer peripheral portions 32a, 32b of the platens 24a, 24b are designed to engage the outboard/inboard outer sidewall surface, $T_{SW-O}/T_{SW-I}$, of the tire, T, to axially-fix (or confine) the positioning of the tire, T, from having any significant axial movement relative an axially-movable positioning of the wheel, W. While the tire, T, is restricted from any axial movement by outer peripheral portions 32a, 32b of the platens 24a, 24b, the hub engagement mechanisms 28a, 28b and/or working output shafts 30a, 30b are designed to clamp and directly conduct work upon the wheel, W, by axially-moving the wheel, W, relative the tire, T.

Once the plunger portion 14 moves the upper portion 10a of the entrapment remover 10 to an engaged position as described above, the outer peripheral portions 32a, 32b of platens 24a, 24b circumferentially engage the outboard/inboard outer sidewall surface, $T_{SW-O}/T_{SW-I}$, of the tire, T, while leaving a space S, between the outboard hub portion, $W_{H-O}$, and the inboard hub portion, $W_{H-I}$, of the wheel, W, and the upper and lower circumferential perimeters 22a, 22b of the upper and lower portions 10a, 10b of the entrapment remover 10. By leaving sufficient space S, axial movement of the wheel, W, relative the axially-fixed positioning of the platens 24a, 24b, as described below, will not result in contact between the platens 24a, 24b and the wheel, W.

The hub engagement mechanisms 28a, 28b are oscillated, respectively, according to the direction of arrows, F, F', in accordance with forces provided from one or more of the oscillating motors 26a, 26b, respectively. The forces, according to the direction of arrows, F, F', may be substantially parallel to an axis of rotation, A-A, of the tire-wheel assembly, TW. Accordingly, the working output shafts 30a, 30b and/or hub engagement mechanisms 28a, 28b work on and axially-oscillate the positioning of the wheel, W, relative the axially-fixed positioning of the platens 24a, 24b that engage the outboard/inboard outer sidewall surface, $T_{SW-O}/T_{SW-I}$, of the tire, T.

Referring to FIG. 1D, as a result of the forces applied to the wheel, W, according to the direction of the arrows, F, F', the wheel, W, is moved (relative to outer peripheral portion 32a, 32b of platens 24a, 24b) to cause the outboard/inboard outer sidewall surface, $T_{SW-O}/T_{SW-I}$, of the tire, T, to be moved away from the (outboard/inboard) bead seat, $W_{BS}$, of the wheel, W. As a result, the forces applied in the direction of the arrows, F, F', entrapments, E, such as, for example, microscopic air bubbles may be released. Upon removal of any entrapments, E, the tire-wheel assembly, TW, may be advanced to a subsequent station (not shown) for further processing (e.g., further processing including balancing the tire-wheel assembly, TW.

Referring FIGS. 2A-2B an entrapment remover 100 including an upper portion 100a and a lower portion 100b is disclosed. The entrapment remover 100 is substantially the same as the entrapment remover 10. However, the entrapment remover further includes an upper platen moving device 134a connected to the upper portion 100a of the entrapment remover 100 and a lower platen moving device 134b connected to the lower portion 100b of the entrapment remover 100. The upper and lower platen moving devices 134a, 134b may include, for example, an electric motor, a hydraulic motor, a pneumatic motor, or the like.

As described above, the oscillating motors 26a, 26b are connected to and drive the working output shafts 30a, 30b and the hub mechanism 28a, 28b for directly conducting work upon the wheel, W, by axially-moving the wheel, W, relative the tire, T. However, according to an embodiment, entrapment remover 100 operates in a different manner by utilizing the hub engagement mechanisms 128a, 128b and working output shafts 130a, 130b to clamp and hold the wheel, W, an axially-fixed orientation as the platens 124a, 124b are designed to engage and directly conduct work upon the tire, T, by axially-moving the orientation of the tire, T, relative to the axially-fixed orientation of the wheel, W. Movement of the platens 124a, 124b for axially-moving the tire, T, may be conducted by upper and lower platen moving devices 134a, 134b.

Accordingly, once the plunger portion 114 moves the upper portion 100a of the entrapment remover 100 to an engaged position, the outer peripheral portions 132a, 132b of platens 124a, 124b circumferentially engage the outboard/inboard outer sidewall surface, $T_{SW-O}/T_{SW-I}$, of the tire, T, while leaving a space S, between the outboard hub portion, $W_{H-O}$, and the inboard hub portion, $W_{H-I}$, of the wheel, W, and the upper and lower circumferential perimeters 122a, 122b of the upper and lower portions 100a, 100b of the entrapment remover 10. By leaving space S, axial movement of the platens 124a, 124b and the tire, T, relative the axially-fixed positioning of the wheel, W, as described below, will not result in contact between the platens 124a, 124b and the wheel, W.

According to an embodiment, the platens 124a, 124b are axially-moved (e.g. axially-oscillated) according to the direction of arrows, F, F', in accordance with forces provided from the platen moving devices 134a, 134b, respectively. The forces according to the direction of the arrows, F, F', may be substantially parallel to an axis of rotation, A-A, of the tire-wheel assembly, TW. Accordingly, axial movement of the platens 124a, 124b work on and axially-move/axially-oscillate the positioning of the tire, T, relative the axially-fixed positioning of the wheel, W.

Referring to FIG. 1D, the forces according to the direction of the arrows, F, F', are applied by way of outer peripheral portions 132a, 132b of platens 124a, 124b to axially-move the tire, T, to result in the outboard/inboard outer sidewall surface, $T_{SW-O}/T_{SW-I}$, of the tire, T, being moved away from the (outboard/inboard) bead seat, $W_{BS}$, of the wheel, W. As a result, the forces applied in the direction of the arrows, F, F', to the tire, T, causes the entrapments, E, such as, for example, air bubbles to be released. Upon removal of any entrapments, E, the tire-wheel assembly, TW, may be advanced to a subsequent station (not shown) for further processing (e.g., further processing including balancing the tire-wheel assembly, TW.

Accordingly, because of the relative movement caused between tire, T, and the wheel, W, contact between the outboard/inboard outer sidewall surface, $T_{SW-O}/T_{SW-I}$, of the tire, T, and the (outboard/inboard) bead seat, $W_{BS}$, of the wheel, W, is said to be at least partially interrupted. This interruption primarily is characterized by portions of the outboard/inboard outer sidewall surface, $T_{SW-O}/T_{SW-I}$, of the tire, T, being temporarily pulled away from the seating surface of the (outboard/inboard) bead seat, $W_{BS}$, of the wheel, W. By axially moving the tire, T, or wheel, W, while holding the other in an axially-fixed relationship in this way, any entrapments, E, such as, for example, air bubbles, that may be entrapped between the outboard/inboard outer sidewall surface, $T_{SW-O}/T_{SW-I}$, of the tire, T, and the (outboard/inboard) bead seat, $W_{BS}$, of the wheel, W, is/are released.

According to an embodiment, the first and/or second vacuum devices 18a, 18b/118a, 118b may be activated when the tire, T, or the wheel, W, is axially-moved as described above. As seen in FIG. 1D, a vacuum, V, may be applied by the first and/or second vacuum devices 18a, 18b/118a, 118b to aid in the evacuation of entrapments, E, for example, air bubble, lubricants, contaminants, or the like. Additionally, the vacuum, V, may assist in the positive seating of the outboard/inboard outer sidewall surface, $T_{SW-O}/T_{SW-I}$, of the tire, T, adjacent the (outboard/inboard) bead seat, $W_{BS}$, of the wheel, W prior to balancing the tire-wheel assembly, TW. It will be appreciated that by applying the vacuum, V, in the chamber defined by the platens 24a, 24b/124a, 124b and a portion of the outboard/inboard outer sidewall surface, $T_{SW-O}/T_{SW-I}$, of the tire, T, proximate the (outboard/inboard) bead seat, $W_{BS}$, of the wheel, W, any entrapped air, lubricant, or contaminants between the outboard/inboard outer sidewall surface, $T_{SW-O}/T_{SW-I}$, of the tire, T, and the (outboard/inboard) bead seat, $W_{BS}$, of the wheel, W may be more easily evacuated than in the case where no vacuum, V, is applied.

Figure 3:
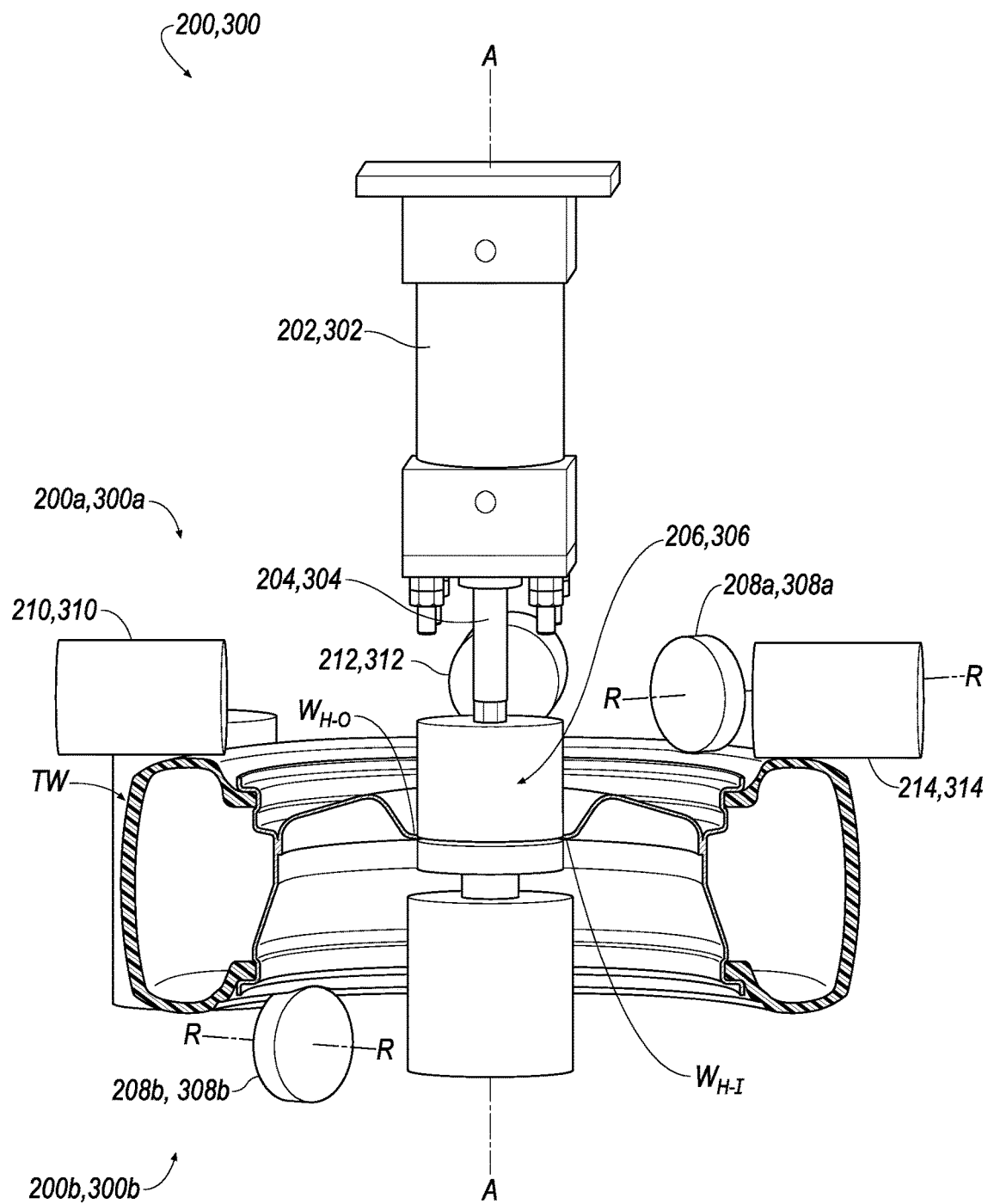
FIG. 3 is a perspective, partial cross-sectional view of an exemplary tire/wheel assembly and a tire/wheel bead entrapment remover.

Referring to FIG. 3, an entrapment remover is shown generally at 200 according to an embodiment and includes an upper portion 200a and a lower portion 200b. Although shown in an abstract form in FIG. 3, the upper portion 200a of the entrapment remover 200 may be supported by the station 50, and, the lower portion 200b of the entrapment remover 200 may be connected to the upper support surface of the station 50 or the surface 76 of the wheeled cart 75.

The entrapment remover 200 generally includes a rotary motor 202, a rotary output shaft 204 and a hub engagement mechanism 206. The hub engagement mechanism 206 is effective for connecting the rotary output shaft 204 to the outboard hub portion, $W_{H-O}$, and the inboard hub portion, $W_{H-I}$, of the wheel, W.

The entrapment remover 200 also includes at least one pulling wheel 208a, 208b. As illustrated, the pulling wheel 208a engages the outboard outer sidewall surface, $T_{SW-O}$, of the tire, T, and the pulling wheel 208b engages the inboard outer sidewall surface, $T_{SW-I}$, of the tire, T. The pulling wheels 208a, 208b are manipulated to engage the outboard/inboard outer sidewall surface, $T_{SW-O}/T_{SW-I}$, of the tire, T, respectively, generally proximate the (outboard/inboard) bead seat, $W_{BS}$, of the wheel, W.

Figure 4A:
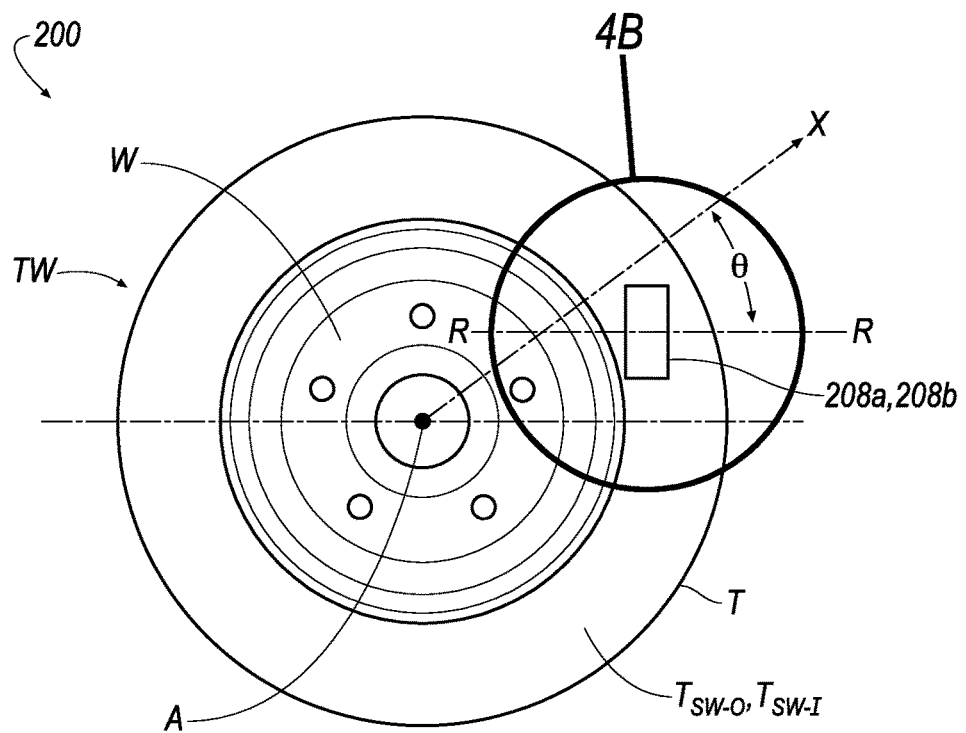
FIG. 4A is a top view of an exemplary method of utilizing the tire/wheel assembly and the tire/wheel bead entrapment remover of FIG. 3.

As illustrated in FIGS. 3 and 4A, a radial axis, R-R, extends through the pulling wheels 208a, 208b and defines the axis of rotation of wheels 208a, 208b. An axle (not shown) may be aligned with the radial axis, R-R. As illustrated, the radial axis, R-R, traverses a radial line, X, which is shown radially extending from the axis of rotation, A-A, of the tire-wheel assembly, TW (see, e.g., FIG. 4A).

According to an embodiment, the radial axis, R-R, is substantially misaligned with the radial line, X, and does not pass through the axis of rotation, A-A. By radially misaligning radial axis, R-R, with the radial line, X, the intersection of the radial axis, R-R, and the radial line, X, creates an offset angle, θ.

Figure 4B:
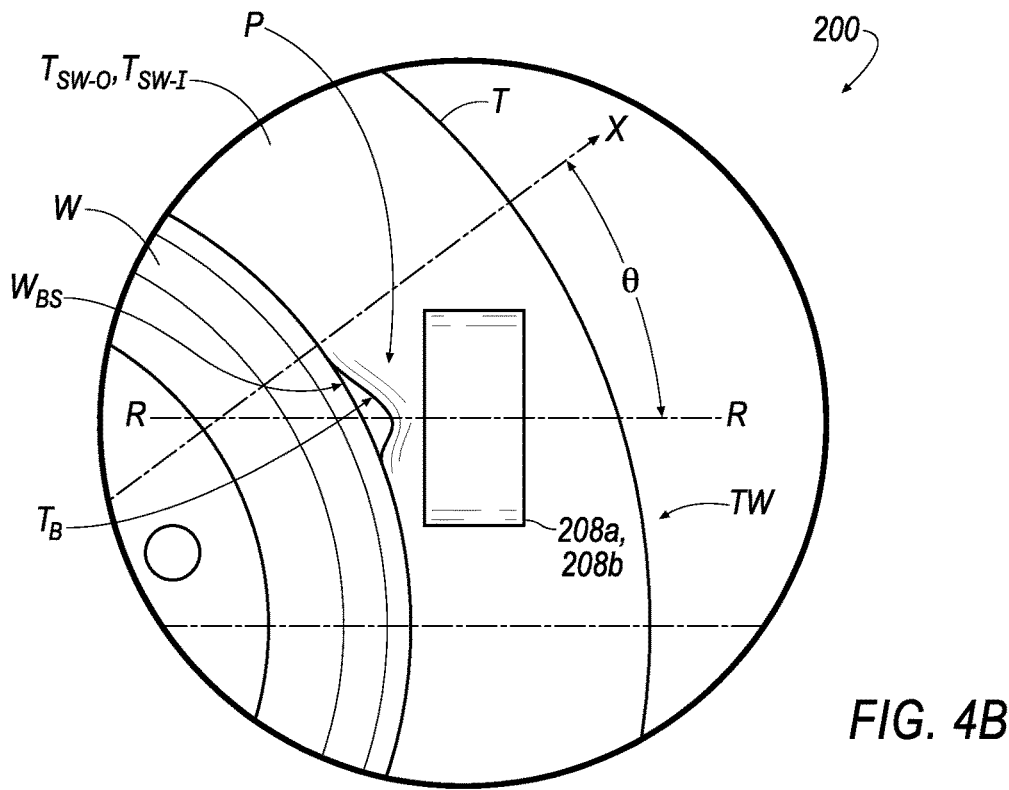
FIG. 4B is an enlarged top view of the tire/wheel assembly and the tire/wheel bead entrapment remover of FIG. 4A.

Accordingly, as seen in FIG. 4B, by setting the radial axis, R-R, of the pulling wheel 208a, 208b in the manner described above, when tire-wheel assembly, TW, is rotated by the rotary motor 202, the pulling wheel 208a, 208b provides a "pulling effect," P, on the outboard/inboard outer sidewall surface, $T_{SW-O}/T_{SW-I}$, of the tire, T, proximate the (outboard/inboard) bead seat, $W_{BS}$, of the wheel, W. By pulling, P, the outboard/inboard outer sidewall surface, $T_{SW-O}/T_{SW-I}$, of the tire, T, in this way during rotation of the tire-wheel assembly, TW, the interface surfaces between the outboard/inboard outer sidewall surface, $T_{SW-O}/T_{SW-I}$, of the tire, T, and the (outboard/inboard) bead seat, $W_{BS}$, of the wheel, W, is temporarily disrupted, thereby releasing any entrapments, E, such as, for example, air bubbles, therebetween. Although not illustrated, vacuums 18a, 18b/118a, 118b may be included as shown in FIGS. 1A, 1B and 2A, 2B to aid in the removal of lubricants, contaminants, or the like. Thus, the tire-wheel entrapment remover 200 removes any entrapments, E, between the outboard/inboard outer sidewall surface, $T_{SW-O}/T_{SW-I}$, of the tire, T, and the (outboard/inboard) bead seat, $W_{BS}$, of the wheel, W, prior to balancing the tire-wheel assembly, TW.

Figure 5A:
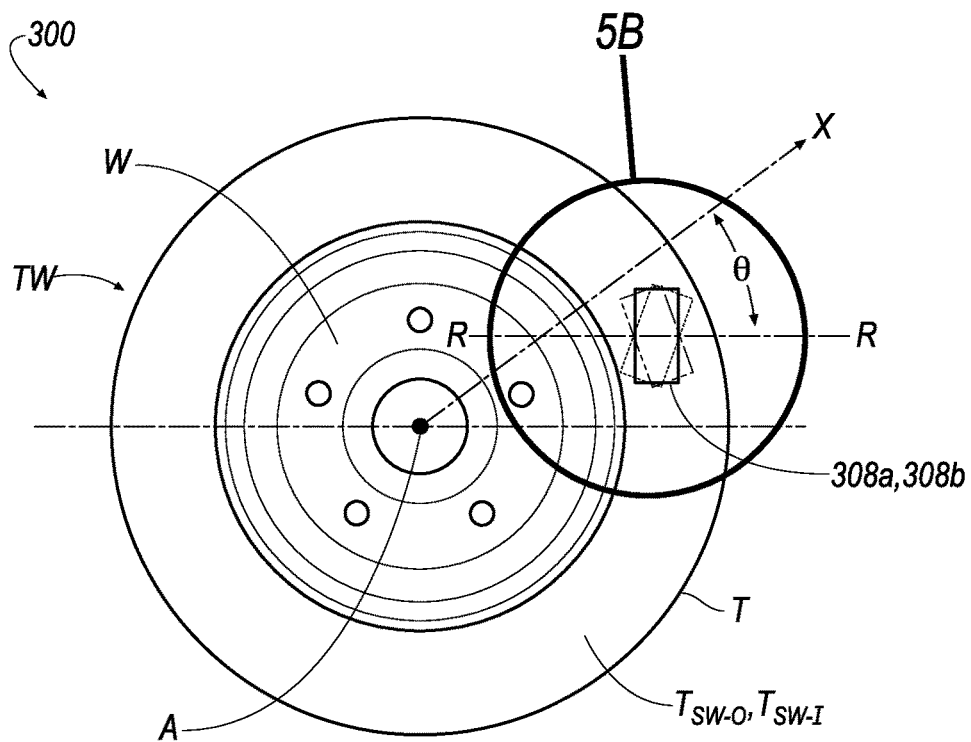
FIG. 5A is a top view of an exemplary method of utilizing the tire/wheel assembly and a tire/wheel bead entrapment remover.
Figure 5B:
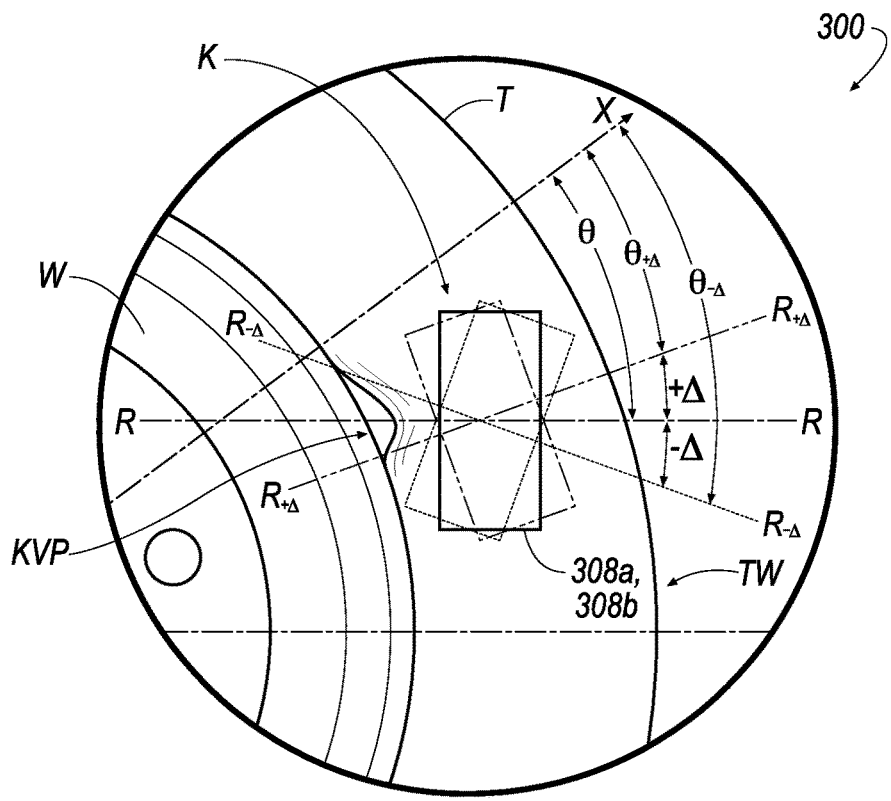
FIG. 5B is an enlarged top view of the tire/wheel assembly and the tire/wheel bead entrapment remover of FIG. 5A according to encircled portion 5B.

Referring to FIGS. 3 and 5A-5B, an entrapment remover is shown generally at 300 according to an embodiment. The entrapment remover 300 is substantially the same as that shown and described in FIGS. 3-4B except that the wheel 308a, 308b includes additional functionality beyond that of a single (pulling) effect that is associated with the pulling wheel 208a, 208b; accordingly, in an embodiment, the wheel 308a, 308b of the entrapment remover 300 may be alternatively referred to as a "wobble-wheel" that imparts an active "kneading, vibration and pulling" effect, KVP, upon the outboard/inboard outer sidewall surface, $T_{SW-O}/T_{SW-I}$, of the tire, T, proximate the (outboard/inboard) bead seat, $W_{BS}$, of the wheel, W. Accordingly, the wobble wheel 308a, 308b may be alternatively referred to as a kneading/pulling/vibration wheel.

The kneading/pulling/vibration-wheel 308a, 308b is not snuggly fit to the radial axis, R-R, like the pulling wheel 208a, 208b, but, rather, the kneading/pulling/vibration-wheel 308a, 308b is loosely-fitted about the radial axis, R-R. By loosely-fitting the kneading/pulling/vibration-wheel 308a, 308b relative the radial axis, R-R, the kneading/pulling/vibration-wheel 308b, 308b is allowed to "wander"/"wobble"/"knead," K, the outboard/inboard outer sidewall surface, $T_{SW-O}/T_{SW-I}$, of the tire, T, proximate the (outboard/inboard) bead seat, $W_{BS}$, of the wheel, W and deviate angularly +/− between bounds defined by deviation angle, +Δ, −Δ (see, e.g., FIG. 5B), relative to angle, θ. Further, when the tire-wheel assembly, TW, is rotated by the rotary motor 302, the kneading/pulling/vibration wheel 308a, 308b not only rotates about axis R-R (as described in conjunction with FIGS. 4A and 4B), it also wanders/wobbles/kneads, K, the outboard/inboard outer sidewall surface, $T_{SW-O}/T_{SW-I}$, of the tire, T, proximate the (outboard/inboard) bead seat, $W_{BS}$, of the wheel, W, between +/−Δ. The deviation angle, +Δ, shifts the radial axis from that shown at, R-R, to a radial axis, $R_{+\Delta}$-$R_{+\Delta}$, that correlates to an angle, $\theta_{+\Delta}$. The deviation angle, −Δ, shifts the radial axis from that shown at, R-R, to a radial axis, $R_{-\Delta}$-$R_{-\Delta}$, that correlates to an angle, $\theta_{-\Delta}$.

Accordingly, the wandering/wobbling/kneading effect, K, will introduce an actively dynamic vibration, pulling, and other disruptive forces, which is shown generally at KVP. The kneading, vibration and pulling force, KVP, would otherwise not be present if kneading/pulling/vibration wheel 308a, 308b was tightly affixed to the radial axis, R-R, as shown and described in FIGS. 3-4B. Although the deviation angle, +Δ, −Δ, permits the radial axis, R-R, to the radial axis, $R_{+\Delta}$-$R_{+\Delta}$ or $R_{-\Delta}$-$R_{-\Delta}$, to change its orientation relative the radial line, X, it will be appreciated that the deviation angle, +Δ, −Δ, may be controlled to not permit the radial axis, $R_{+\Delta}$-$R_{+\Delta}$ or $R_{-\Delta}$-$R_{-\Delta}$, to pass through the axis of rotation, A-A.

Although the term "kneading" (i.e., in association with the "kneading effect," K) is typically associated with the preparation of foodstuff dough that is subsequently baked into bread, a force associated with term "kneading" is applied in a substantially similar fashion in the processing of the tire-wheel assembly, TW. For example, the kneading/pulling/vibration wheel 308a, 308b may be actively pressed into the outboard/inboard outer sidewall surface, $T_{SW-O}/T_{SW-I}$, of the tire, T, and actively twisted/rotated relative to the outboard/inboard outer sidewall surface, $T_{SW-O}/T_{SW-I}$, of the tire, T. Thus, the "pressing-into and twisting/rotating" results in the kneading/pulling/vibration disruptive forces, KVP, arising from the kneading effect, K, will upset the connection of the outboard/inboard outer sidewall surface, $T_{SW-O}/T_{SW-I}$, of the tire, T, proximate the (outboard/inboard) bead seat, $W_{BS}$, of the wheel, W.

By providing the disruptive forces, KVP, associated with the kneading effect, K, the outboard/inboard outer sidewall surface, $T_{SW-O}/T_{SW-I}$, of the tire, T, during rotation of the tire-wheel assembly, TW, temporarily disrupts the interface between the outboard/inboard outer sidewall surface, $T_{SW-O}/T_{SW-I}$, of the tire, T, proximate the (outboard/inboard) bead seat, $W_{BS}$, of the wheel, W, thereby releasing any entrapments, E, such as, for example, air bubbles, therebetween. Although not illustrated at FIG. 3, vacuum sources 18a, 18b/118a, 118b may be included in order to remove lubricants, contaminants, or the like. Thus, the tire-wheel entrapment remover 300 removes any entrapments, E, between the outboard/inboard outer sidewall surface, $T_{SW-O}/T_{SW-I}$, of the tire, T, and the (outboard/inboard) bead seat, $W_{BS}$, of the wheel, W, prior to balancing the tire-wheel assembly, TW.

According to an embodiment, the entrapment removers 200, 300 may include optional rollers 210, 310, 212, 312, 214, 314 that can be used to steady the overall movement of tire-wheel assembly, TW, during rotation by the rotary motor 202, 302, the rotary output shaft 204, 304 and the hub engagement mechanism 206, 306. Additionally, according to an embodiment, the rollers 210, 310, 212, 312, 214, 314 can be attached to a drive motor and can be used to rotate tire-wheel assembly, TW. Although the rollers 210, 310, 212, 312, 214, 314 are shown engaging the outboard outer sidewall surface, $T_{SW-O}$, of the tire, T, it will be appreciated that rollers 210, 310, 212, 312, 214, 314 may be applied alone or in combination proximate the inboard outer sidewall surface, $T_{SW-I}$, of the tire, T.

Although the wheels 208a, 208b, 308a, 308b and the rollers 210, 310, 212, 312, 214, 314 are shown in abstract form in FIG. 3, the wheels 208a, 208b, 308a, 308b and the rollers 210, 310, 212, 312, 214, 314 may be connected to supporting/carrying structure (not shown, but substantially similar to the platen 24a, 124a of the upper portions 10a, 100a of the entrapment removers 10, 100 that is supported by the station 50 and/or the platen 24b, 124b of the lower portions 10b, 100b of the entrapment removers 10, 100 that is supported by the wheeled cart 75). Accordingly, although the wheels 208a, 208b, 308a, 308b and the rollers 210, 310, 212, 312, 214, 314 are illustrated in connection with structure in FIG. 3, it will be appreciated by one skilled in the art that the wheels 208a, 208b, 308a, 308b and the rollers 210, 310, 212, 312, 214, 314 may be connected to and supported by any desirable underlying structure that permits the wheels 208a, 208b, 308a, 308b and the rollers 210, 310, 212, 312, 214, 314 to behave as shown and discussed above at FIGS. 4A-4B and 5A-5B.

Figure 6:
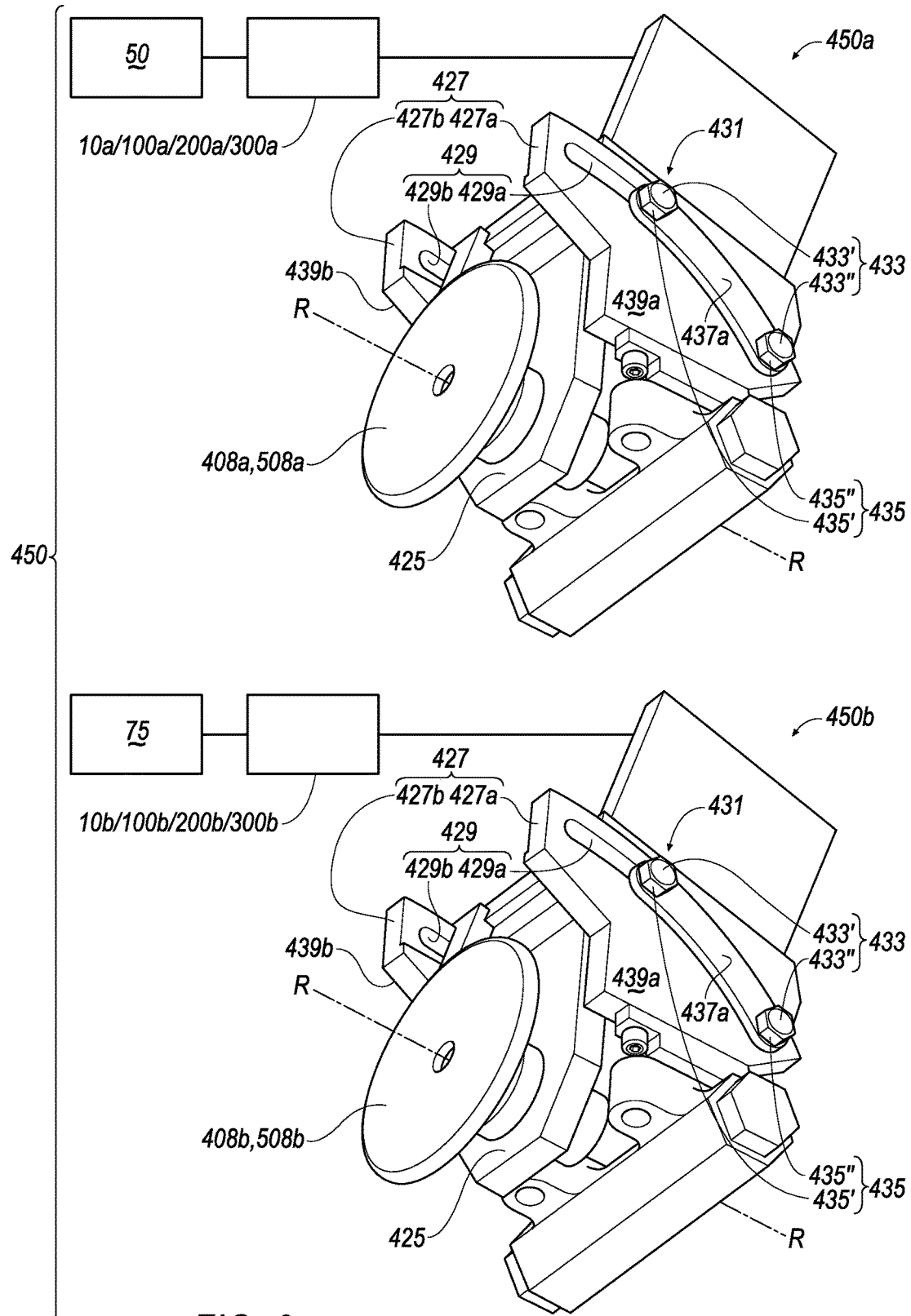
FIG. 6 is a perspective view of an exemplary bead seater assembly.

Referring to FIG. 6, a pair of assemblies 450 is shown according to an embodiment. The assembly 450a of the pair of assemblies 450 may be referred to as an "upper" assembly and the assembly 450b of the pair of assemblies 450 may be referred to as a "lower" assembly.

The upper assembly 450a may be attached to, for example, the platen 24a, 124a of the upper portions 10a, 100a of the entrapment removers 10, 100 that is supported by the station 50. The lower assembly 450b may be attached to, for example, the platen 24b, 124b of the lower portions 10b, 100b of the entrapment removers 10, 100 that is supported by the wheeled cart 75.

In an alternative embodiment, as seen in FIGS. 7A-7C and 9A-9C, the upper assembly 450a may be attached to, for example, a robotic arm 475. In an embodiment, the robotic arm 475 may be attached to and extend from the station 50 (e.g., the robotic arm 475 may be attached to and extend from the horizontal support portion 56 of the station 50). Alternatively, the robotic arm 475 may extend from an underlying ground surface (not shown).

Referring back to FIG. 6, each of the upper assembly 450a and the lower assembly 450b respectively includes a wheel 408a, 408b/508a, 508b. When the wheel 408a, 408b/508a, 508b is disposed adjacent the outboard/inboard outer sidewall surface, $T_{SW-O}/T_{SW-I}$, of the tire, T, the wheel 408a, 408b/508a, 508b may function in a substantially similar fashion as shown and described above at FIGS. 4B, 5B such that the wheel 408a, 408b/508a, 508b upsets the relationship of the tire-wheel assembly, TW, proximate the bead seat, $W_{BS}$, of the wheel, W, such that entrapments, E, may be permitted to be removed from the tire-wheel assembly, TW. After the wheel 408a, 408b/508a, 508b upsets the relationship of the tire-wheel assembly, TW, proximate the bead seat, $W_{BS}$, of the wheel, W, one or more of the upper assembly 450a and the lower assembly 450b may include/cooperate with a vacuum, V (arising from, e.g., first and/or second vacuum devices 18a, 18b/118a, 118b), in order to assist in the evacuation of the one or more entrapments, E.

As seen in FIG. 6, each of the upper assembly 450a and the lower assembly 450b may include a body 425 that rotatably-supports the wheel, 408a, 408b/508a, 508b about a radial axis, R-R. The radial axis, R-R, is similar to the radial axis, R-R, seen in FIGS. 4A-4B and 5A-5B.

A pair of side brackets 427 may be attached to/connected to the body 425. The pair of side brackets 427 includes a first side bracket 427a and a second side bracket 427b.

A pair of arcuate channels is shown at 429. The pair of arcuate channels 429 includes a first arcuate channel 429a and a second arcuate channel 429b. The first side bracket 427a forms the first arcuate channel 429a. The second side bracket 427b forms the second arcuate channel 429b.

The body 425 is pivotably-connected to the pair of side brackets 427 by a connection assembly 431 in order to permit a pivotable adjustment, +β/−β (see, e.g., FIGS. 8A-8C and 10A-10E), of the wheel, 408a, 408b/508a, 508b. The connection assembly 431 may include, for example: a pair of pins 433, a first and second pair of nuts 435 and a pair of flanges (i.e., a first flange 437a of the pair of flanges is only shown due to the perspective view of FIG. 6).

The connection assembly 431 may connect the body 425 and the pair of side brackets 427 as described in the following embodiment. First, the first flange 437a of the pair of flanges is disposed adjacent a first outer side surface 439a of the first side bracket 427a and the second flange (not shown) of the pair of flanges is disposed adjacent the second outer side surface 439b of the pair of side brackets 427. Then, a first pin 433' of the pair of pins 433 is inserted: (1) through a passage (not shown) formed in a first end of the first flange 437a, (2) through the first arcuate channel 429a formed by the first side bracket 427a, (3) through a first passage (not shown) formed in the body 425, (3) through the second arcuate channel 429b formed by the second side bracket 427b and (4) through a passage (not shown) formed in a first end of the second flange (not shown). Then, a second pin 433" of the pair of pins 433 is inserted: (1) through a passage (not shown) formed in a second end of the first flange 437a, (2) through the first arcuate channel 429a formed by the first side bracket 427a, (3) through a second passage (not shown) formed in the body 425, (3) through the second arcuate channel 429b formed by the second side bracket 427b and (4) through a passage (not shown) formed in a second end of the second flange (not shown). Once the first pin 433' and the second pin 433" are arranged as described above, a first nut 435' of each of the first and second pair of nuts 435 may be attached to first and second ends of the first pin 433', and, a second nut 435" of each of the first and second pair of nuts 435 may be attached to the first and second ends of the second pin 433".

Figure 7A:
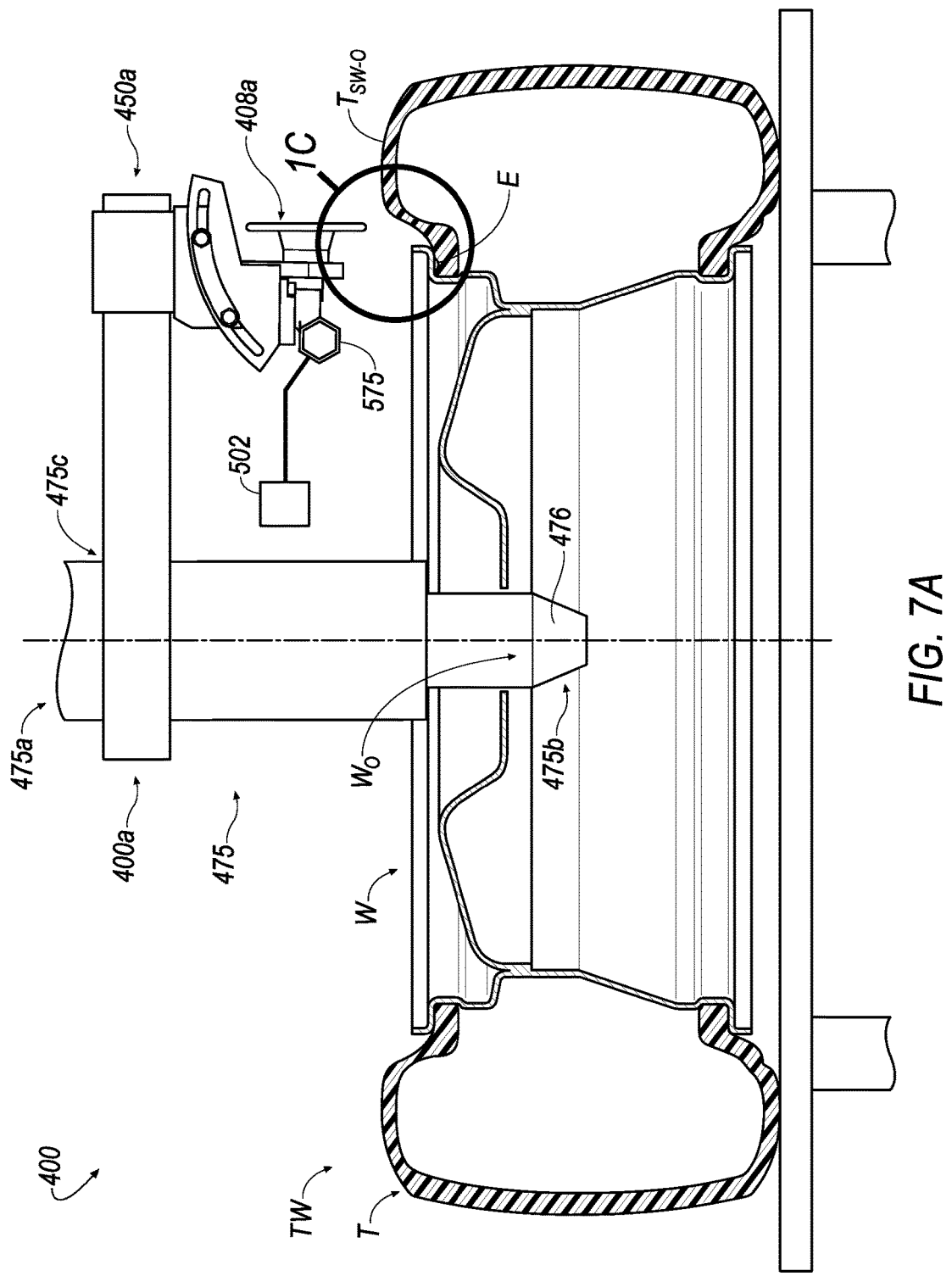
FIGS. 7A-7C are side views of the bead seater assembly of FIG. 6.
Figure 7B:
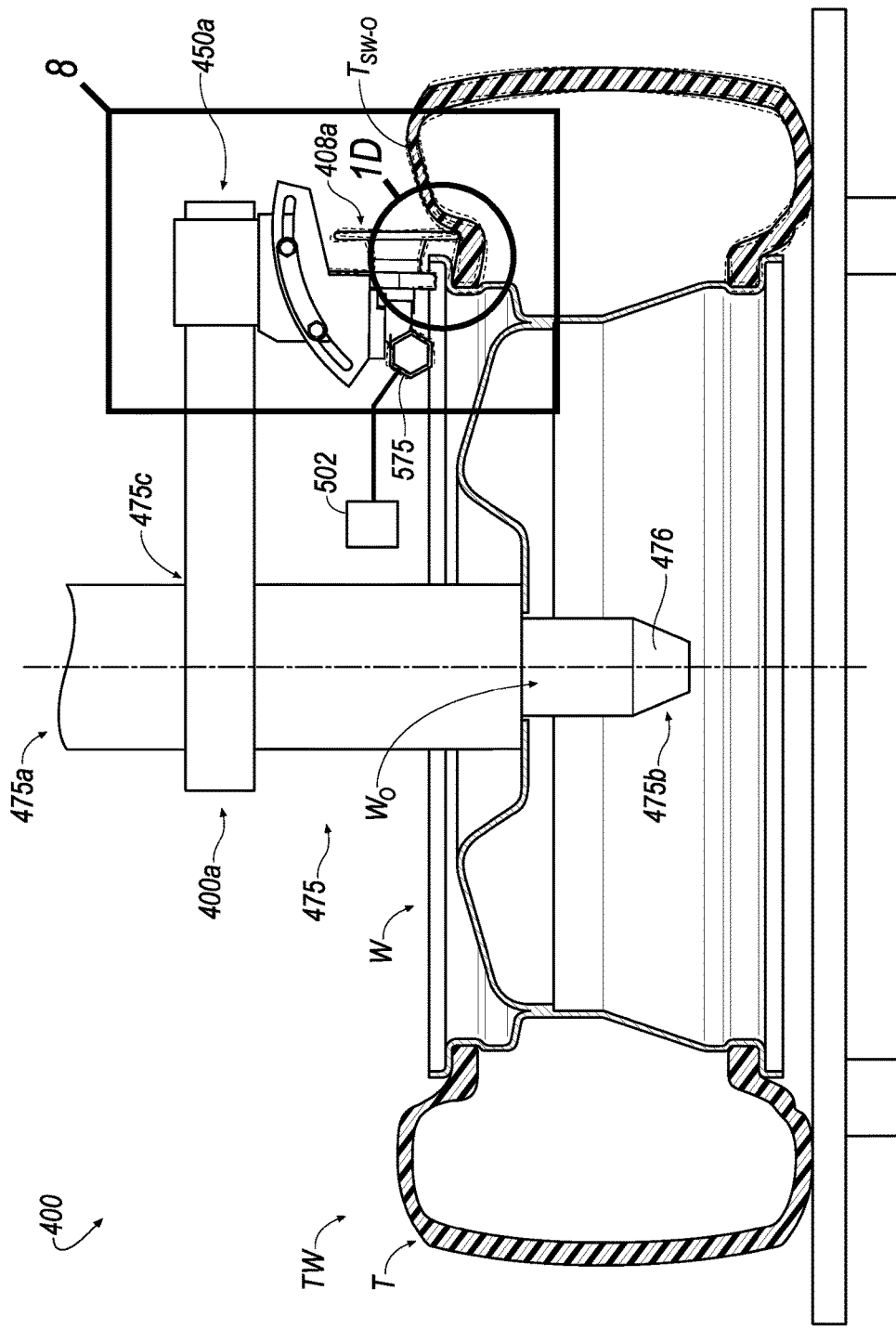
Figure 7C:
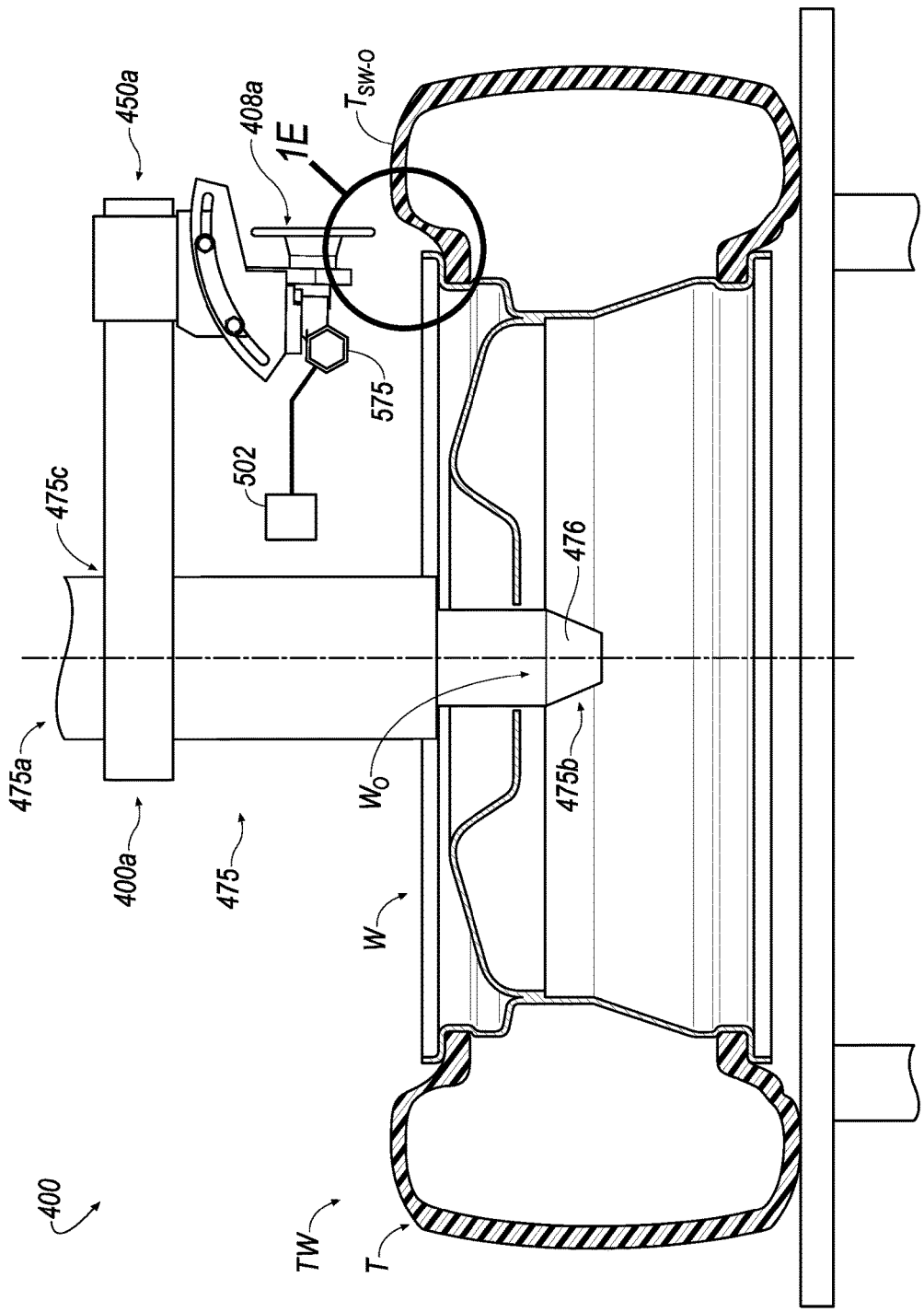

Referring to FIGS. 7A-7C, an entrapment remover is shown generally at 400 according to an embodiment. The entrapment remover 400 includes an upper portion 400a. The upper portion 400a may be attached to the robotic arm 475. The upper assembly 450a including the wheel 408a is attached to the upper portion 400a of the entrapment remover 400.

A first end 475a of the robotic arm 475 may be attached to and extend from the station 50 (e.g., the first end 475a of the robotic arm 475 may be attached to and extend from the horizontal support portion 56 of the station 50). Alternatively, the first end 475a of the robotic arm 475 may extend from an underlying ground surface (not shown). The second end 475b of the robotic arm 475 may terminate with/may include an end effecter or head portion 476 that may be selectively coupled to/selectively interfaced with the tire-wheel assembly, TW. The upper portion 400a may include a member (e.g., a body or beam) that may be attached to an intermediate portion 475c of the robotic arm 475 that is located between a first end 475a and a second end 475b of robotic arm 475.

Referring to FIG. 7A, the robotic arm 475 may be initially arranged in a disengaged position with respect to the tire-wheel assembly, TW (e.g., the wheel 408a is not in contact with the outboard outer sidewall surface, $T_{SW-O}$, of the tire, T, and, the head portion 476 is not directly contacting/interfaced with an axial opening, $W_O$, formed by the wheel, W). Referring to FIG. 7B, the robotic arm 475 is subsequently arranged in an engaged position with respect to the tire-wheel assembly, TW (e.g., the wheel 408a contacts the outboard outer sidewall surface, $T_{SW-O}$, of the tire, T, and, the head portion 476 directly contacts/is interfaced with an axial opening, $W_O$, formed by the wheel, W). Referring to FIG. 7C, after removing the one or more entrapments, E (see, e.g., FIGS. 1C and 7A), of the tire-wheel assembly, TW, the robotic arm 475 may be returned to the disengaged position (from the engaged position of FIG. 7B) with respect to the tire-wheel assembly, TW (e.g., the wheel 408a is retracted with the robotic arm 475 such that the wheel 408a is no longer in contact with the outboard outer sidewall surface, $T_{SW-O}$, of the tire, T, and, the head portion 476 is not directly contacting/interfaced with the axial opening, $W_O$, formed by the wheel, W). Movement of the robotic arm 475 to/from the engaged and disengaged positions may be conducted by, for example, a prime mover (not shown) connected to the robotic arm 475.

Figure 8A:
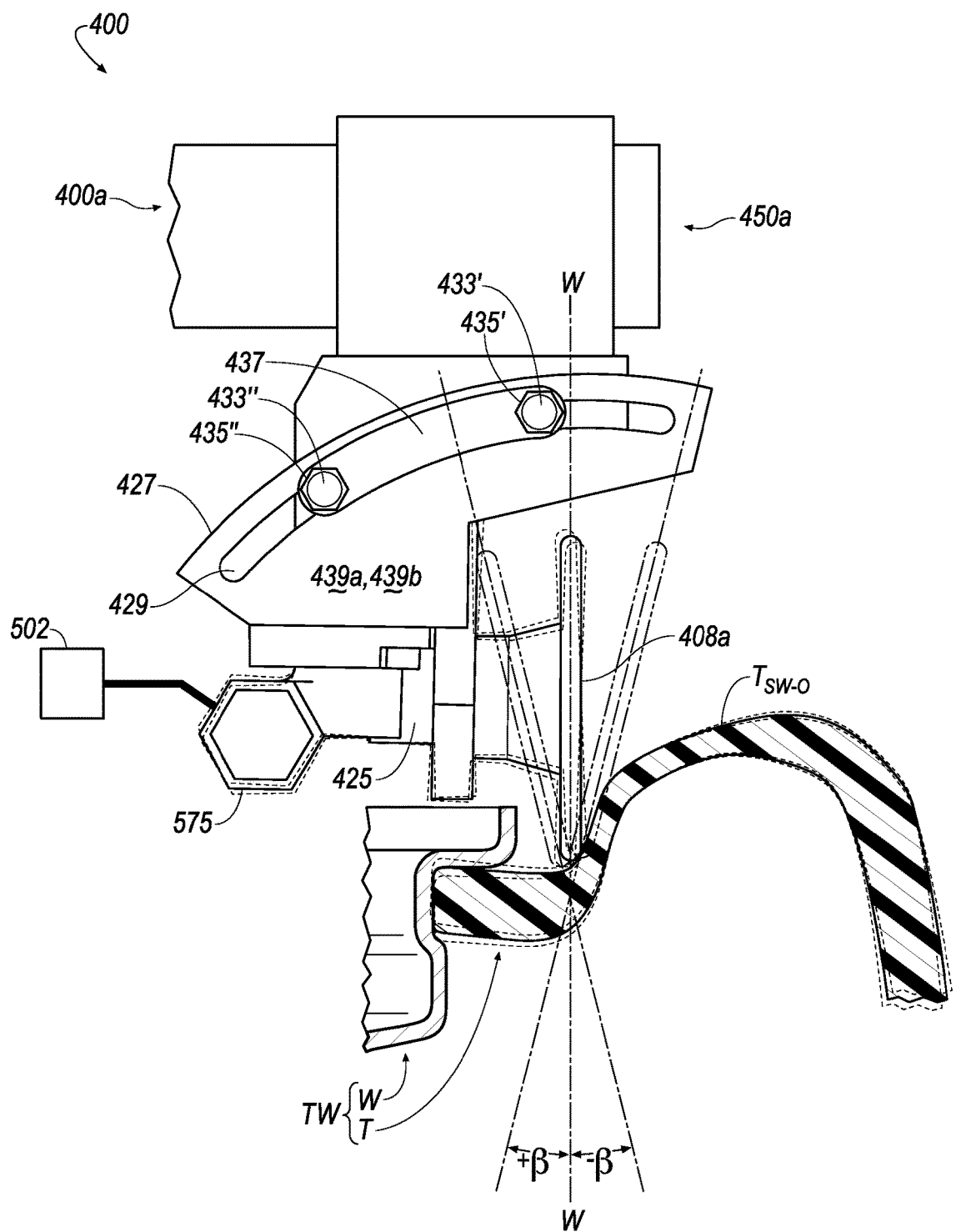
FIGS. 8A-8C are enlarged views of the bead seater assembly according to line 8 of FIG. 7B.
Figure 8B:
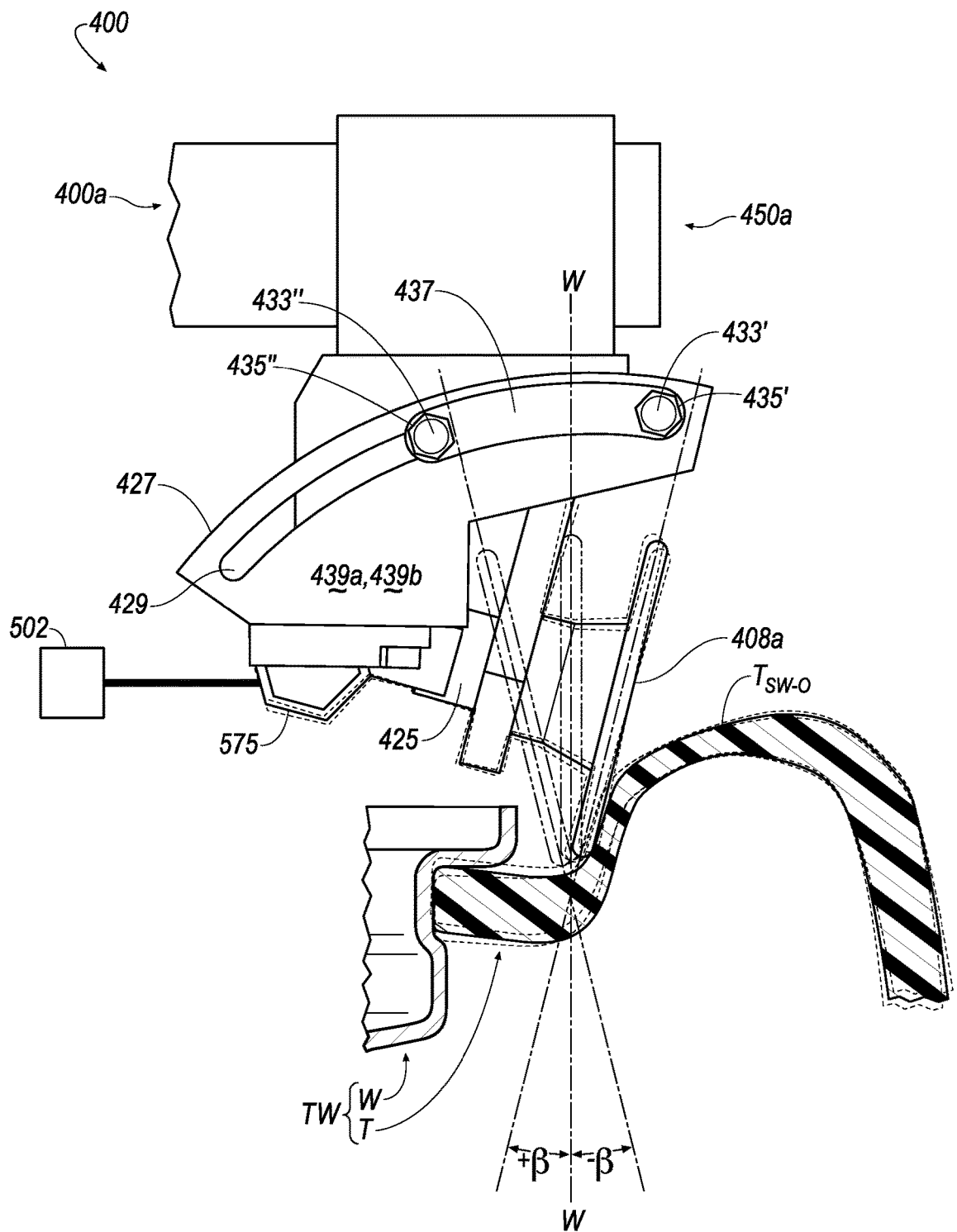
Figure 8C:
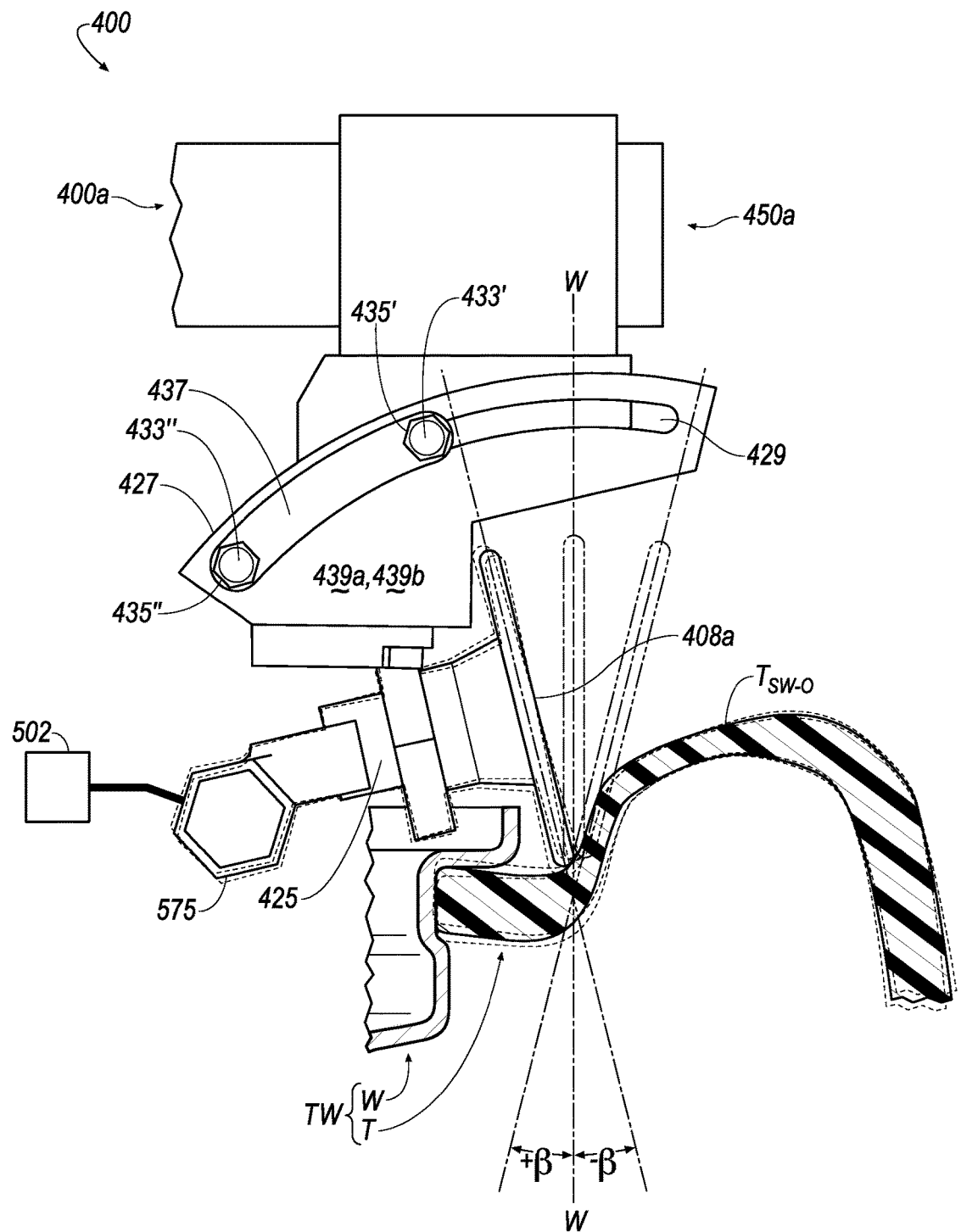
Figure 9A:
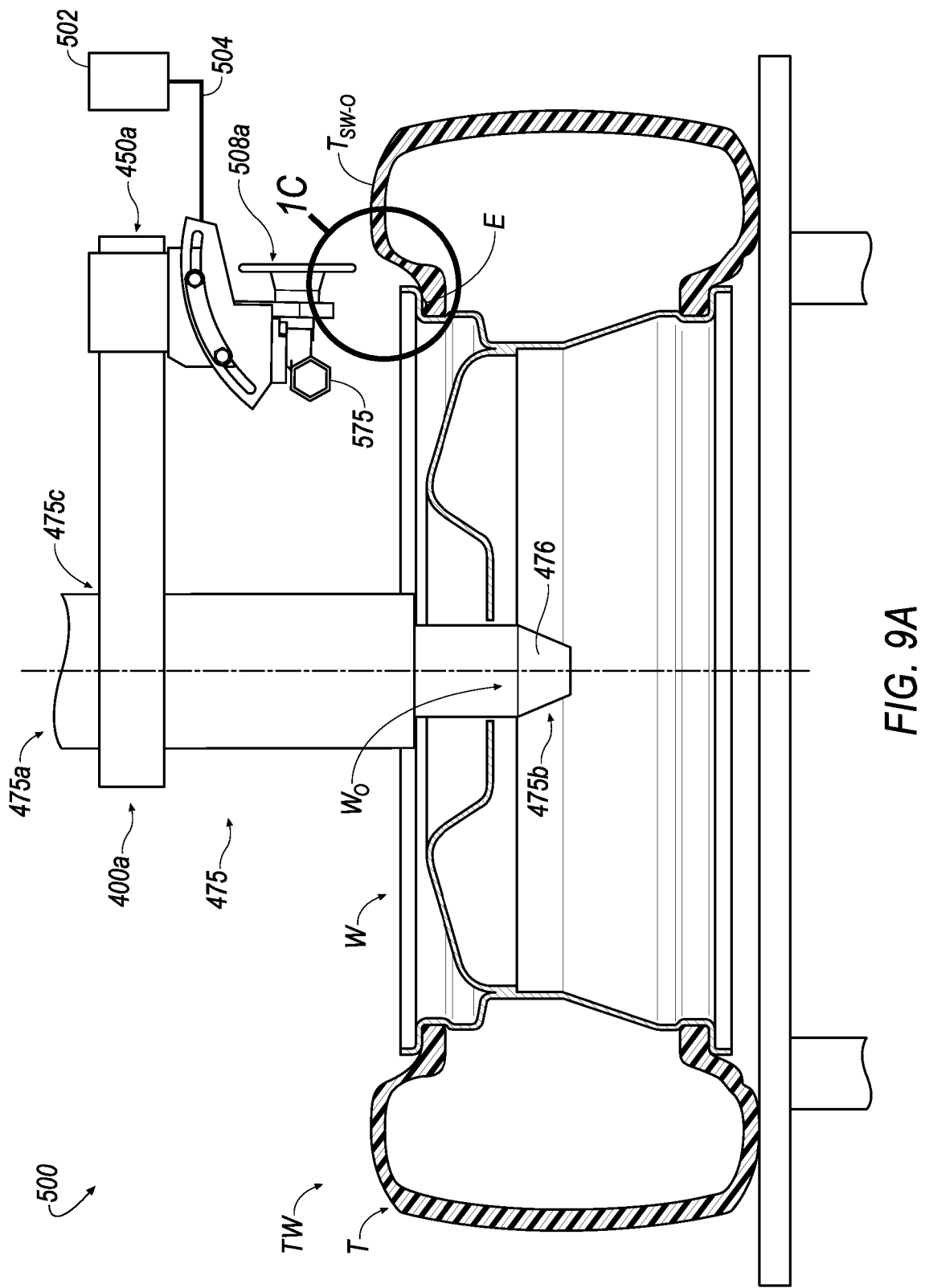
FIGS. 9A-9C are side views of an exemplary bead seater assembly.
Figure 9B:
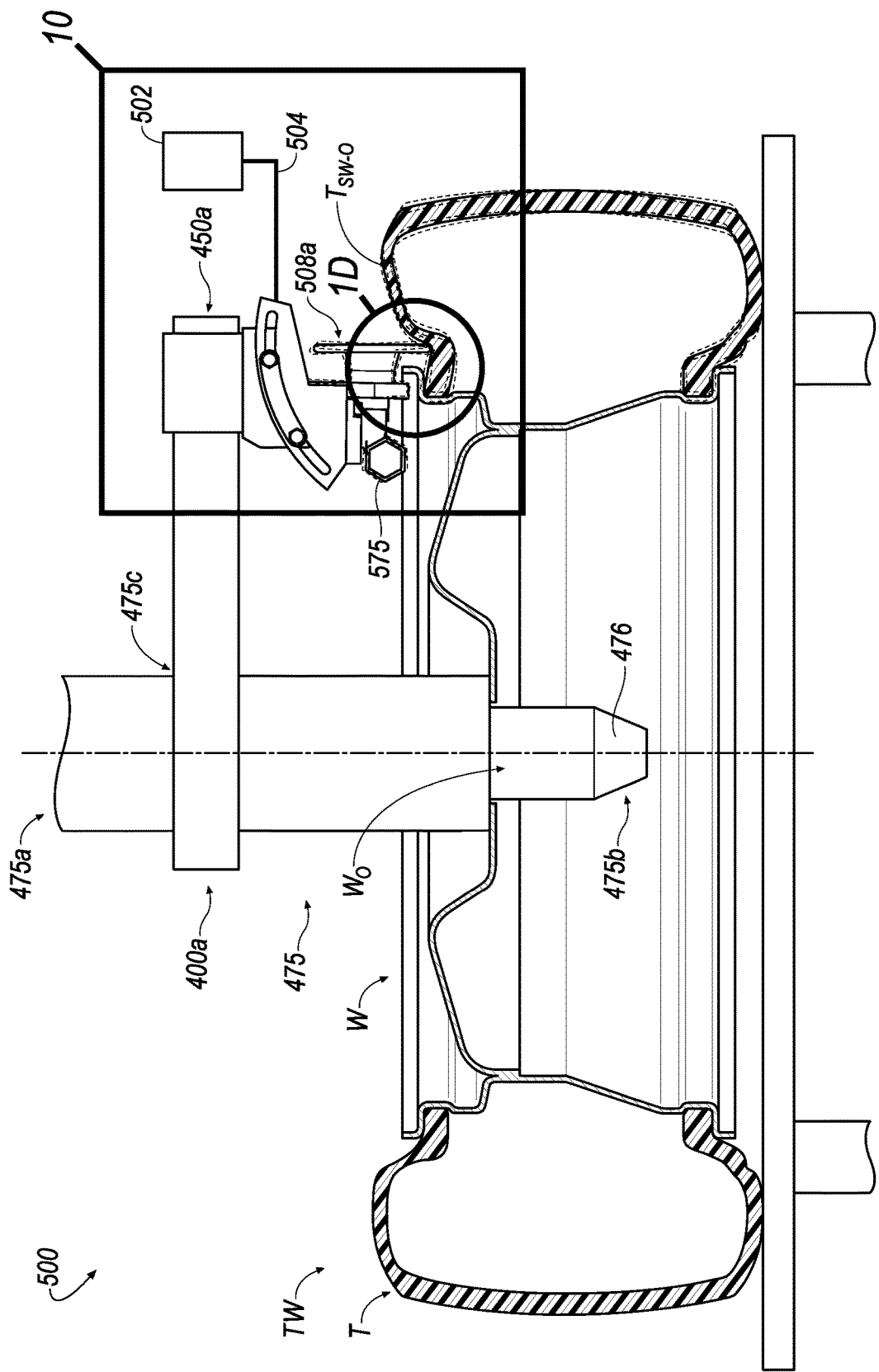
Figure 9C:
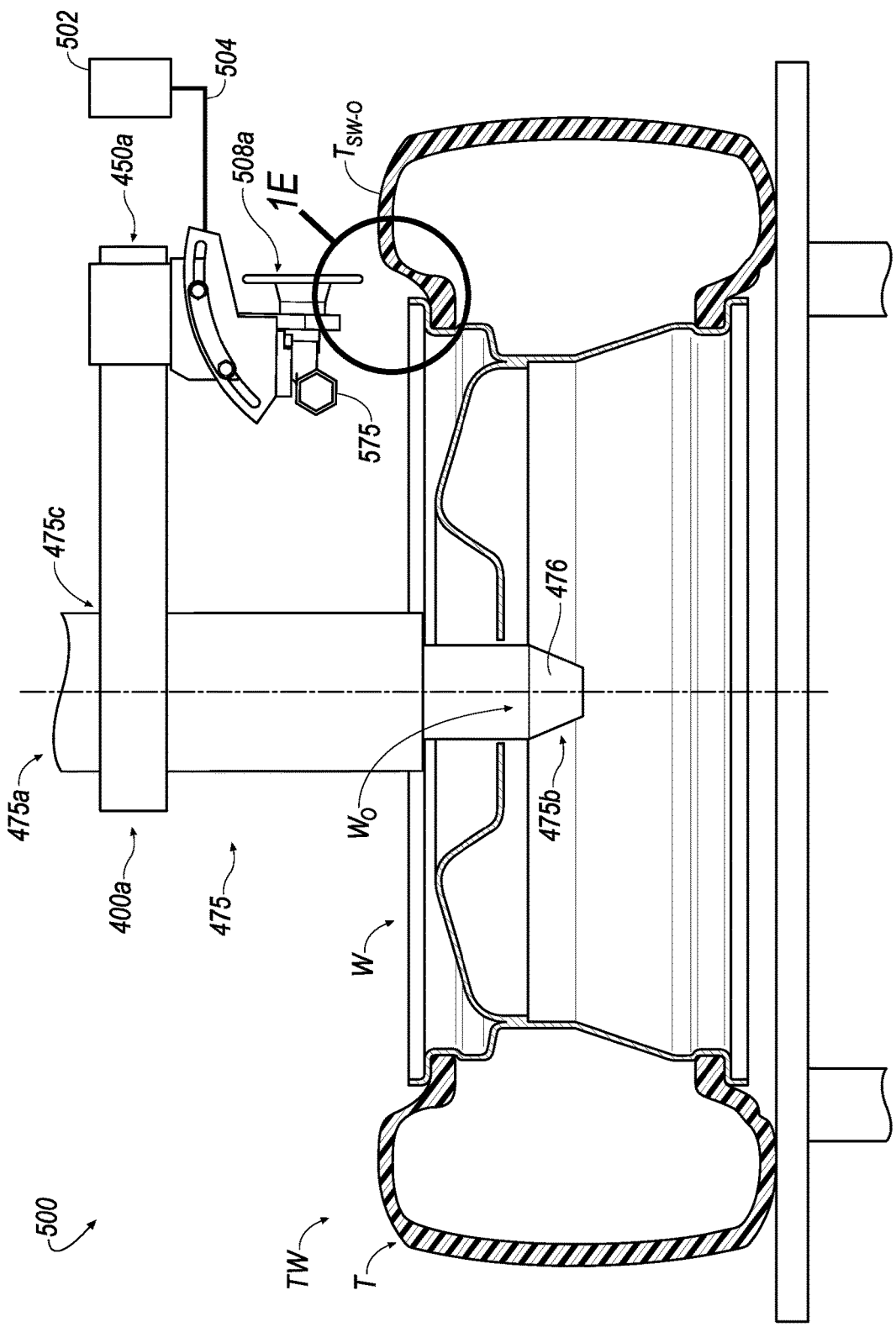
Figure 10A:
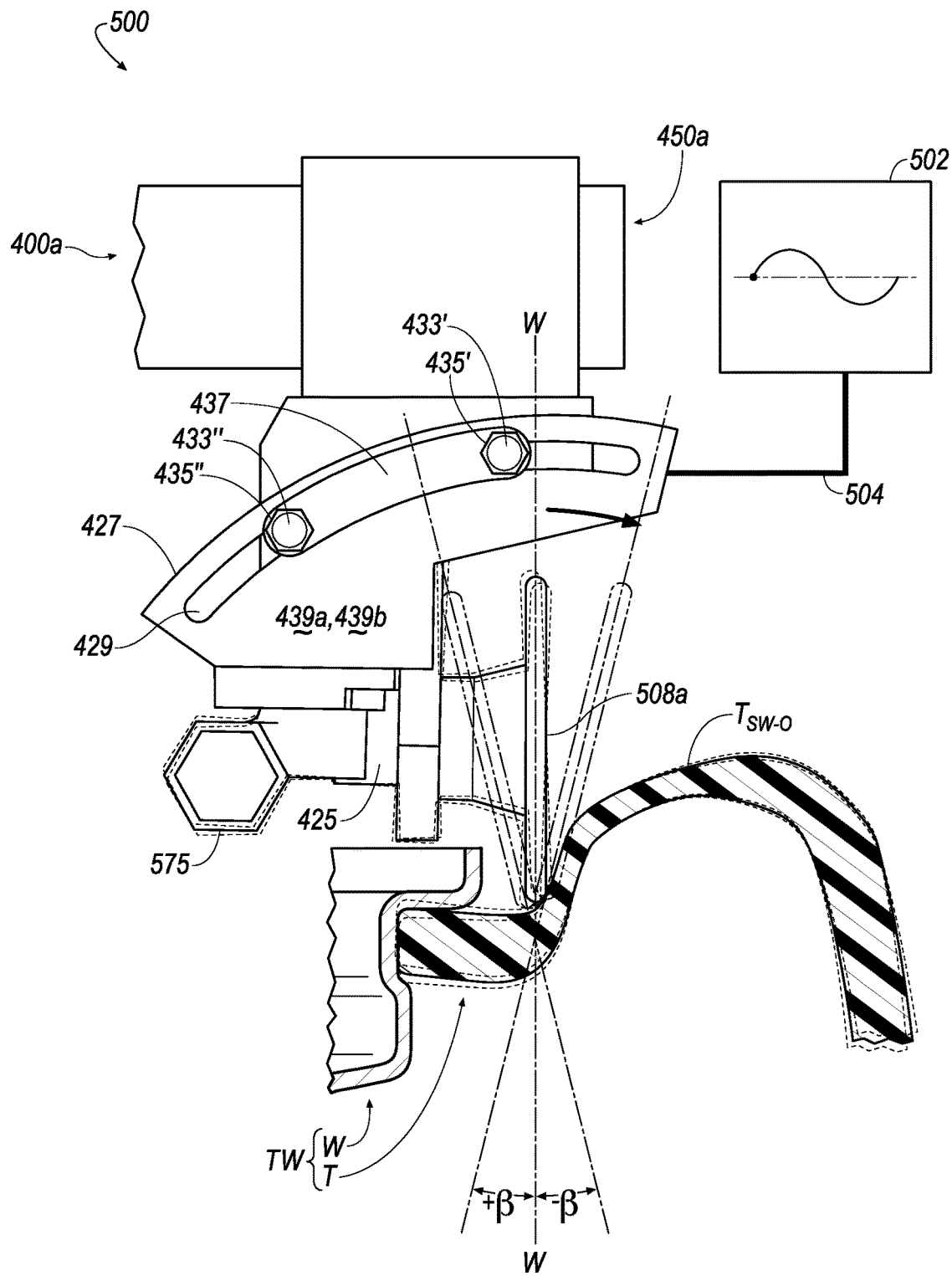
FIGS. 10A-10E are enlarged views of the bead seater assembly according to line 10 of FIG. 9B.
Figure 10B:
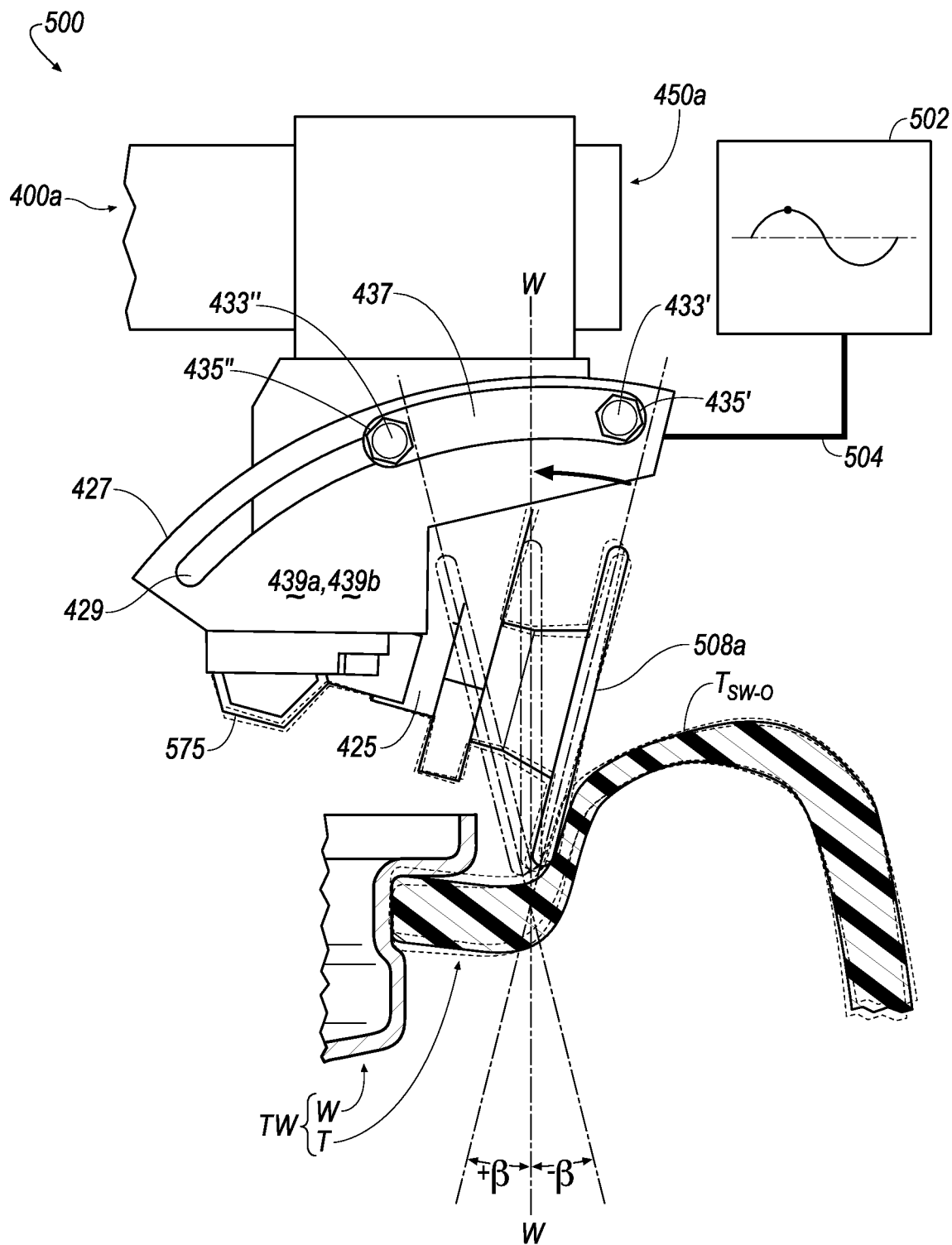
Figure 10C:
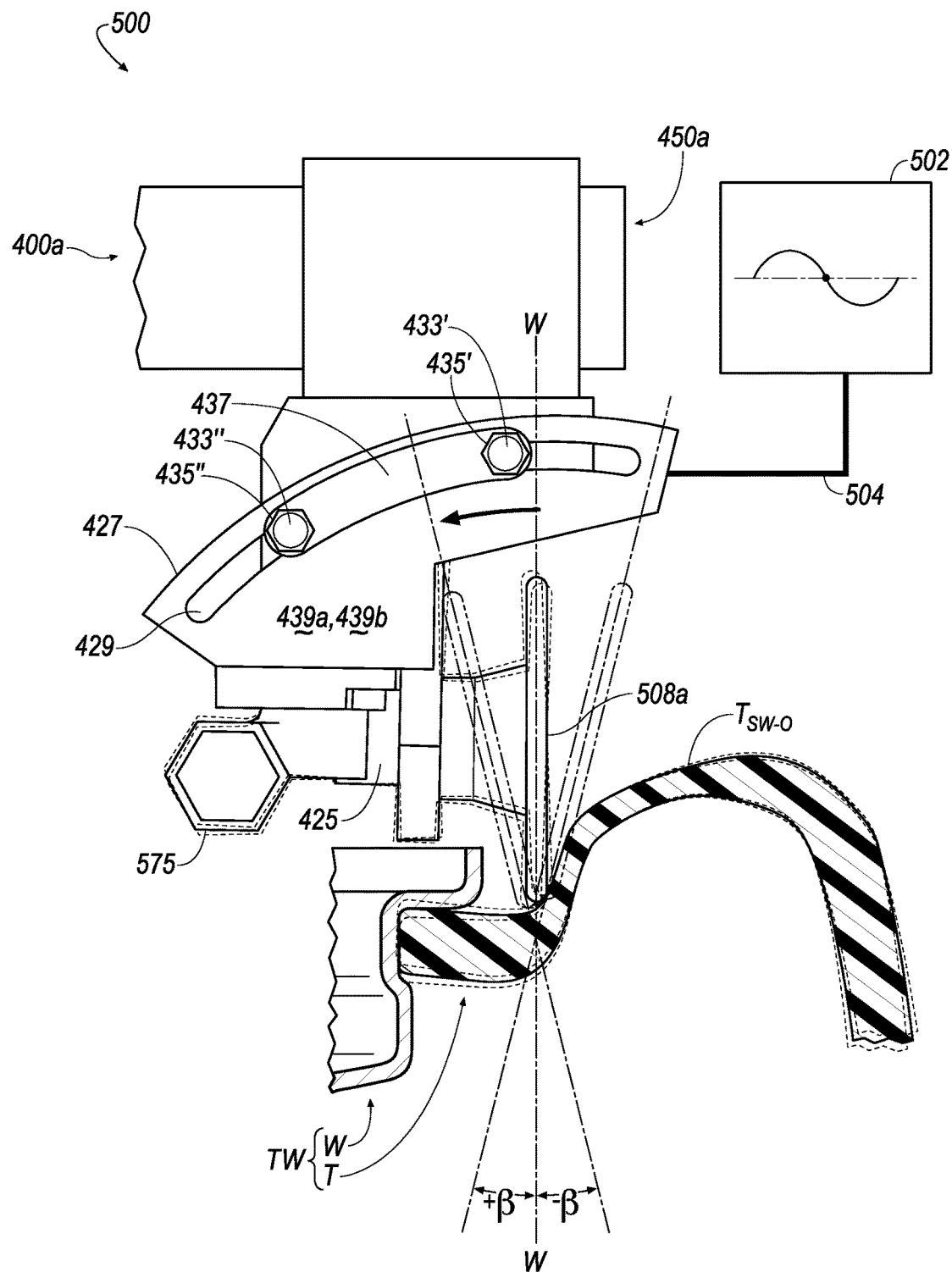
Figure 10D:
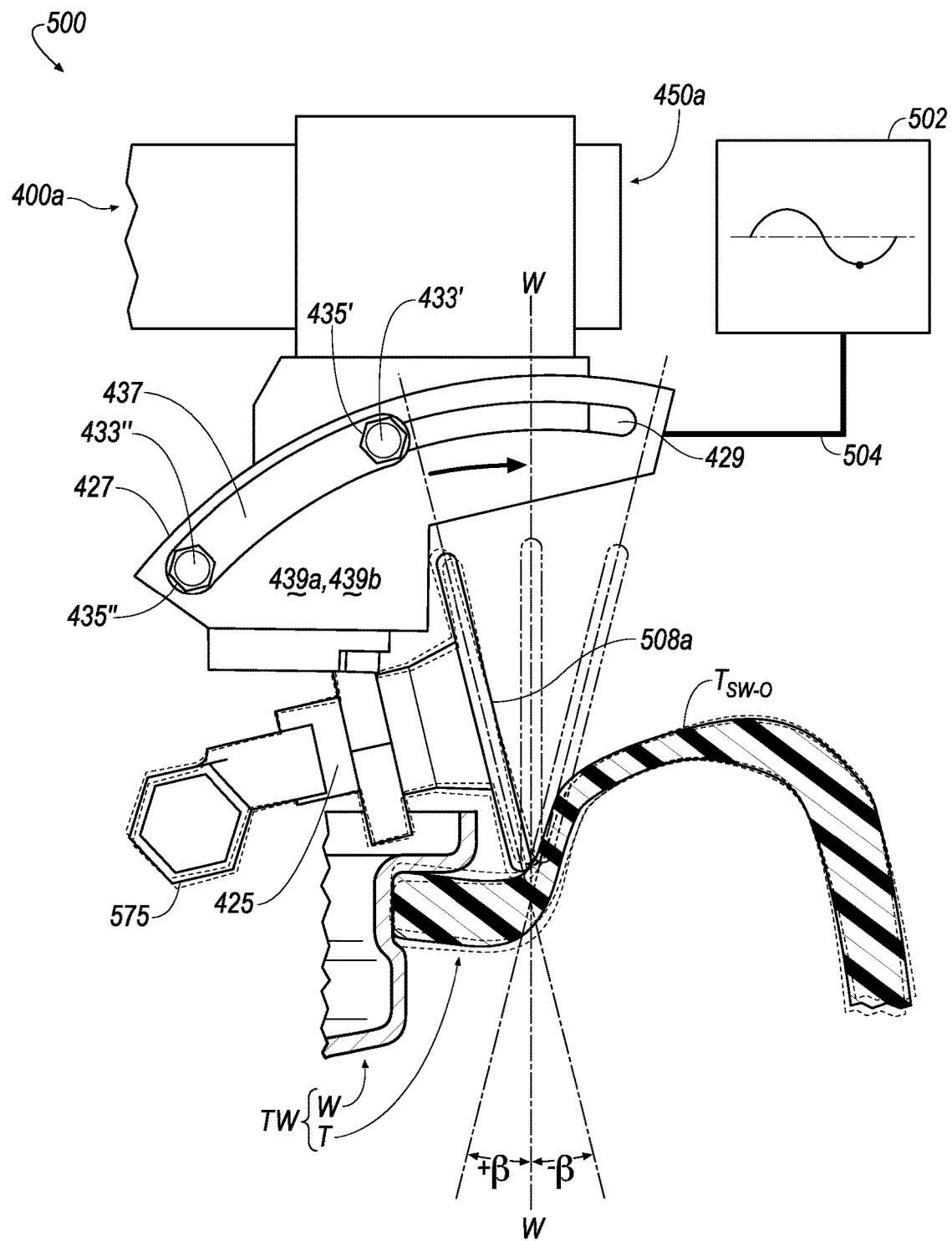
Figure 10E:
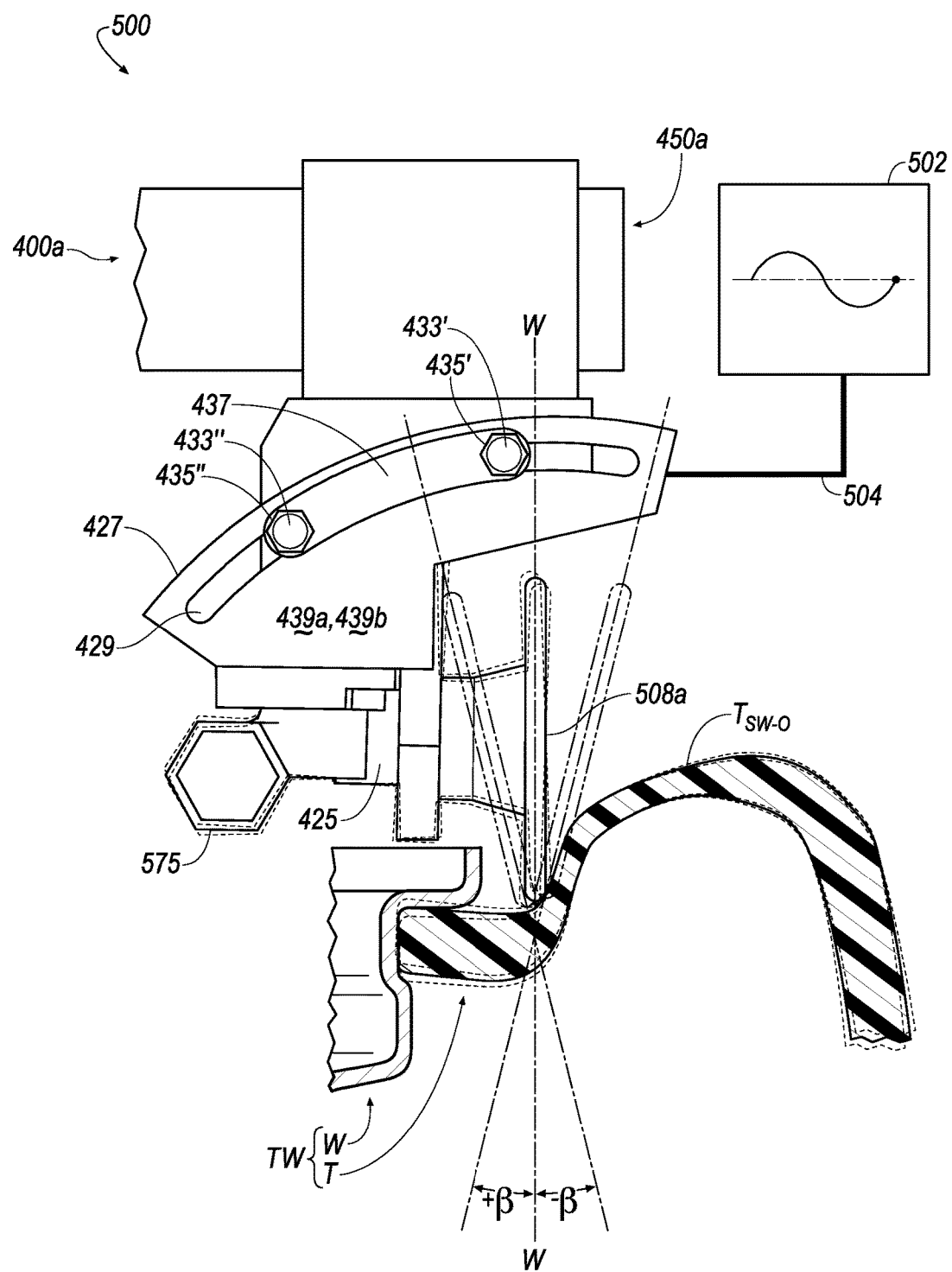

Referring to FIGS. 8A-8C, an orientation of the body 425 is manually adjusted relative to the pair of side brackets 427. Because the wheel 408a is rotatably-coupled to the body 425, a change of orientation of the body 425 results in a corresponding change in orientation of the wheel 408a. Thus, the manual, pivotal movement of the body 425 relative to the pair of side brackets 427 results in the manual, pivotable adjustment, $+\beta/-\beta$, of the wheel 408a.

In an implementation, manual adjustment of the body 425 relative to the pair of side brackets 427 may be conducted by: (1) firstly manually loosening the first and second pair of nuts 435 in order to permit the first flange 437a and the second flange (not shown) of the pair of flanges to not be drawn adjacent to the first and second outer side surfaces 439a, 439b of the pair of side brackets 427 such that the body 425 is not locked in place relative the pair of side brackets 427, then (2) manually pivotably adjusting body 425 relative to the pair of side brackets 427 by sliding the pair of pins 433 within the pair of arcuate channels 429 such that sliding movement of the pair of pins 433 is translated to sliding movement of the body 425 along an arcuate path defined by the pair of arcuate channels 429, and then (3) manually tightening the first and second pair of nuts 435 for drawing the first flange 437a and the second flange (not shown) of the pair of flanges adjacent the first and second outer side surfaces 439a, 439b of the pair of side brackets 427 such that the body 425 is locked in place relative the pair of side brackets 427.

Referring to FIG. 8A, the body 425 may be manually adjusted relative to the pair of side brackets 427 such that the wheel 408a may be arranged in a "neutral orientation." The neutral orientation of the wheel 408a may be referenced from an axis, W-W, that extends along a diameter of the wheel 408a. The axis, W-W, may be conjunctively (as described above) or alternatively described as being substantially orthogonal to an underlying ground surface (not shown). The axis, W-W, may be conjunctively (as described above) or alternatively described as being substantially orthogonal to the outboard/inboard outer sidewall surface, $T_{SW-O}/T_{SW-I}$, of the tire, T.

As seen in FIG. 8B, the body 425 may be manually adjusted relative to the pair of side brackets 427 such that the wheel 408a may be pivotable to a "maximum forward orientation." The maximum forward orientation of the wheel 408a may be referenced by a maximum positive angular deviation, $-\beta$, from the axis, W-W. The maximum positive angular deviation, $-\beta$, may include an angular value between approximately about 0° and 90°. In an implementation, the maximum positive angular deviation, $-\beta$, may be approximately equal to about 15°.

As seen in FIG. 8C, the body 425 may be manually adjusted relative to the pair of side brackets 427 such that the wheel 408a may be pivotable to a "maximum rearward orientation." The maximum rearward orientation of the wheel 408a may be referenced by a maximum negative angular deviation, $-\beta$, from the axis, W-W. The maximum negative angular deviation, $-\beta$, may include an angular value between approximately about 0° and −90°. In an implementation, the maximum negative angular deviation, $-\beta$, may be approximately equal to about −15°.

Once the first and second pair of nuts 435 have been manually tightened for drawing the first flange 437a and the second flange (not shown) of the pair of flanges adjacent the first and second outer side surfaces 439a, 439b of the pair of side brackets 427, the orientation of the wheel 408a of the entrapment remover 400 is said to be manually selectively fixed in place until the operator of the entrapment remover 400 decides to manually loosen the first and second pair of nuts 435. In an alternative embodiment as seen in FIGS. 9A-9C and 10A-10E, an entrapment remover 500 is shown where an orientation of a wheel 508a may be automatically adjusted at any time during use of the entrapment remover 500 in an "on-the-fly" manner.

In an implementation, the entrapment remover 500 is substantially the same as the entrapment remover 400. However, to impart the "on-the-fly" automatic movement, the entrapment remover 500 further includes a controller 502 and an actuator 504. The controller 502 is communicatively-coupled to the actuator 504. The actuator 504 is connected to the body 425. The actuator 504 may include any desirable device such as, for example, a hydraulic actuator, a pneumatic actuator or the like.

In operation, the controller 502 may be programmed to send a control signal (such as, e.g., an oscillating signal, a sine wave or the like) to the actuator 504 in order to cause the actuator 504 to drive pivotable movement the body 425 relative to the pair of side brackets 427 such that the wheel 508a may be correspondingly pivoted, $+\beta/-\beta$. For example, referring to FIGS. 10A-10E, the controller 502 may be provided with a repeating sine wave signal in order to cause the body 425 to repeatably pivot "back and forth" such that the wheel 508a is repeatably pivoted to and from: the neutral orientation (see, e.g., FIG. 10A), the maximum positive angular deviation, $+\beta$ (see, e.g., FIG. 10B), the neutral orientation (see, e.g., FIG. 10C), the maximum negative angular deviation, $-\beta$ (see, e.g., FIG. 10D), the neutral orientation (see, e.g., FIG. 10E), back to the maximum positive angular deviation, $+\beta$ (see, e.g., FIG. 10B) and so forth.

Because the controller 502 and actuator 504 permit the wheel 508a to be automatically adjusted at any time during use of the entrapment remover 500 in an "on-the-fly" manner, unlike the entrapment remover 400, the first and second pair of nuts 435 of the entrapment remover 500 are not tightened to the degree as described above so as to lock the body 425 with respect to the pair of side brackets 427. Accordingly, the first and second pair of nuts 435 of the entrapment remover 500 may be arranged in a manner that is sufficient to connect the body 425 to the pair of side brackets 427 without locking or otherwise impeding the actively-automatic, "on-the-fly" adjustment of the body 425 during use of the entrapment remover 500.

Each of the entrapment removers 400, 500 may further include a vibration device 575. The vibration device 575 may be communicatively-coupled to the controller 502. The vibration device 575 may be de/activated in response to an off/on signal sent from the controller 502 to the vibration device 575. Vibrational forces may transmitted from the vibration device to the wheel 408a, 508b by way of the body 425 in order to upset the relationship of the tire-wheel assembly, TW, proximate the bead seat, $W_{BS}$, of the wheel, W, such that entrapments, E, may be permitted to be removed from the tire-wheel assembly, TW.

Referring to FIGS. 11A-11E a top view of a tire-wheel assembly, TW, is shown. A wheel 608a of an entrapment remover 600 is also shown. Although shown in abstract form by way of an isolated view of the wheel 608a, the entrapment remover 600 is substantially the same as the entrapment remover 500 described above. However, the entrapment remover 600 further comprises an additional movement component (i.e., in addition to the repeatable "back and forth," $+\beta/-\beta$, pivoting movement of the entrapment remover 500); in an implementation, the additional movement component is shown and described above at FIGS. 5A-5B where a wheel 308a, 308b is described to be permitted to impart an active "kneading, vibration and pulling" effect, KVP, upon the outboard/inboard outer sidewall surface, $T_{SW-O}/T_{SW-I}$, of the tire, T, proximate the (outboard/inboard) bead seat, $W_{BS}$, of the wheel, W. Accordingly, the wheel 608a may be said to have a compounded movement component that incorporates (1) the kneading, vibration and pulling effect, KVP, of the entrapment remover 300 and (2) the repeatable "back and forth" pivoting movement of the entrapment remover 500.

Figure 11A:
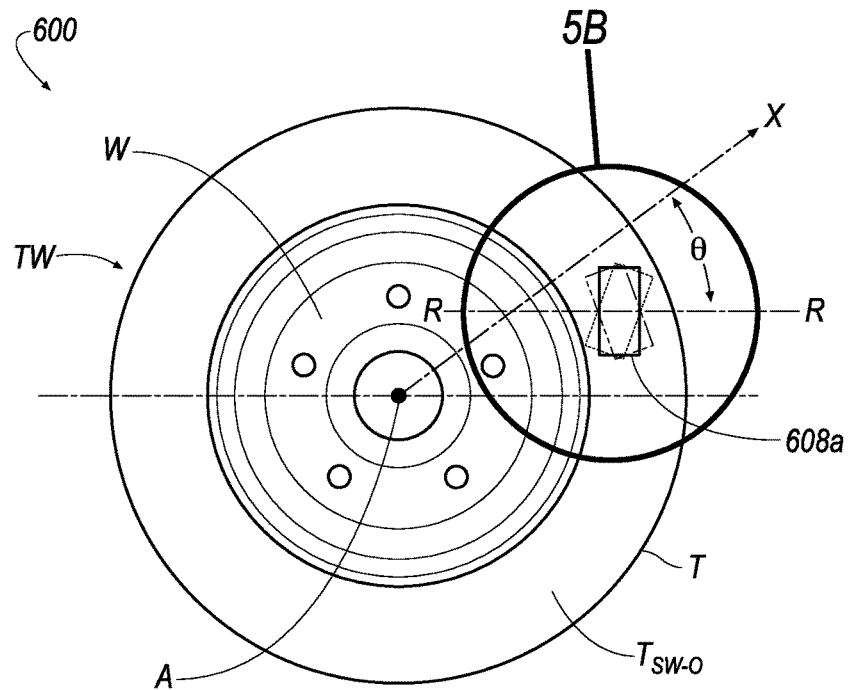
FIGS. 11A-11E are top views of a tire-wheel assembly and a portion of the bead seater assembly of FIGS. 9A-10E.
Figure 11B:
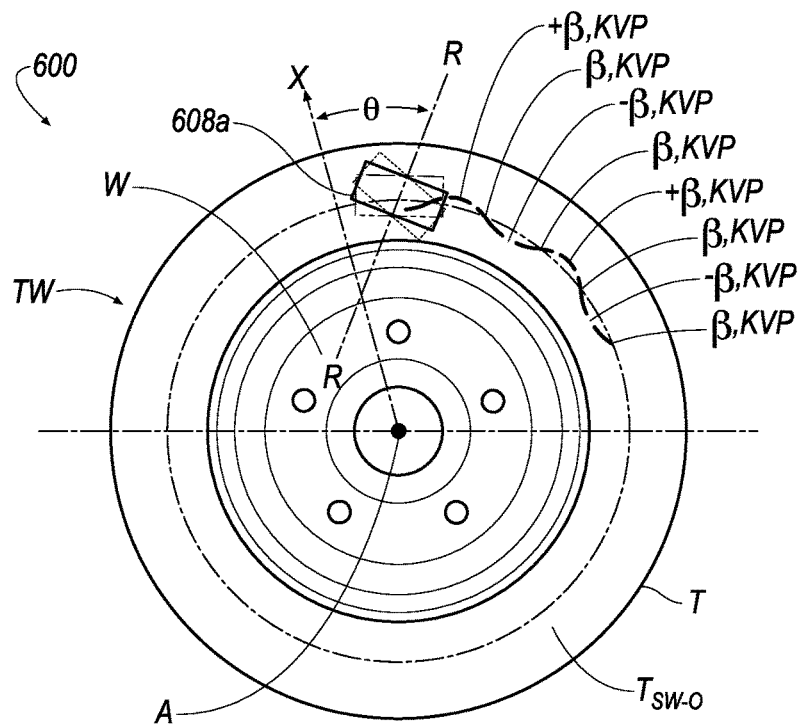
Figure 11C:
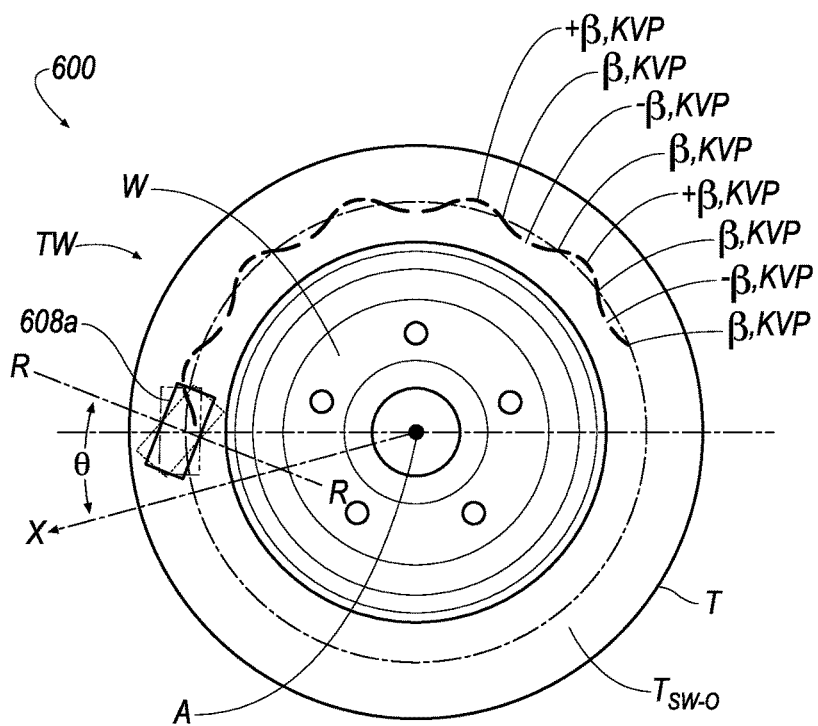
Figure 11D:
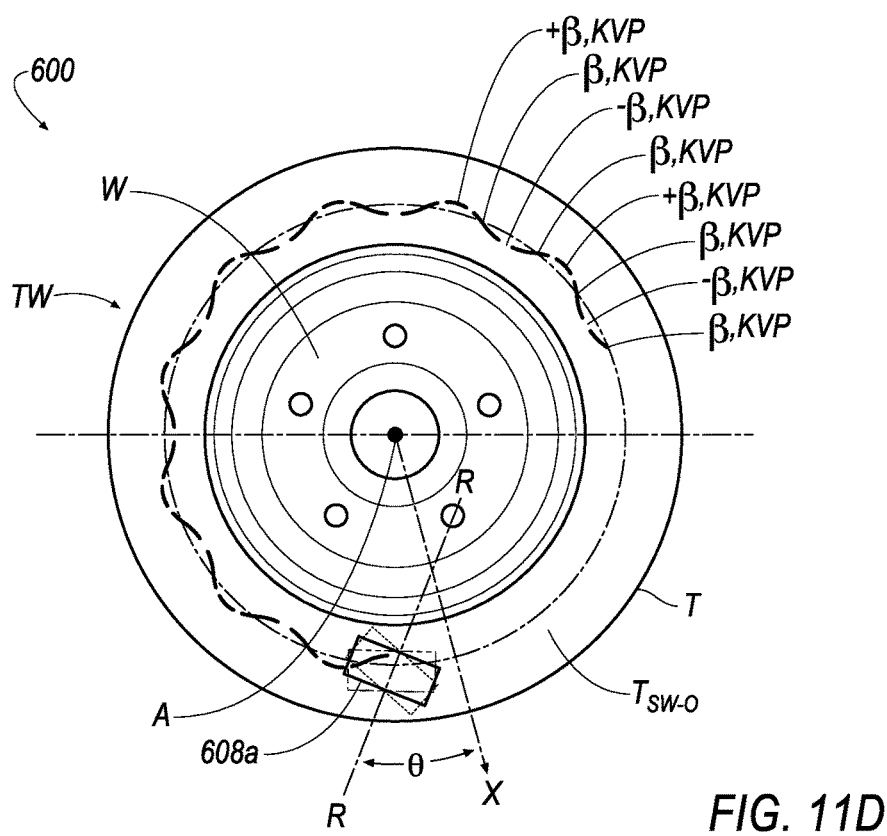
Figure 11E:
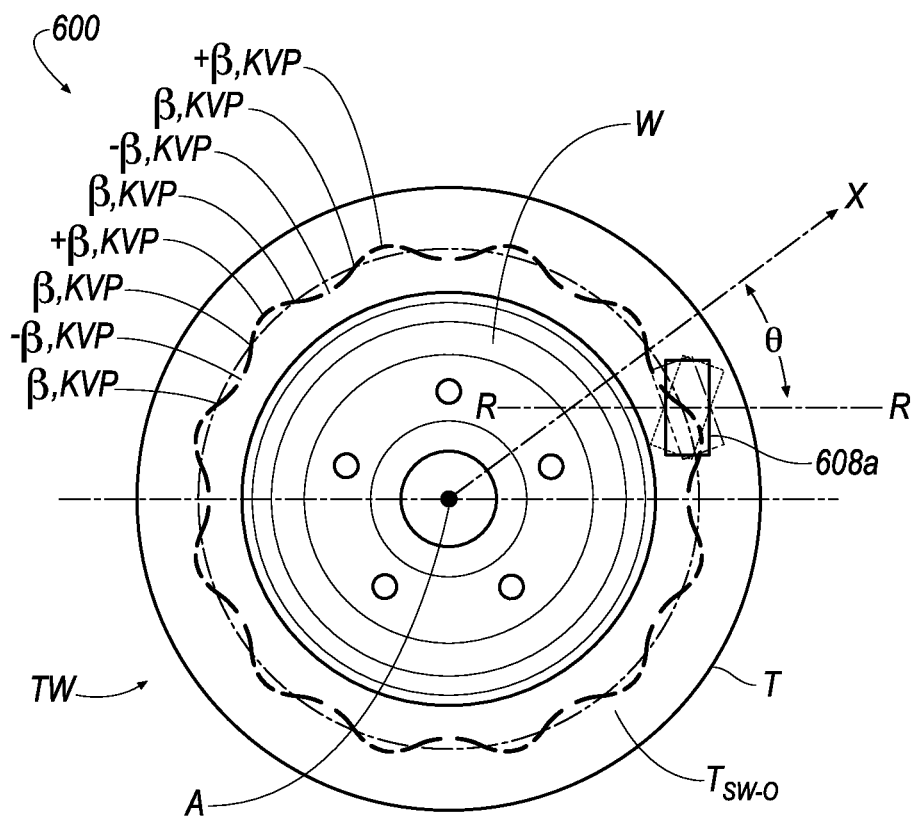

Referring to FIG. 11A, the wheel 608a is shown disposed adjacent the outboard outer sidewall surface, $T_{SW-O}$, of the tire, T, in a start position. The wheel 608a is connected to the body 425 such that the wheel 608a is not snuggly fit to the radial axis, R-R, but, rather, the wheel 608a is loosely-fitted about the radial axis, R-R. By loosely-fitting the wheel 608a relative the radial axis, R-R, the wheel 608a is allowed to "wander"/"wobble"/"knead," K, the outboard outer sidewall surface, $T_{SW-O}$, of the tire, T, proximate the (outboard) bead seat, $W_{BS}$, of the wheel, W and deviate angularly +/− between bounds defined by a deviation angle, $+\Delta$, $-\Delta$ (see, e.g., FIG. 5B), relative to angle, $\theta$.

As seen in FIGS. 11B-11E, upon rotation of the robotic arm 475 relative to the tire-wheel assembly, TW, or, upon rotation of the tire-wheel assembly, TW, relative to the robotic arm 475, the wheel 608a not only rotates about axis, R-R, but, also, the wheel 608a wanders/wobbles/kneads, K, the outboard outer sidewall surface, $T_{SW-O}$, of the tire, T, proximate the (outboard) bead seat, $W_{BS}$, of the wheel, W, between +/−$\Delta$ (i.e., as seen in FIG. 5B, the deviation angle, $+\Delta$, shifts the radial axis from that shown at, R-R, to a radial axis, $R_{+\Delta}$-$R_{+\Delta}$, that correlates to an angle, $\theta_{+\Delta}$). The deviation angle, $-\Delta$, shifts the radial axis from that shown at, R-R, to a radial axis, $R_{-\Delta}$-$R_{-\Delta}$, that correlates to an angle, $\theta_{-\Delta}$.

As also seen in FIGS. 11B-11E, upon rotation of the robotic arm 475 relative to the tire-wheel assembly, TW, or, upon rotation of the tire-wheel assembly, TW, relative to the robotic arm 475, the above described motion of the wheel 608a is compounded with the repeatable "back and forth," $+\beta/-\beta$, pivoting movement described above with respect to the entrapment remover 500. The repeatable "back and forth," $+\beta/-\beta$, pivoting movement of the wheel 608a is generally represented by a dashed sine wave line disposed about a dash circular line that is superimposed upon the outboard outer sidewall surface, $T_{SW-O}$, of the tire, T. To assist in the understanding of the repeatable "back and forth," $+\beta/-\beta$, pivoting movement of the wheel 608a, the maximum positive angular deviation, (see, e.g., "$+\beta$"), the maximum negative angular deviation, (see, e.g., "$-\beta$") and the neutral orientation (see, e.g., $\beta$) are identified at FIGS. 11B-11E.

Figure 12A:
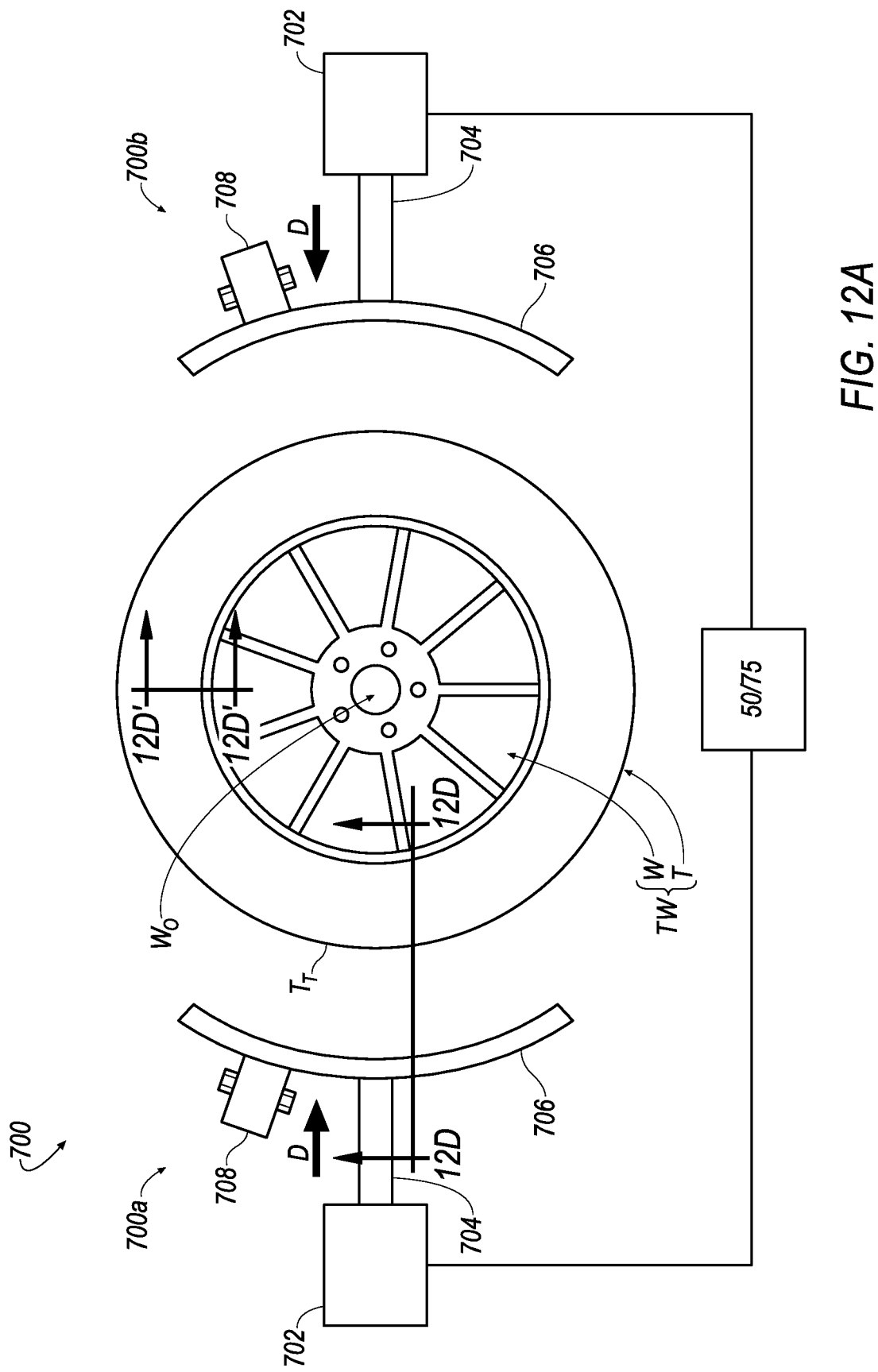
FIGS. 12A-12C are top views of an exemplary bead seater assembly.
Figure 12B:
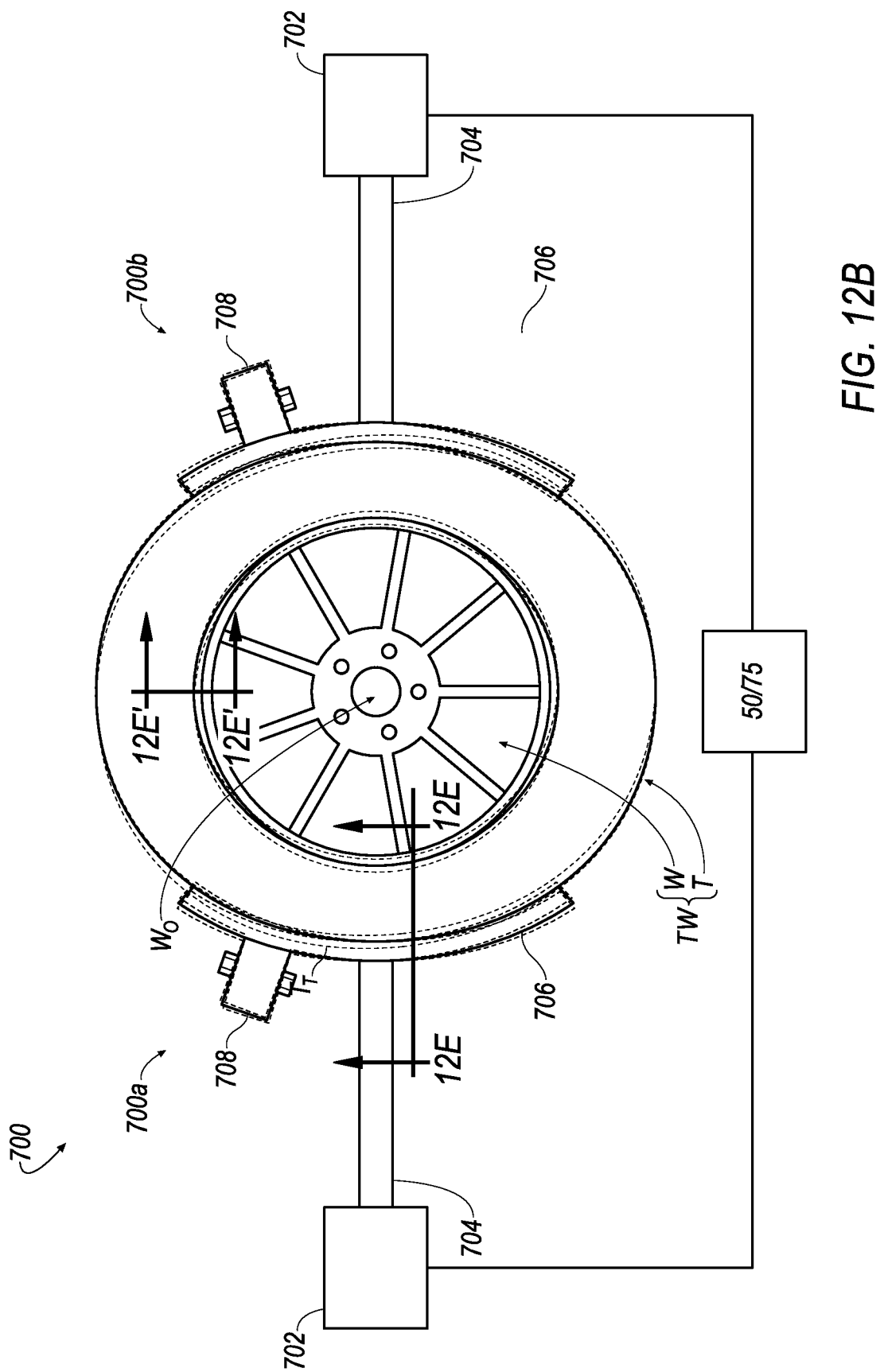

Referring to FIGS. 12A-12B, an entrapment remover is shown generally at 700 according to an embodiment. The entrapment remover 700 includes a first tire-wheel assembly engaging portion 700a and a second tire-wheel assembly engaging portion 700b.

Each of the first and second tire-wheel assembly engaging portions 700a, 700b may be attached to one or more of the station 50 and the wheeled cart 75. If the first and second tire-wheel assembly engaging portions 700a, 700b are attached to the station 50, each of the first and second tire-wheel assembly engaging portions 700a, 700b may be attached to the intermediate portion 475c of the robotic arm 475, and, the head portion 476 may be interfaced with the axial opening, $W_O$, formed by the wheel, W, as described above.

In an embodiment, each of the first and second tire-wheel assembly engaging portions 700a, 700b includes an actuator 702, a reciprocating arm 704, an arcuate tire tread surface engaging portion 706 and a vibrating device 708. The vibrating device 708 is attached to the arcuate tire tread surface engaging portion 706. The arcuate tire tread surface engaging portion 706 is connected to the reciprocating arm 704. The reciprocating arm 704 is connected to the actuator 702. The actuator 702 drives movement of the reciprocating arm 704 and the arcuate tire tread surface engaging portion 706 in first direction, D, toward the tread surface, $T_T$, of the tire, T, and a second direction (opposite that of the direction of the arrow, D) away from the tread surface, $T_T$, of the tire, T.

Referring to FIG. 12A, the arcuate tire tread surface engaging portion 706 is arranged in a disengaged orientation with respect to the tire-wheel assembly, TW, such that the arcuate tire tread surface engaging portion 706 is not directly contacting the tread surface, $T_T$, of the tire, T. Referring to FIG. 12B, the arcuate tire tread surface engaging portion 706 is arranged in an engaged orientation with respect to the tire-wheel assembly, TW, such that the arcuate tire tread surface engaging portion 706 is directly contacting the tread surface, $T_T$, of the tire, T. Movement of the arcuate tire tread surface engaging portion 706 from the disengaged orientation to the engaged orientation may be in response to the actuator 702 driving the reciprocating arm 704 from in the first direction according to the arrow, D.

Figure 12C:
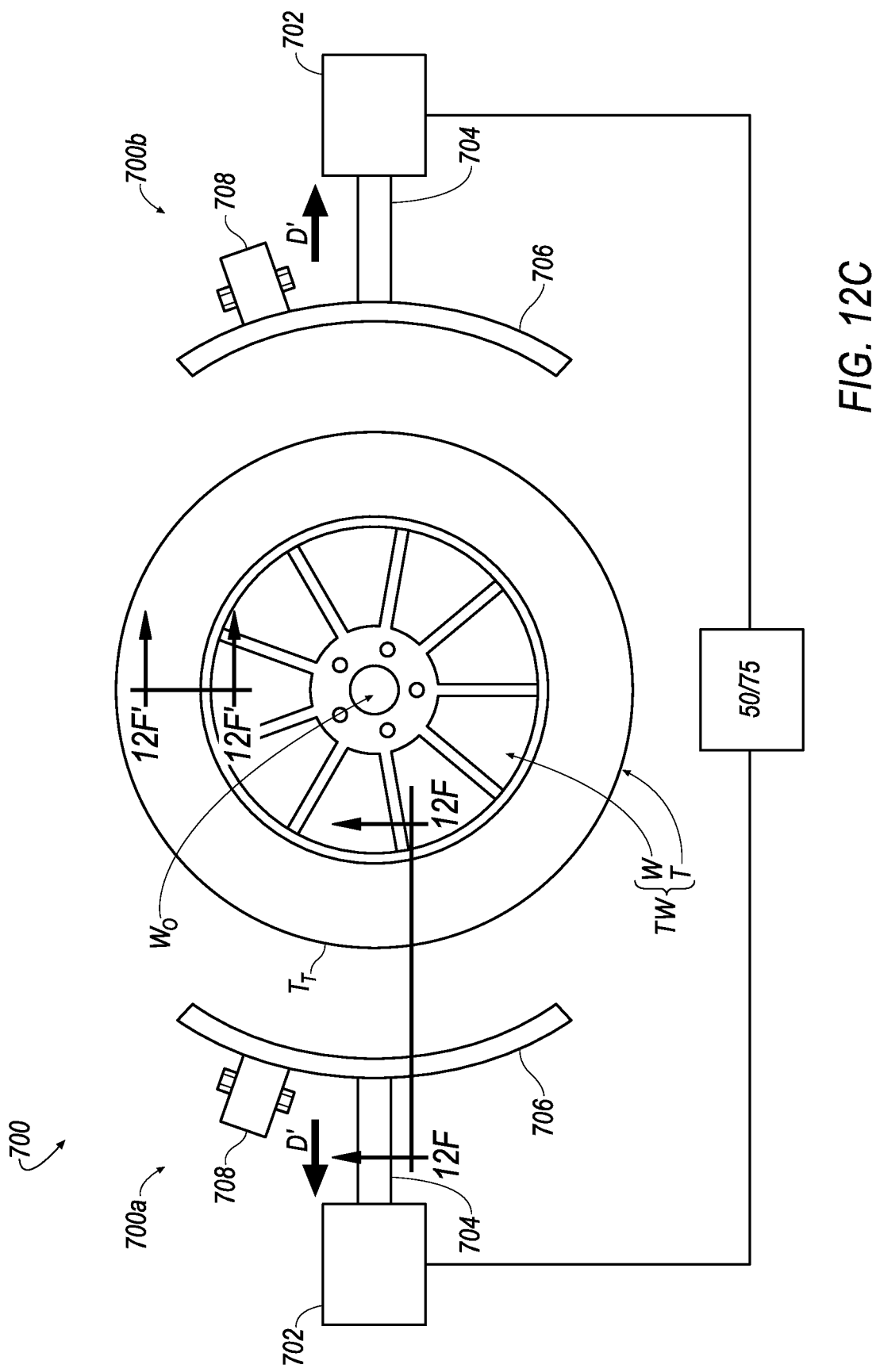

Once the arcuate tire tread surface engaging portion 706 is directly contacting the tread surface, $T_T$, of the tire, T, the vibrating device 708 may be actuated in order to impart a vibrational force to the arcuate tire tread surface engaging portion 706. The vibrating device 708 may be communicatively-coupled to the actuator 702 such that the actuator 702 may communicate a de/activation signal to the vibrating device 708 for turning off/on the vibrating device 708. As seen in FIG. 12C, the vibration device 708 may be subsequently deactivated and the arcuate tire tread surface engaging portion 706 may be moved in a second direction, D', away from the tread surface, $T_T$, of the tire, T.

Figure 12D:
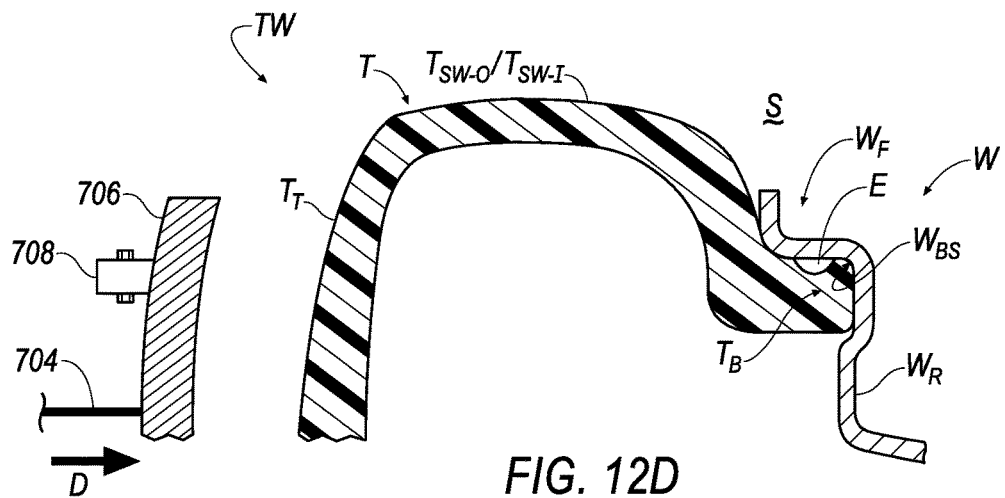
FIG. 12D is a broken cross-sectional view of the bead seater assembly according to line 12D-12D of FIG. 12A.
Figure 12E:
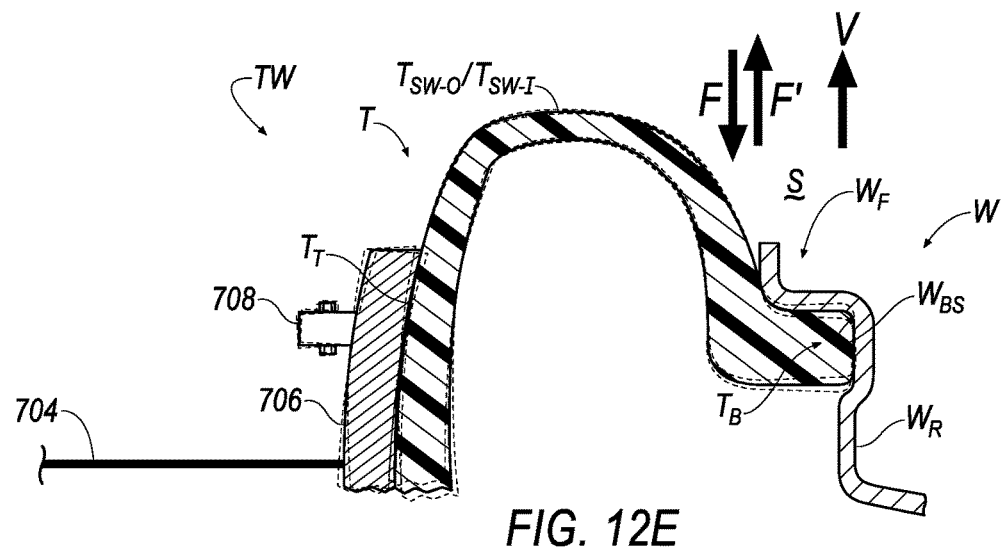
FIG. 12E is a broken cross-sectional view of the bead seater assembly according to line 12E-12E of FIG. 12B.
Figure 12F:
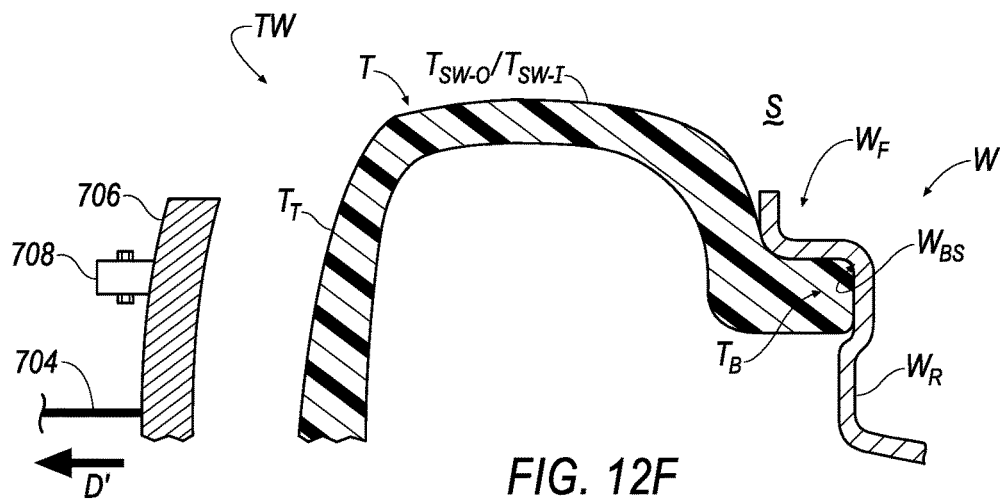
FIG. 12F is a broken cross-sectional view of the bead seater assembly according to line 12F-12F of FIG. 12C.
Figure 12D:
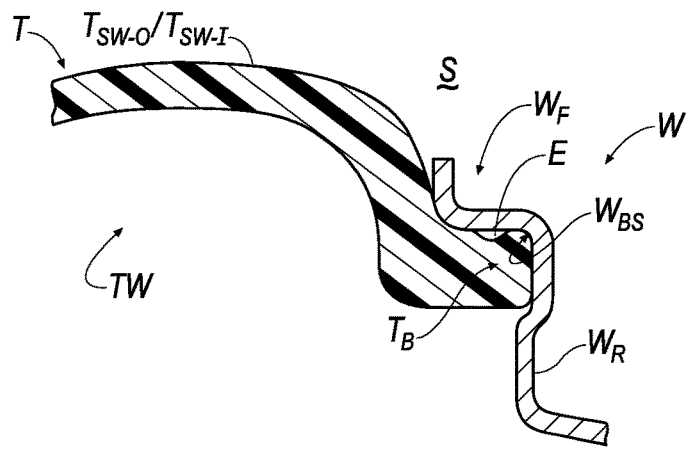
Figure 12E:
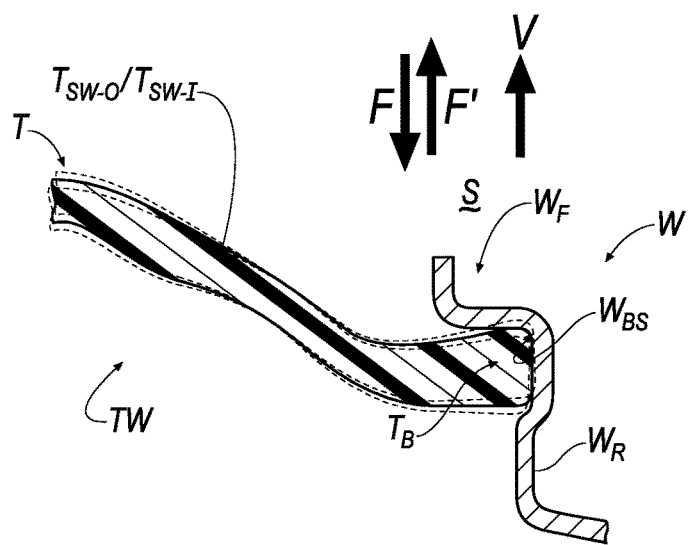
Figure 12F:
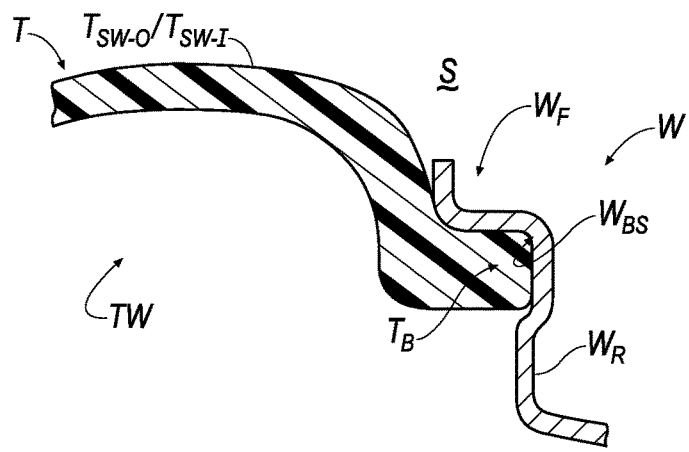

Referring to FIGS. 12D-12F and 12D'-12F', upon the arcuate tire tread surface engaging portion 706 directly contacting the tread surface, $T_T$, of the tire, T (see, e.g., FIG. 12E), and the vibrating device 708 being actuated in order to impart a vibrational force to the arcuate tire tread surface engaging portion 706 (see, e.g., FIGS. 12E and 12E'), the entrapment remover 700 upsets the relationship of the tire-wheel assembly, TW, proximate the bead seat, $W_{BS}$, of the wheel, W, such that entrapments, E (see, e.g., FIGS. 12D, 12D'), may be permitted to be removed (see, e.g., FIG. 12E') from the tire-wheel assembly, TW. In an implementation, the vibrational forces imparted to the arcuate tire tread surface engaging portion 706 may result in the outboard/inboard outer sidewall surfaces, $T_{SW-O}/T_{SW-I}$, of a tire, T, being moved relative to a fixed orientation of the wheel, W (as a result of, e.g., the head portion 476 of the robotic arm 475 being interfaced with the axial opening, $W_O$, formed by the wheel, W). In an embodiment, after the entrapment remover 700 upsets the relationship of the tire-wheel assembly, TW, proximate the bead seat, $W_{BS}$, of the wheel, W, the entrapment remover 700 may include/cooperate with a vacuum, V (arising from, e.g., first and/or second vacuum devices 18a, 18b/118a, 118b), in order to assist in the evacuation of the one or more entrapments, E.

Figure 13A:
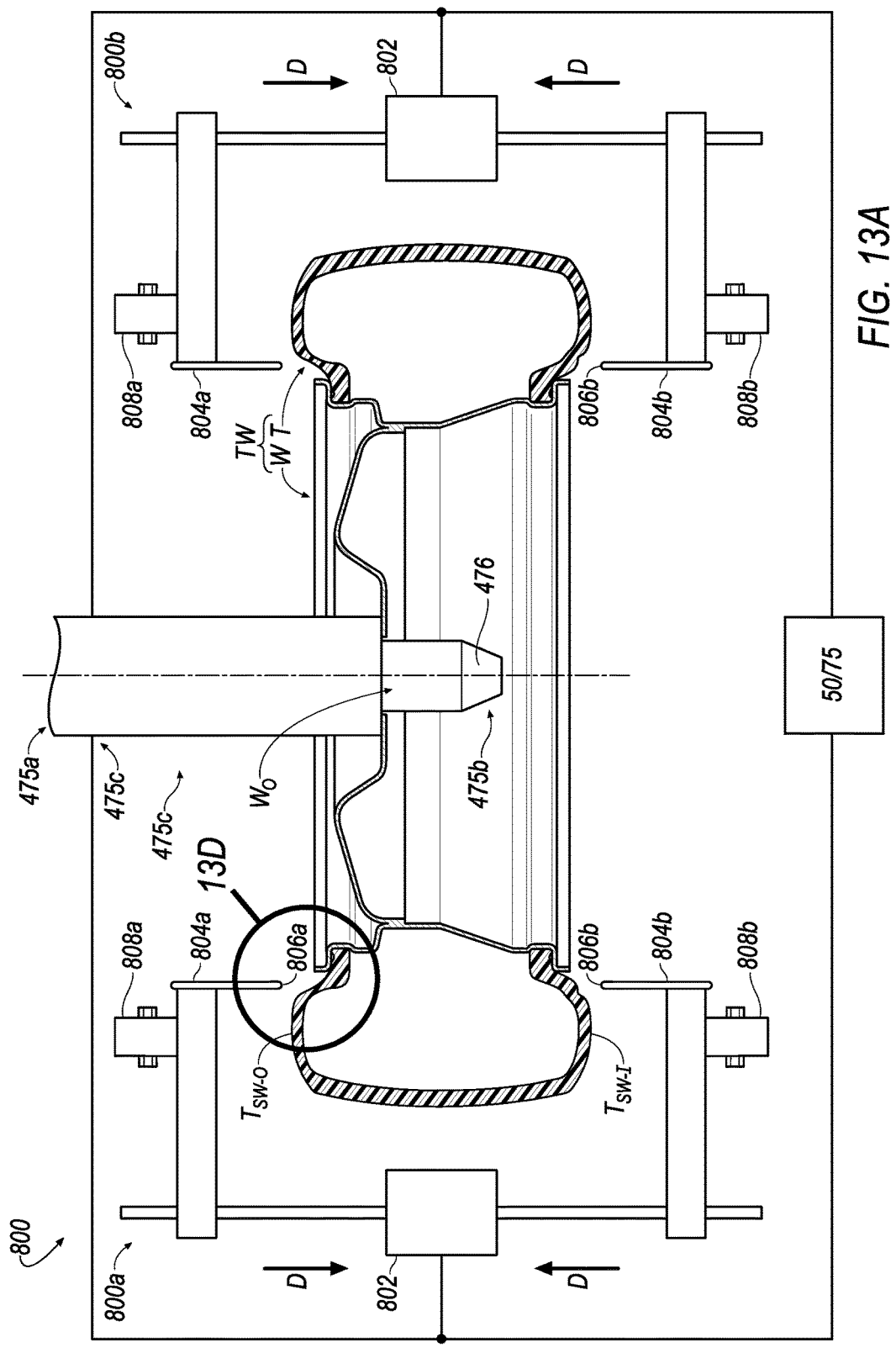
Figure 13B:
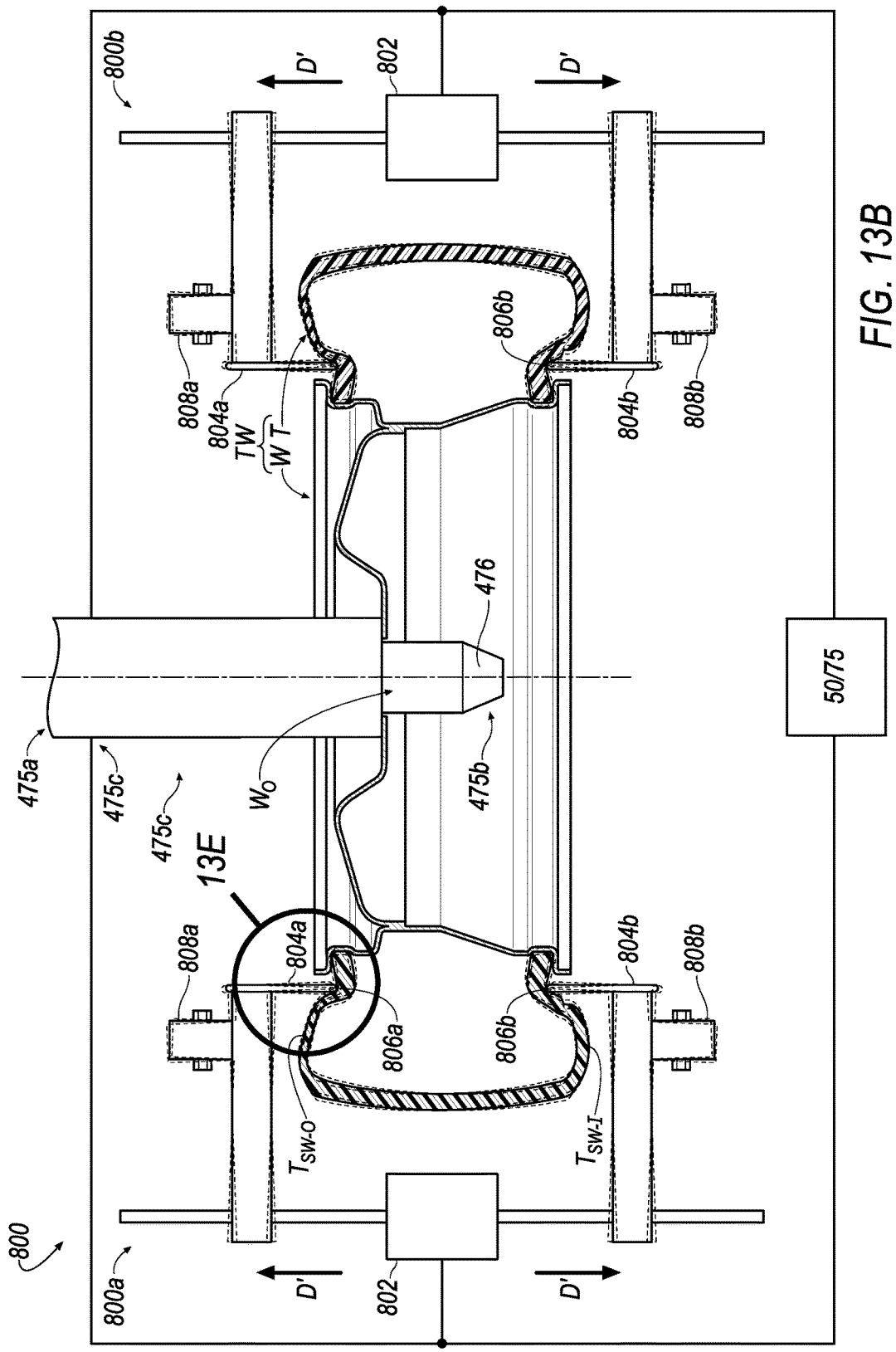

Referring to FIGS. 13A-13B, an entrapment remover is shown generally at 800 according to an embodiment. The entrapment remover 800 includes a first tire-wheel assembly engaging portion 800a and a second tire-wheel assembly engaging portion 800b.

Each of the first and second tire-wheel assembly engaging portions 800a, 800b may be attached to one or more of the station 50 and the wheeled cart 75. If the first and second tire-wheel assembly engaging portions 800a, 800b are attached to the station 50, each of the first and second tire-wheel assembly engaging portions 800a, 800b may be attached to the intermediate portion 475c of the robotic arm 475, and, the head portion 476 may be interfaced with the axial opening, WO, formed by the wheel, W.

In an embodiment each of the first and second tire-wheel assembly engaging portions 800a, 800b includes an actuator 802, a first/second pinching finger 804a, 804b each terminating with an outboard/inboard outer tire sidewall surface-engaging tip 806a, 806b and an outboard/inboard outer tire sidewall surface vibrating device 808a, 808b. The outboard outer tire sidewall surface vibrating device 808a is attached to the first pinching finger 804a proximate the outboard tire sidewall surface-engaging tip 806a. The inboard outer tire sidewall surface vibrating device 808b is attached to the second pinching finger 804b proximate the inboard tire sidewall surface-engaging tip 806b. The actuator 802 causes a pinching movement of the first and second pinching fingers 804a, 804b such that the first and second pinching fingers 804a, 804b may be respectively moved in a first direction, D (see, e.g., FIG. 13A, toward the outboard/inboard outer sidewall surfaces, TSW-O/TSW-I, of a tire, T, and a second direction, D' (see, e.g., FIG. 13B), away from the outboard/inboard outer sidewall surfaces, TSW-O/TSW-I, of a tire, T.

Referring to FIG. 13A, each of the first and second pinching fingers 804a, 804b are arranged in a disengaged orientation with respect to the tire-wheel assembly, TW, such that each of the outboard/inboard tire sidewall surface-engaging tips 806a, 806b are not directly contacting the outboard/inboard outer sidewall surfaces, TSW-O/TSW-I, of a tire, T. Referring to FIG. 13B, each of the first and second pinching fingers 804a, 804b are arranged in an engaged orientation with respect to the tire-wheel assembly, TW, such that each of the outboard/inboard tire sidewall surface-engaging tips 806a, 806b are directly contacting the outboard/inboard outer sidewall surfaces, TSW-O/TSW-I, of a tire, T. Movement of the first and second pinching fingers 804a, 804b from the disengaged orientation to the engaged orientation may be in response to the actuator 802 driving the pivoting mechanism 804c in the first direction according to the arrow, D (see, e.g., FIG. 13A).

Once each of the outboard/inboard tire sidewall surface-engaging tips 806a, 806b are directly contacting the outboard/inboard outer sidewall surfaces, TSW-O/TSW-I, of a tire, T, the vibrating device 808 may be actuated in order to impart a vibrational force to the first and second pinching fingers 804a, 804b. The vibrating device 808 may be communicatively-coupled to the actuator 802 such that the actuator 802 may communicate a de/activation signal to the vibrating device 808 for turning off/on the vibrating device 808.

Figure 13D:
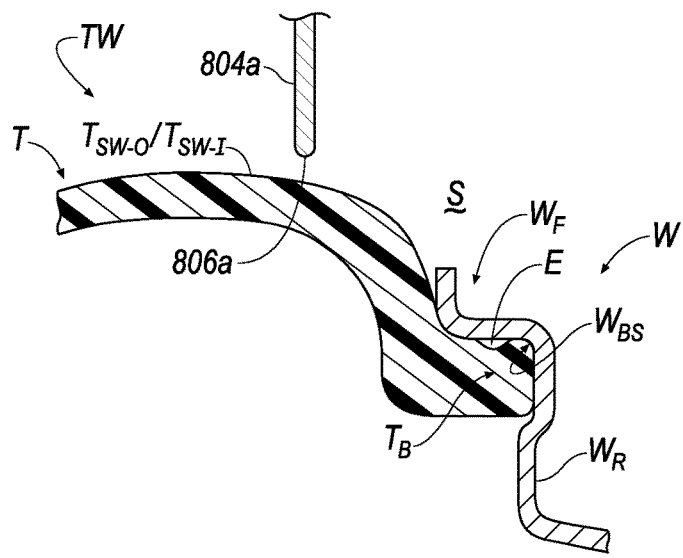
FIG. 13D is an enlarged view of a portion of the bead seater assembly according to line 13D of FIG. 13A.
Figure 13E:
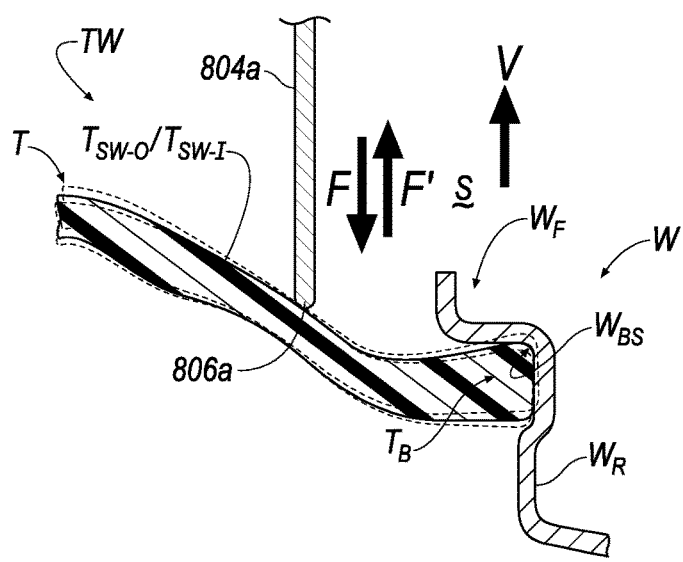
FIG. 13E is an enlarged view of a portion of the bead seater assembly according to line 13E of FIG. 13B.
Figure 13F:
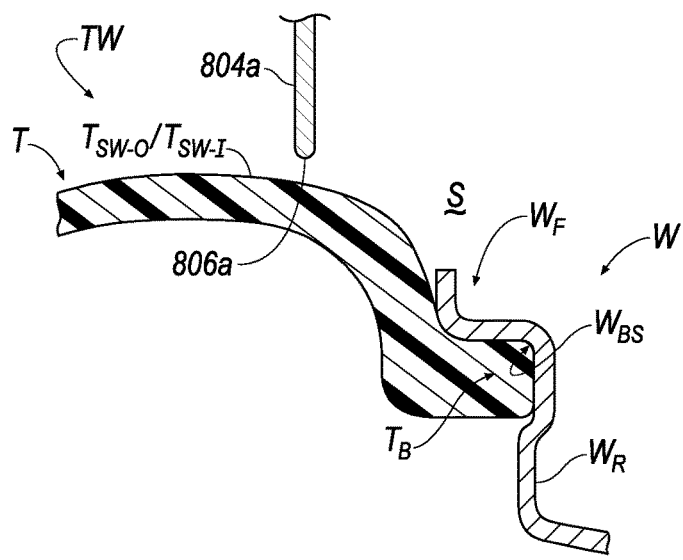
FIG. 13F is an enlarged view of a portion of the bead seater assembly according to line 13F of FIG. 13C.

Referring to FIGS. 13D-13F, upon each of the outboard/inboard tire sidewall surface-engaging tips 806a, 806b directly contacting the outboard/inboard outer sidewall surfaces, TSW-O/TSW-I, of a tire, T (see, e.g., FIG. 13E)), and the vibrating device 808 being actuated in order to impart a vibrational force to the first and second pinching fingers 804a, 804b, the entrapment remover 800 upsets the relationship of the tire-wheel assembly, TW, proximate the bead seat, WBS, of the wheel, W, such that entrapments, E (see, e.g., FIG. 13D), may be permitted to be removed from the tire-wheel assembly, TW. In an implementation, the vibrational forces imparted the first and second pinching fingers 804a, 804b may result in the outboard/inboard outer sidewall surfaces, TSW-O/TSW-I, of a tire, T, being moved relative to a fixed orientation of the wheel, W (as a result of, e.g., the head portion 476 of the robotic arm 475 being interfaced with the axial opening, WO, formed by the wheel, W). In an embodiment, after the entrapment remover 800 upsets the relationship of the tire-wheel assembly, TW, proximate the bead seat, WBS, of the wheel, W, the entrapment remover 800 may include/cooperate with a vacuum, V (arising from, e.g., first and/or second vacuum devices 18a, 18b/118a, 118b), in order to assist in the evacuation of the one or more entrapments, E.

Referring to FIGS. 14A-14E, an entrapment remover is shown generally at 900 according to an embodiment. The entrapment remover 900 includes a first tire-wheel assembly engaging portion 900a, a second tire-wheel assembly engaging portion 900b and a third tire-wheel assembly engaging portion 900c.

Each of the first and second tire-wheel assembly engaging portions 900a, 900b may be attached to one or more of the station 50 and the wheeled cart 75. If the first and second tire-wheel assembly engaging portions 900a, 900b are attached to the station 50, each of the first and second tire-wheel assembly engaging portions 900a, 900b may be attached to the intermediate portion 475c of the robotic arm 475, and, the head portion 476 may be interfaced with an axial opening, WO, formed by the wheel, W, as described above.

In an embodiment, the entrapment remover includes an actuator 902 that is communicatively-coupled to each of the first, second and third tire-wheel assembly engaging portions 900a, 900b, 900c. The first and second tire-wheel assembly engaging portions 900a, 900b include an arm 904, a tire tread surface engaging wheel 906 and a vibrating device 908. The vibrating device 908 is attached to the arm 904. The tire tread surface engaging wheel 906 is rotatably-connected to a distal end of the arm 904.

In an embodiment, the arm 904 includes a pivoting mechanism 905 that is connected to the actuator 902. The actuator 902 drives the pivoting mechanism 905 to cause pivoting movement of the arm 904 and the tire tread surface engaging wheel 906 in first direction, D1, toward the tread surface, TT, of the tire, T, and a second direction, D r (that is opposite the first direction, D1), away from the tread surface, TT, of the tire, T.

In another embodiment, a biasing spring 907 may be attached to the arm 904. The biasing spring 907 may bias the arm 904 in a direction according to the arrow, D1. As will be described in the following disclosure, when the tread surface, TT, of the tire, T, contacts the tire tread surface engaging wheel 906 (as a result of movement D2/D2'), the bias imparted to the arm 904 by the spring 907 may be overcome such that the arm 904 pivots in the second direction, D1' (that is opposite the first direction, D1), away from the tread surface, TT, of the tire, T; once the tire-wheel assembly, TW, has been shuttled past the arm 904, the bias arising from the spring 907 will cause the arm 904 to pivot, D1.

In yet another embodiment, the arm 904 of each of the first and second tire-wheel assembly engaging portions 900a, 900b may be arranged in a fixed orientation at a spaced-apart distance, SP, such that no pivoting motion according to either of the directions, D1, D1', occurs. Accordingly, when the arms 904 are not arranged in a fixed orientation as described above, the arms 904 may be referring to as "pivoting arms." In the illustrated embodiment at FIGS. 14A-14E, the arms 904 are shown to be arranged in a fixed orientation, however, it will be appreciated that the arms 904 are not limited to a fixed orientation and may be permitted to pivot according to the direction of the arrows, D1, D1'.

The third tire-wheel assembly engaging portion 900c may function as a shuttle or conveyor for moving the tire-wheel assembly, TW, in a back-and-forth motion relative to the first and second tire-wheel assembly engaging portions 900a, 900b. The third tire-wheel assembly engaging portion 900c includes a pair of reciprocating arms 910 including first reciprocating arm 910a and a second reciprocating arm 910b and a pair of arcuate tire tread surface engaging portions 912 including a first arcuate tire tread engaging portion 912a and a second tire tread surface engaging portion 912b. The first arcuate tire tread surface engaging portion 912a is connected to the first reciprocating arm 910a. The second arcuate tire tread surface engaging portion 912b is connected to the second reciprocating arm 910b. Both of the first and second reciprocating arms 910a, 910b are connected to the actuator 902. The actuator 902 drives movement of the first and second reciprocating arms 910a, 910b and the first and second arcuate tire tread surface engaging portion 912a, 912b in: (1) a first direction, D2 (see, e.g., FIGS. 14A-14B and 14E), for shuttling the tire-wheel assembly, TW, relative the first and second tire-wheel assembly engaging portions 900a, 900b in the first direction, D2, and (2) a second direction, D2' (see, e.g., FIGS. 14C-14D), that is opposite the first direction, D2), for shuttling the tire-wheel assembly, TW, relative the first and second tire-wheel assembly engaging portions 900a, 900b in the second direction, D2'.

Figure 14A:
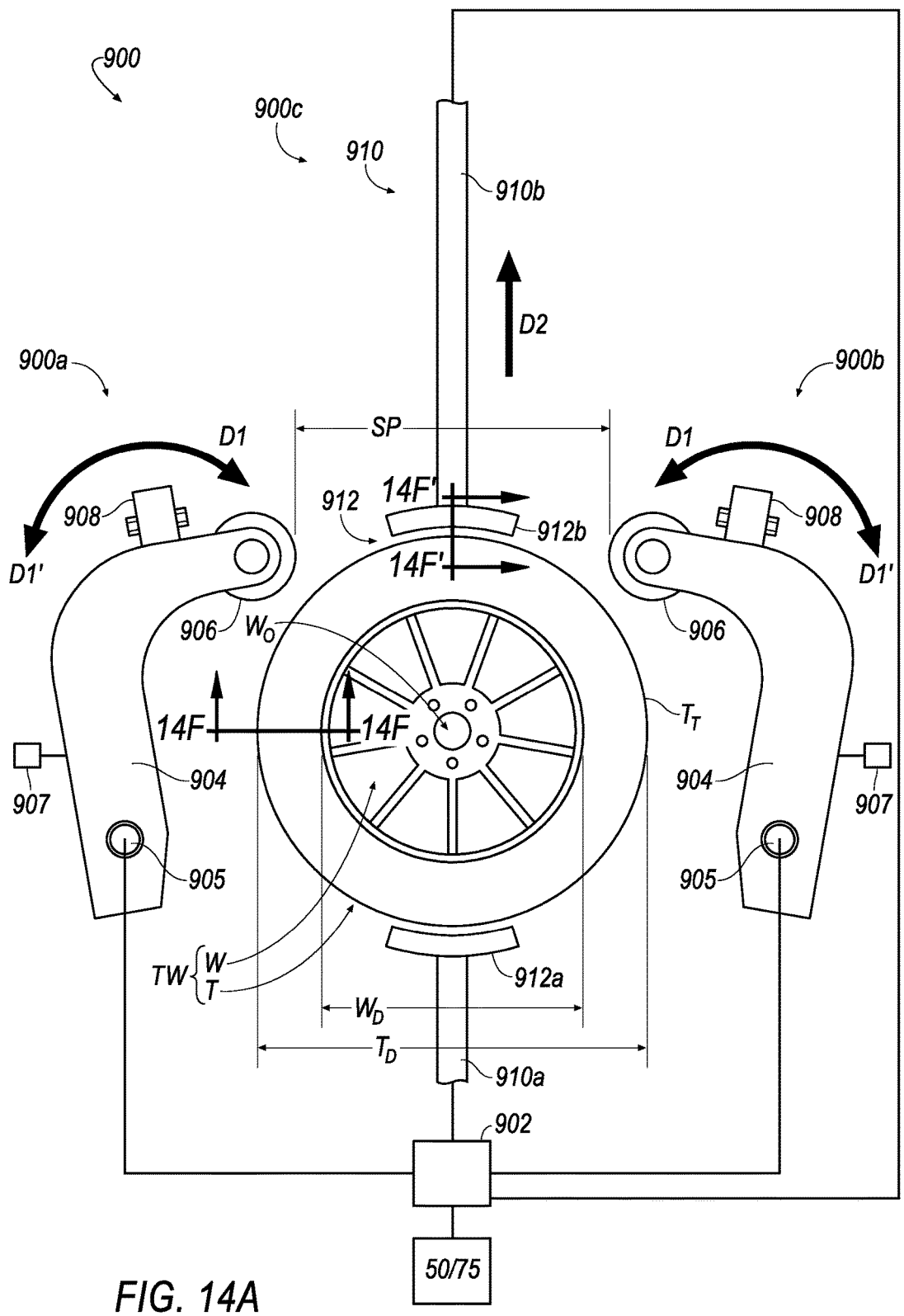
FIGS. 14A-14E are top views of an exemplary bead seater assembly.

Referring to FIG. 14A, each tire tread surface engaging wheels 906 of the first and second tire-wheel assembly engaging portions 900a, 900b are arranged in a disengaged orientation with respect to the tire-wheel assembly, TW, such that each tire tread surface engaging wheel 906 do not directly contact the tread surface, TT, of the tire, T. Referring to FIGS. 14A-14E, each of the arms 904 of the first and second tire-wheel assembly engaging portions 900a, 900b are arranged in a fixed orientation and do not pivot according to either of the direction of the arrows, D1/D1'. Accordingly, upon shuttling the tire-wheel assembly, TW, accord to the direct of the arrows, D2/D2', each tire tread surface engaging wheel 906 may be subsequently engaged with the tire-wheel assembly, TW, such that each tire tread surface engaging wheel 906 directly contacts the tread surface, TT, of the tire, T.

Figure 14B:
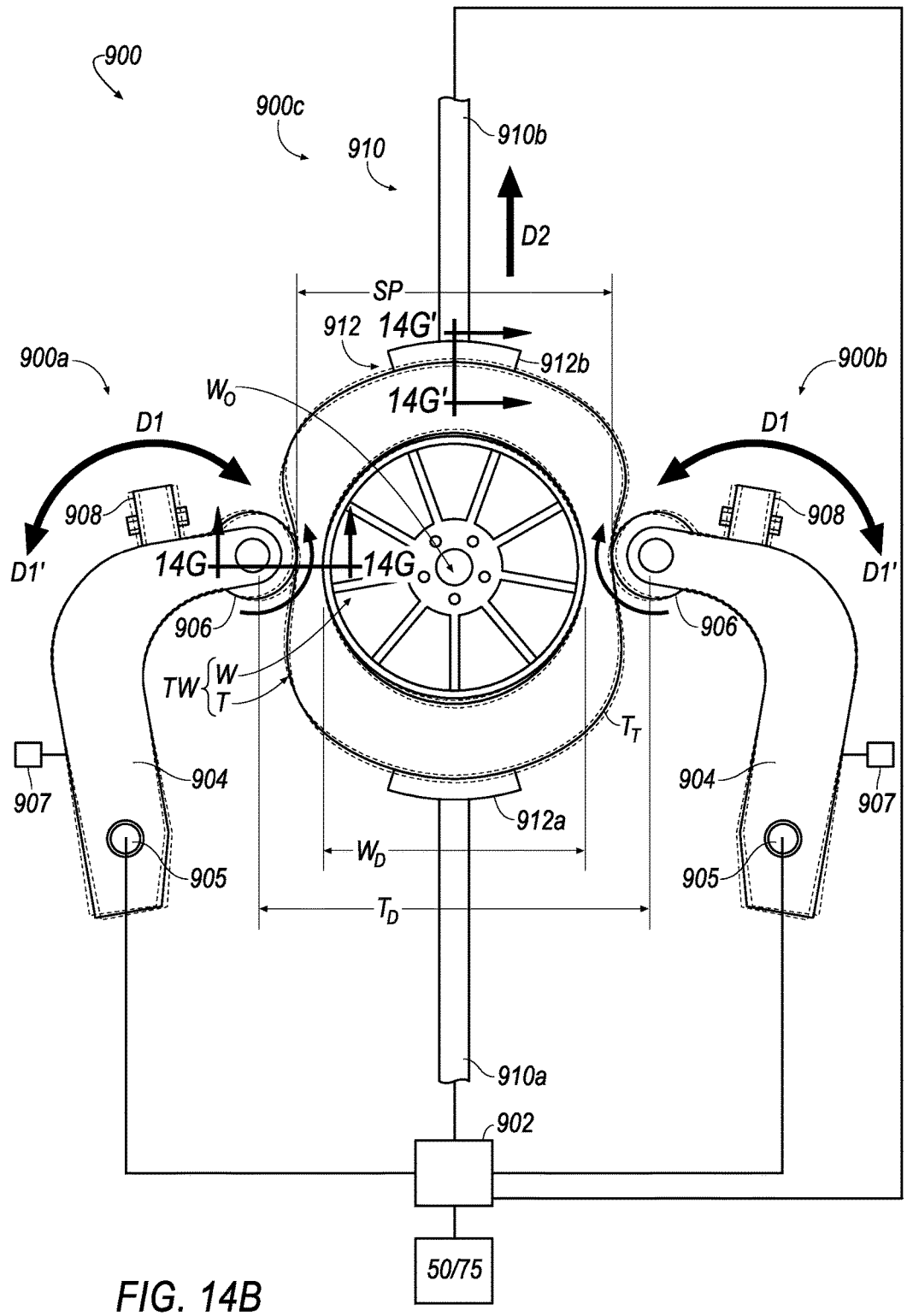
Figure 14C:
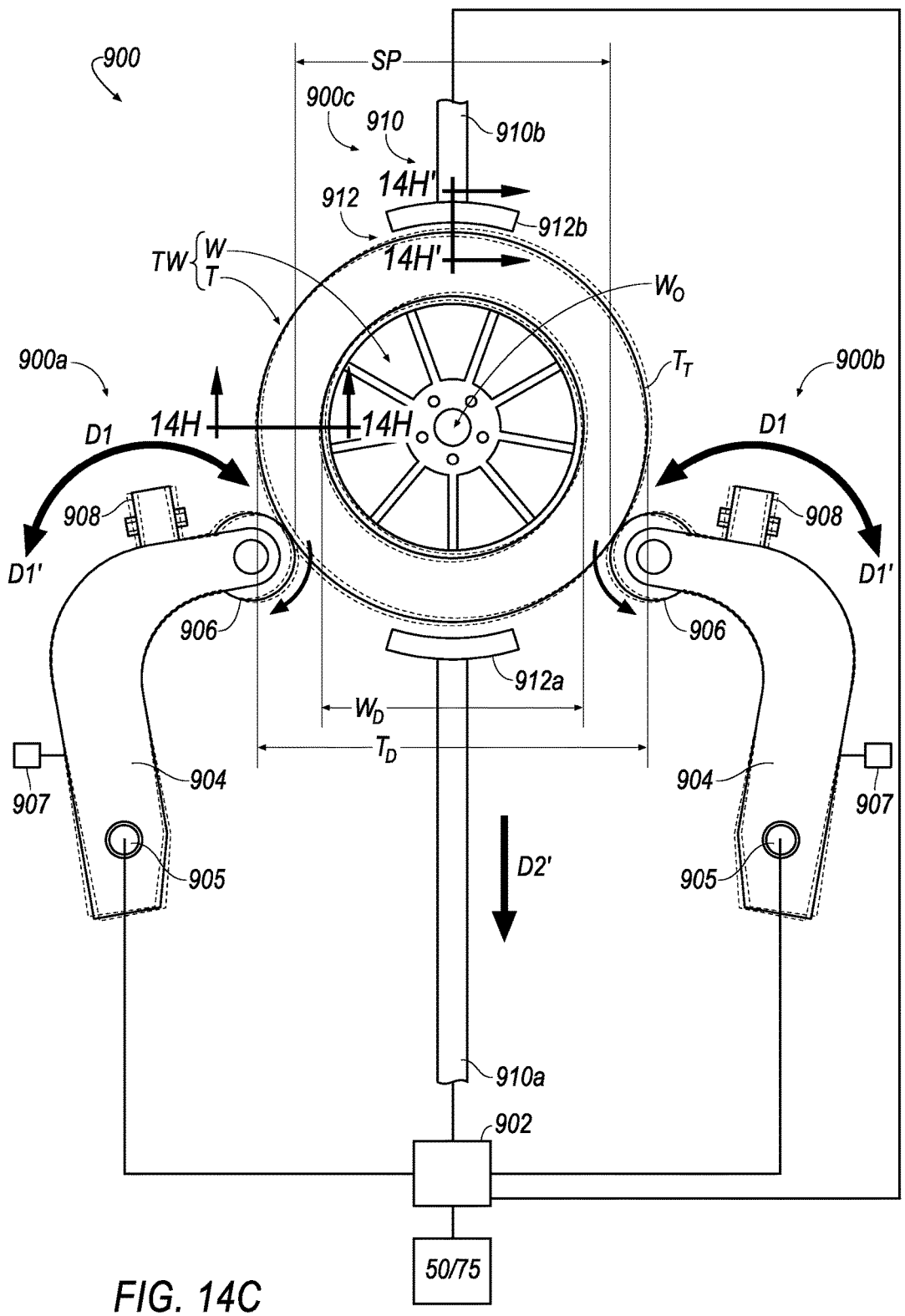
Figure 14D:
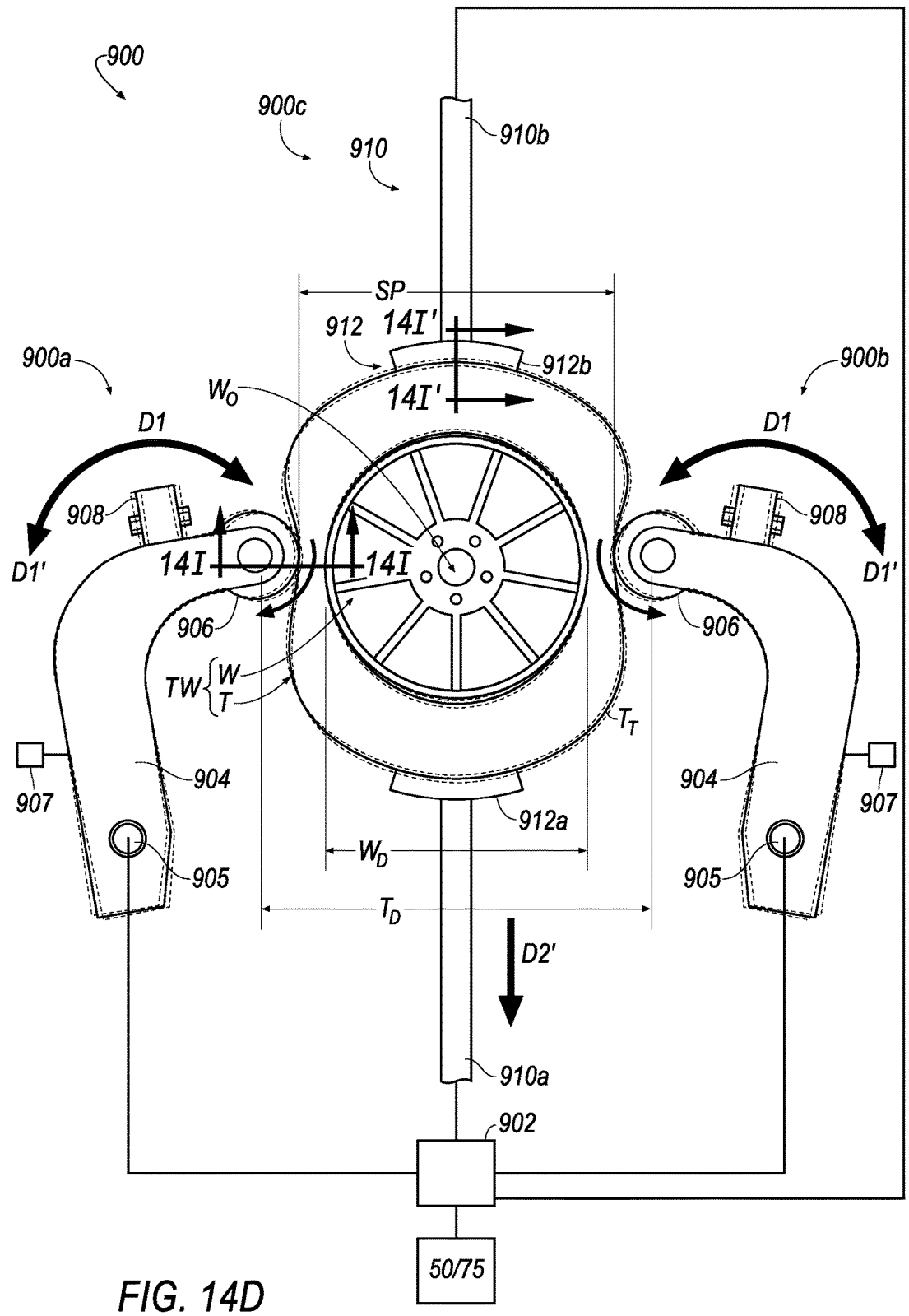
Figure 14E:
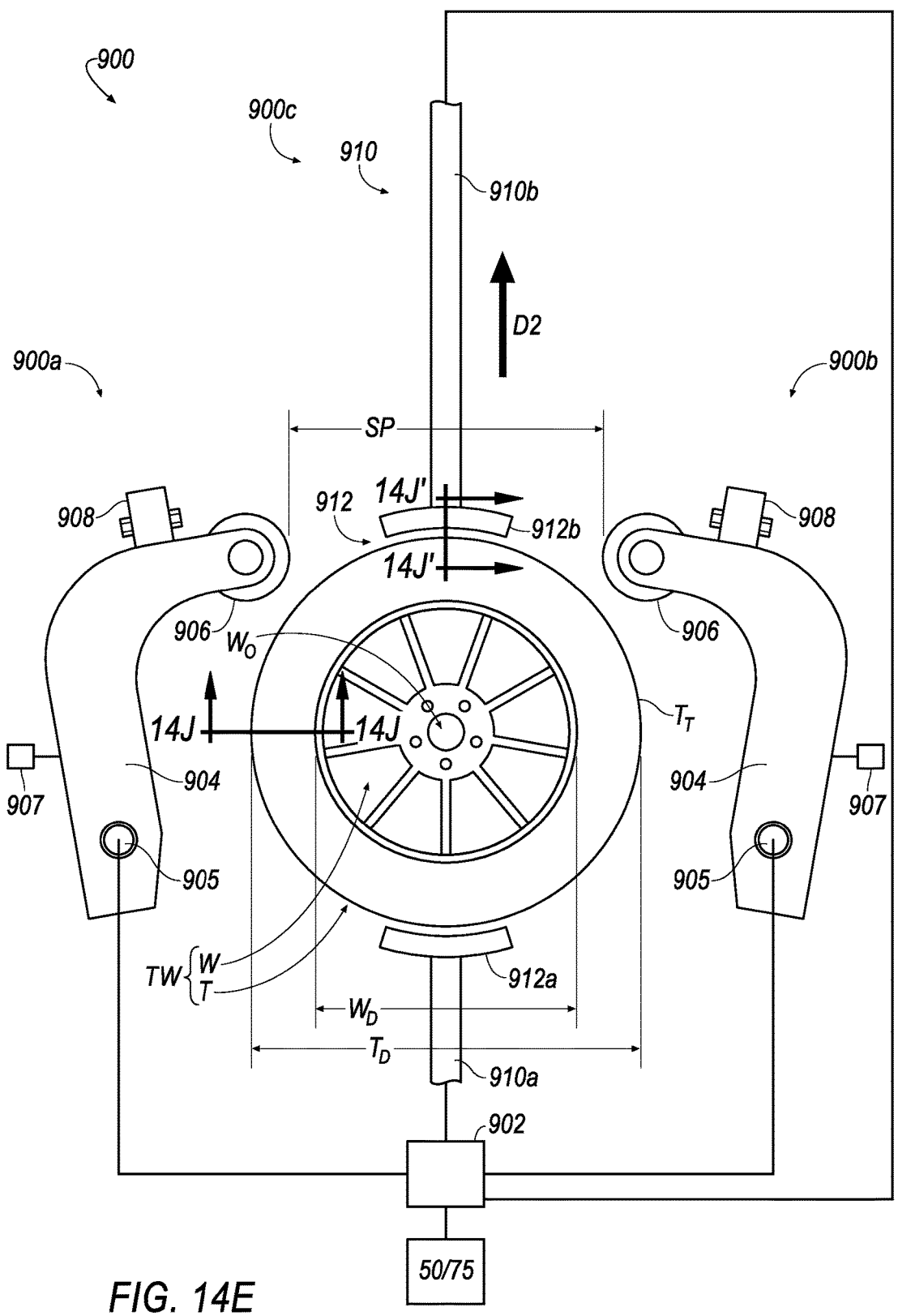
Figure 14F:
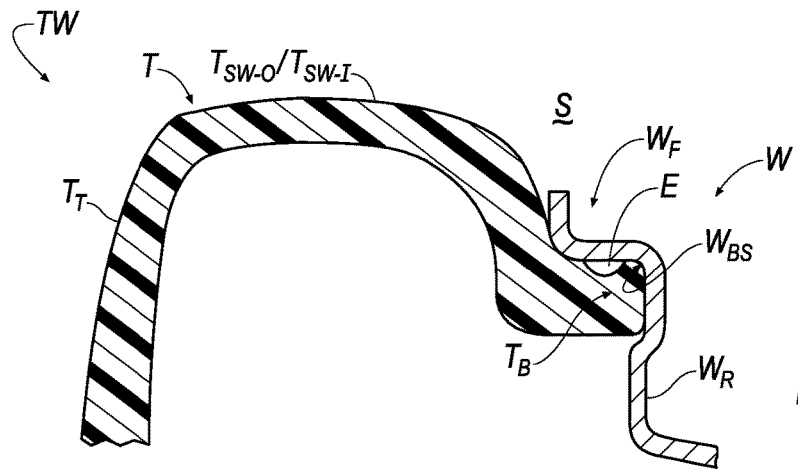
FIG. 14F is a broken cross-sectional view of the bead seater assembly according to line 14F-14F of FIG. 14A.
Figure 14G:
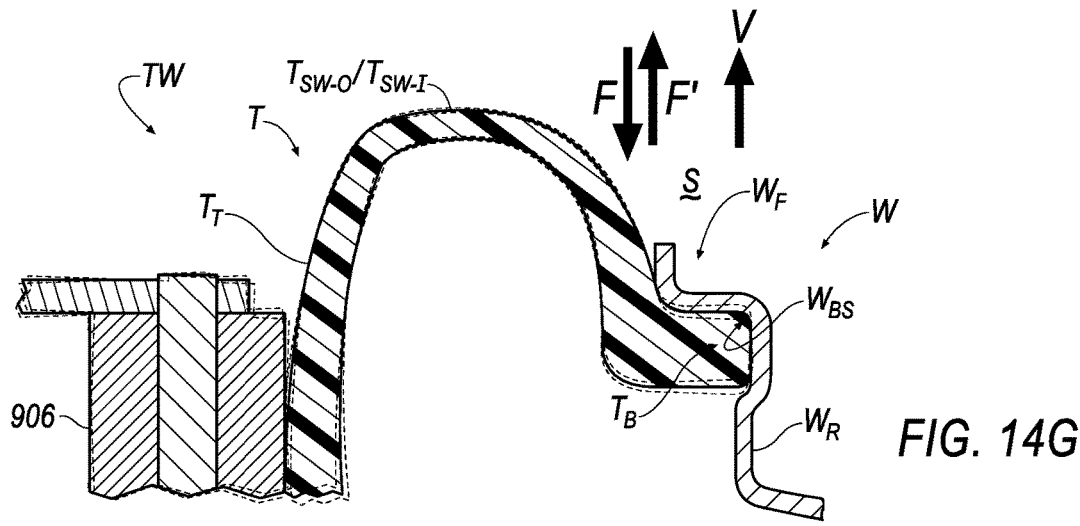
FIG. 14G is a broken cross-sectional view of the bead seater assembly according to line 14G-14G of FIG. 14B.
Figure 14H:
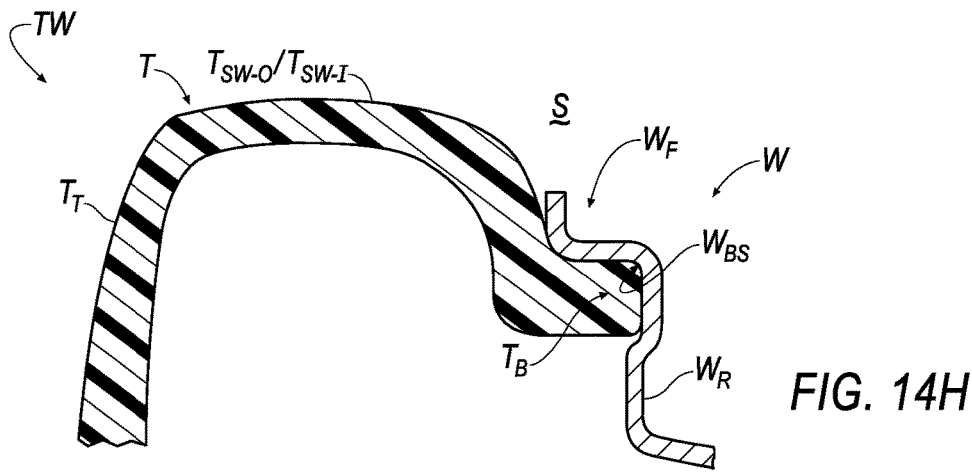
FIG. 14H is a broken cross-sectional view of the bead seater assembly according to line 14H-14H of FIG. 14C.
Figure 14F:
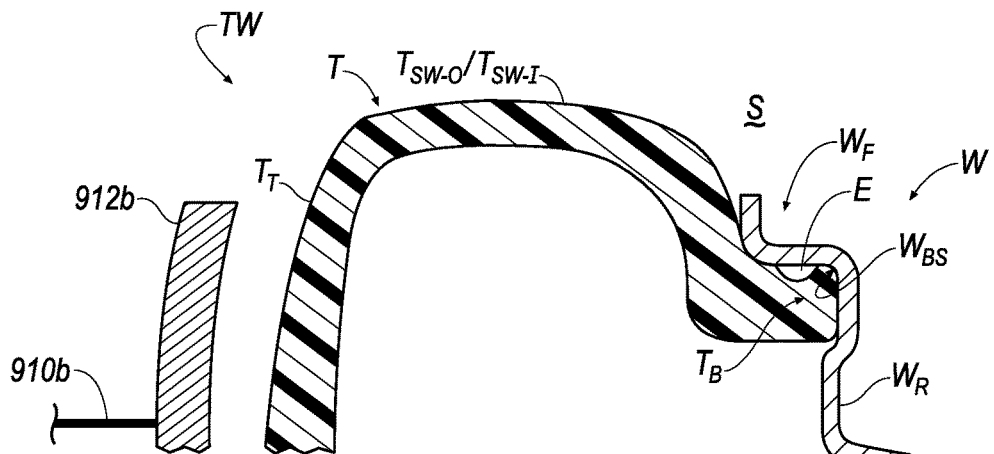
Figure 14G:
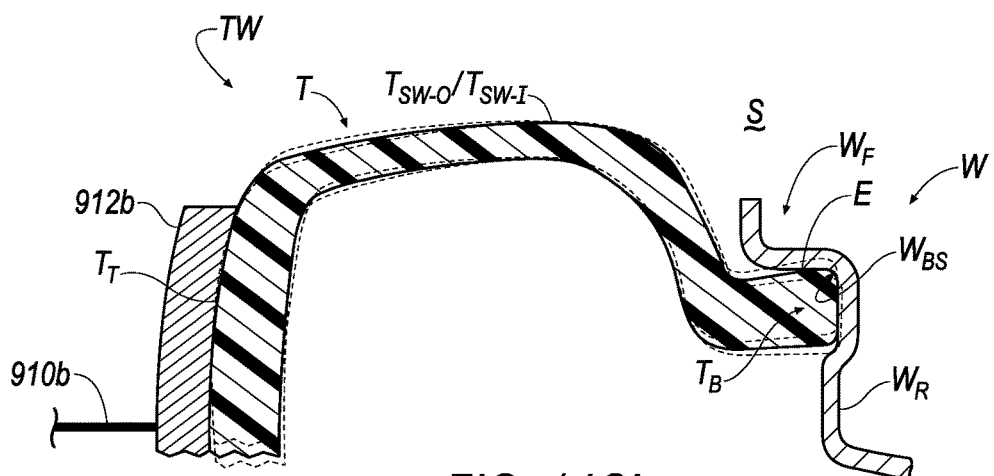
Figure 14H:
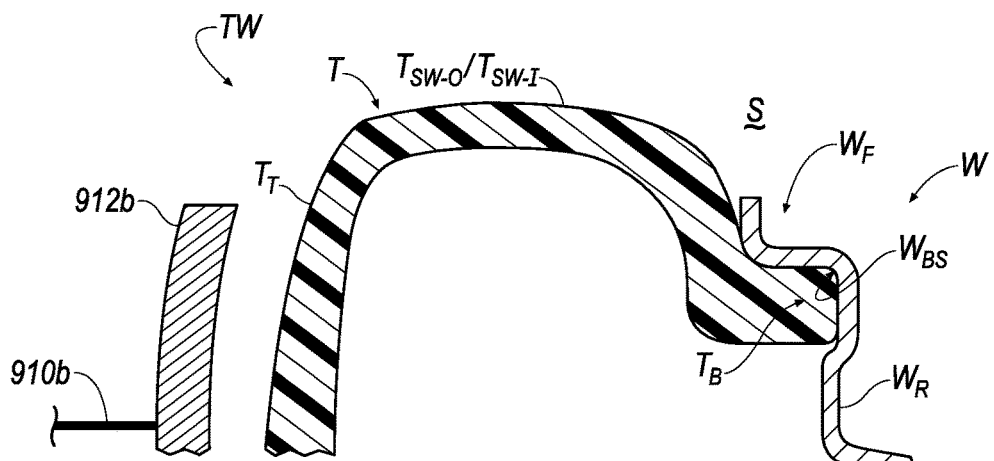
Figure 14I:
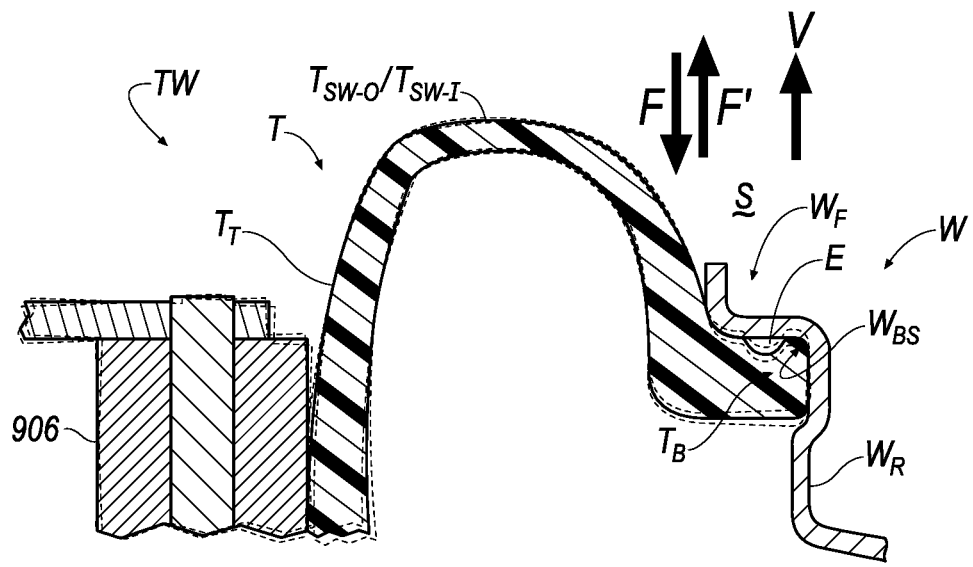
FIG. 14I is a broken cross-sectional view of the bead seater assembly according to line 14I-14I of FIG. 14D.
Figure 14J:
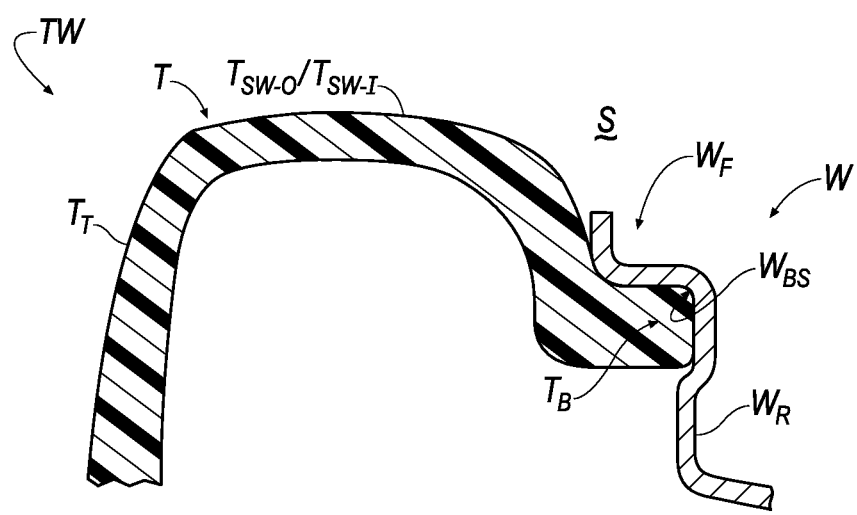
FIG. 14J is a broken cross-sectional view of the bead seater assembly according to line 14J-14J of FIG. 14E.
Figure 14I:
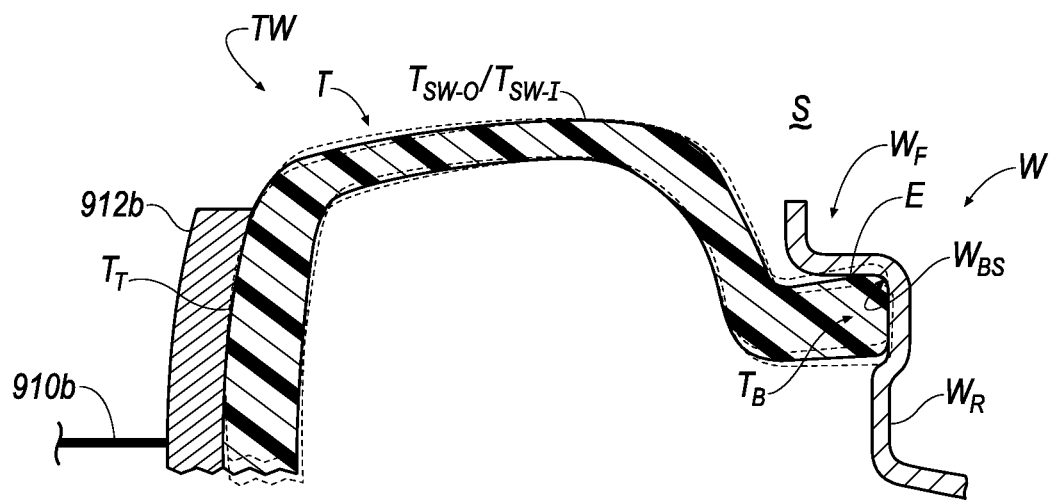
Figure 14J:
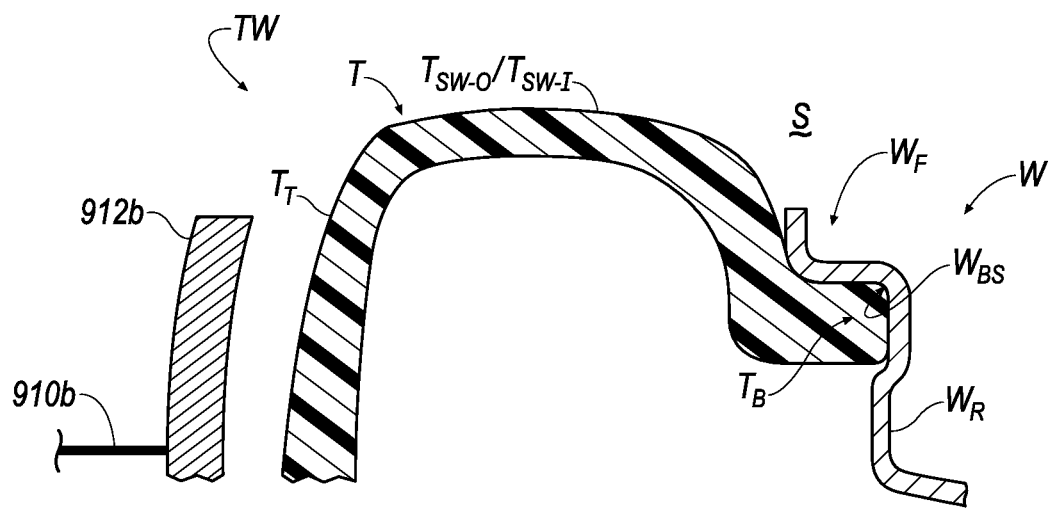

As seen in FIGS. 14B-14D, each of the arms 904 of the first and second tire-wheel assembly engaging portions 900a, 900b are arranged in a fixed orientation at a spaced-apart distance, SP. The spaced-apart distance, SP, is greater than a diameter, WD, of the wheel, W, but less than a diameter, TD, of the tire, T; accordingly, when the actuator 902 drives movement of the first and second reciprocating arms 910a, 910b and the first and second arcuate tire tread surface engaging portion 912a, 912b in the first direction, D2, and the second direction, D2', the third tire-wheel assembly engaging portion 900c shuttles the tire-wheel assembly, TW, through the spaced-apart distance, SP. However, because the diameter, TD, of the tire, T, is less than the spaced-apart distance, SP, the contact of each tire tread surface engaging wheels 906 with the tread surface, TT, of the tire, T, results in the entrapment remover 900 interfering with the movement of the tire, T, through (according to the directions D2/D2') the spaced-apart distance, SP, which then causes the orientation of the tire, T, relative the wheel, W, to be upset such that entrapments, E, proximate the bead seat, WBS, of the wheel, W, may be permitted to be removed from the tire-wheel assembly, TW.

In addition to the entrapment remover 900 interfering with the movement of the tire, T, through the spaced-apart distance, SP, once each tire tread surface engaging wheels 906 is directly contacts the tread surface, TT, of the tire, T, the vibrating device 908 may be actuated in order to impart a vibrational force to each tire tread surface engaging wheel 906. Thus, the movement of the tire-wheel assembly, TW, through the spaced-apart distance, SP, and the vibrational force may conjunctively cause the entrapments, E, proximate the bead seat, WBS, of the wheel, W, to be removed from the tire-wheel assembly, TW. The vibrating device 908 may be communicatively-coupled to the actuator 902 such that the actuator 902 may communicate a de/activation signal to the vibrating device 908 for turning off/on the vibrating device 908.

Referring to FIGS. 14F-14I and 14F-14I', upon the movement of the tire-wheel assembly, TW, through the spaced-apart distance, SP, and/or the application of the vibrational force arising from the vibrating device 908, the entrapment remover 900 upsets the relationship of the tire-wheel assembly, TW, proximate the bead seat, WBS, of the wheel, W, such that entrapments, E (see, e.g., FIGS. 14F, 14F'), may be permitted to be removed (see, e.g., FIG. 14G') from the tire-wheel assembly, TW. In an implementation, the movement of the tire-wheel assembly, TW, through the spaced-apart distance, SP, and/or the vibrational forces imparted to each tire tread surface engaging wheel 906 may result in the outboard/inboard outer sidewall surfaces, TSW-O/TSW-I, of a tire, T, being moved relative to a fixed orientation of the wheel, W (as a result of, e.g., the head portion 476 of the robotic arm 475 being interfaced with the axial opening, WO, formed by the wheel, W). In an embodiment, after the entrapment remover 900 upsets the relationship of the tire-wheel assembly, TW, proximate the bead seat, WBS, of the wheel, W, the entrapment remover 900 may include/cooperate with a vacuum, V (arising from, e.g., first and/or second vacuum devices 18a, 18b/118a, 118b), in order to assist in the evacuation of the one or more entrapments, E.

The present invention has been described with reference to certain exemplary embodiments thereof. However, it will be readily apparent to those skilled in the art that it is possible to embody the invention in specific forms other than those of the exemplary embodiments described above. This may be done without departing from the spirit of the invention. The exemplary embodiments are merely illustrative and should not be considered restrictive in any way. The scope of the invention is defined by the appended claims and their equivalents, rather than by the preceding description.

What is claimed is:

1. An apparatus disposable adjacent a tread surface of a tire for seating a bead of the tire adjacent a bead seat of a wheel of a tire-wheel assembly such that entrapments are removed from the tire-wheel assembly and do not interfere with arrangement of the bead of the tire adjacent the bead seat of the wheel, comprising:
   a bead seater assembly including:
      at least one arcuate tire tread surface engaging portion,
      at least one reciprocating arm connected to the at least one arcuate tire tread surface engaging portion, and
      a vibrating device connected to the at least one arcuate tire tread surface engaging portion; and
   an actuator connected to both of the at least one reciprocating arm and the vibrating device, wherein the actuator:
      imparts movement to the at least one reciprocating arm that results in corresponding movement of the at least one arcuate tire tread surface engaging portion in one of a first direction toward the tread surface of the tire and a second direction away from the tread surface of the tire, and
      communicates a de/activation signal to the vibrating device for turning off/on the vibrating device, wherein, upon the tire tread surface engaging portion directly contacting the tread surface of the tire, the vibrating device is turned on for imparting a vibration force from the vibration device to the tire-wheel assembly for upsetting an orientation of an outer sidewall surface of the tire proximate the bead seat of the wheel such that the entrapments may be permitted to be removed from the tire-wheel assembly.

2. The apparatus according to claim 1, wherein the bead seater assembly is attached to a platen that extends from a bead seating station.

3. The apparatus according to claim 1, wherein the bead seater assembly is attached to a robotic arm.

4. The apparatus according to claim 1, wherein the bead seater assembly is attached to a platen that extends from a wheeled cart that is selectively docked/interfaced with a bead seating station.

5. An apparatus disposable adjacent an outer sidewall surface of a tire for seating a bead of the tire adjacent a bead seat of a wheel of a tire-wheel assembly such that entrapments are removed from the tire-wheel assembly and do not interfere with arrangement of the bead of the tire adjacent the bead seat of the wheel, comprising:
   a bead seater assembly including:
      at least one tire sidewall pinching finger,
      at least one reciprocating arm connected to the at least one tire sidewall pinching finger,
      a vibrating device connected to the at least one tire sidewall pinching finger by way of the at least one reciprocating arm, and
      an actuator connected to both of the at least one reciprocating arm and the vibrating device, wherein the actuator:
         imparts movement to the at least one reciprocating arm that results in corresponding movement of the at least one tire sidewall pinching finger in one of a first direction toward the outer sidewall surface of the tire and a second direction away from the outer sidewall surface of the tire, and
         communicates a de/activation signal to the vibrating device for turning off/on the vibrating device, wherein, upon the at least one tire sidewall pinching finger directly contacting the outer sidewall surface of the tire, the vibrating device is turned on for imparting a vibration force from the vibration device to the tire-wheel assembly for upsetting an orientation of the outer sidewall surface of the tire proximate the bead seat of the wheel such that the entrapments may be permitted to be removed from the tire-wheel assembly.

6. The apparatus according to claim 5, wherein the bead seater assembly is attached to a platen that extends from a bead seating station.

7. The apparatus according to claim 5, wherein the bead seater assembly is attached to a robotic arm.

8. The apparatus according to claim 5, wherein the bead seater assembly is attached to a platen that extends from a wheeled cart that is selectively docked/interfaced with a bead seating station.

9. An apparatus disposable adjacent a tread surface of a tire for seating a bead of the tire adjacent a bead seat of a wheel of a tire-wheel assembly such that entrapments are removed from the tire-wheel assembly and do not interfere with arrangement of the bead of the tire adjacent the bead seat of the wheel, comprising:
   a bead seater assembly including:
      at least one tire tread surface engaging wheel,
      at least one reciprocating arm connected to the at least one tire tread surface engaging wheel, and
      a vibrating device connected to the at least one tire tread surface engaging wheel by way of the at least one reciprocating arm, wherein the at least one tire tread surface engaging wheel includes a first tire tread surface engaging wheel and a second tire tread surface engaging wheel, wherein the at least one reciprocating arm includes a first reciprocating arm and a second reciprocating arm, wherein the first tire tread surface engaging wheel is connected to the first reciprocating arm, wherein the second tire tread surface engaging wheel is connected to the second reciprocating arm, wherein the first tire tread surface engaging wheel and the second tire tread surface engaging wheel are arranged at a spaced-apart distance to define a gap, wherein the spaced-apart distance is greater than a diameter of the wheel but less than a diameter of the tire;
   a tire-wheel assembly shuttle; and
   an actuator connected to the at least one reciprocating arm, the vibrating device and the tire-wheel assembly shuttle, wherein the actuator:
      communicates a signal to the shuttle for transporting the tire-wheel assembly through the gap for upsetting an orientation of an outer sidewall surface of the tire proximate the bead seat of the wheel such that the entrapments may be permitted to be removed from the tire-wheel assembly, and
      communicates a de/activation signal to the vibrating device for turning off/on the vibrating device, wherein, upon the at least one tire tread surface engaging wheel directly contacting the tread surface of the tire, the vibrating device is turned on for imparting a vibration force from the vibration device to the tire-wheel assembly for upsetting an orientation of the outer sidewall surface of the tire proximate the bead seat of the wheel such that the entrapments may be permitted to be removed from the tire-wheel assembly, wherein the actuator is further connected to the at least one reciprocating arm such that the actuator:

imparts movement to the at least one reciprocating arm that results in corresponding movement of the at least one tire tread surface engaging wheel in one of a first direction toward the tread surface of the tire for arranging the first tire tread surface engaging wheel and the second tire tread surface engaging wheel at the spaced-apart distance and a second direction away from the tread surface of the tire.

10. The apparatus according to claim 9, further comprising:
a biasing spring for biasing the first reciprocating arm and the second reciprocating arm with a biasing force such that the first tire tread surface engaging wheel and the second tire tread surface engaging wheel are biased for arrangement at the spaced-apart distance, wherein the biasing force is overcome upon the shuttle transporting the tire-wheel assembly through the gap such that first reciprocating arm and the second reciprocating arm are permitting to pivot away from one another thereby increasing the spaced-apart distance of the first tire tread surface engaging wheel and the second tire tread surface engaging wheel.

11. The apparatus according to claim 9, wherein the bead seater assembly is attached to a platen that extends from a bead seating station.

12. The apparatus according to claim 9, wherein the bead seater assembly is attached to a robotic arm.

13. The apparatus according to claim 9, wherein the bead seater assembly is attached to a platen that extends from a wheeled cart that is selectively docked/interfaced with a bead seating station.

\* \* \* \* \*

UNITED STATES PATENT AND TRADEMARK OFFICE
CERTIFICATE OF CORRECTION

| | |
|---|---|
| PATENT NO. | : 9,950,580 B2 |
| APPLICATION NO. | : 13/754610 |
| DATED | : April 24, 2018 |
| INVENTOR(S) | : Lawrence J. Lawson et al. |

It is certified that error appears in the above-identified patent and that said Letters Patent is hereby corrected as shown below:

On the Title Page

(57) Abstract: please delete the present Abstract:
"An apparatus for seating a bead of the a adjacent a bead seat of a wheel is disclosed. The apparatus is disposable adjacent one or more of a tread surface and an outer sidewall surface of the tire."

And insert the following Abstract:
--An apparatus for seating a tire bead adjacent a bead seat of a wheel. The apparatus is disposed adjacent one or more of a tread surface and an outer sidewall surface of the tire.--

Signed and Sealed this
Ninth Day of October, 2018

Andrei Iancu
*Director of the United States Patent and Trademark Office*